(12) United States Patent
Paiz

(10) Patent No.: US 10,936,687 B1
(45) Date of Patent: Mar. 2, 2021

(54) CODEX SEARCH PATTERNS VIRTUAL MAESTRO

(71) Applicant: Richard Paiz, N. Miami Beach, FL (US)

(72) Inventor: Richard Paiz, N. Miami Beach, FL (US)

(*) Notice: Subject to any disclaimer, the term of this patent is extended or adjusted under 35 U.S.C. 154(b) by 307 days.

(21) Appl. No.: 16/129,784

(22) Filed: Sep. 12, 2018

Related U.S. Application Data

(60) Continuation-in-part of application No. 15/944,770, filed on Apr. 3, 2018, now abandoned, which is a division of application No. 15/889,150, filed on Feb. 5, 2018, which is a division of application No. 15/829,963, filed on Dec. 3, 2017, which is a division of application No. 15/829,916, filed on Dec. 2, 2017, which is a division of application No. 15/708,122, filed on Sep. 18, 2017, which is a division of application No. 15/644,713, filed on Jul. 7, 2017,
(Continued)

(51) Int. Cl.
| | |
|---|---|
| *G06F 16/00* | (2019.01) |
| *G06F 16/9535* | (2019.01) |
| *G06F 16/335* | (2019.01) |
| *G06F 16/332* | (2019.01) |
| *G06F 16/33* | (2019.01) |

(52) U.S. Cl.
CPC ........ *G06F 16/9535* (2019.01); *G06F 16/337* (2019.01); *G06F 16/3328* (2019.01); *G06F 16/3341* (2019.01)

(58) Field of Classification Search
CPC ............. G06F 16/9535; G06F 16/3341; G06F 16/3328; G06F 16/337
See application file for complete search history.

(56) References Cited

U.S. PATENT DOCUMENTS

| | | | |
|---|---|---|---|
| 4,974,191 A | 11/1990 | Amirghodsi | |
| 5,025,369 A | 6/1991 | Schwartz | |

(Continued)

FOREIGN PATENT DOCUMENTS

EP 0448800 A1 10/1991

OTHER PUBLICATIONS

Robertson, et al. "Cone Trees: Animated Visualization of Hierarchical Information", 1991.
(Continued)

*Primary Examiner* — Mohammed R Uddin
(74) *Attorney, Agent, or Firm* — Jonathan Torchman; Torchman IP LLC

(57) ABSTRACT

A Codex system including a plurality of computers linked into a neural network. The Codex continuously scans and gathers information from, understands, and interacts with, an environment, the environment being an Internet comprising a multitude of websites. Processors of the computers operates in accordance with optimizer software, which executes a software instruction set, based on rules of grammar and semantics, to search a encyclopedia of human knowledge and utilizes the encyclopedia to transform input into a search pattern. Then, the Codex monetizes and commercializes each transformed input and corresponding optimal output. An artificial intelligence interaction software (referred to as Virtual Maestro) utilizes the search pattern and optimal output to interact and engage a scripted communication with an end user.

20 Claims, 20 Drawing Sheets

Related U.S. Application Data which is a division of application No. 15/494,497, filed on Apr. 22, 2017, which is a continuation-in-part of application No. 15/486,276, filed on Apr. 12, 2017, which is a continuation-in-part of application No. 15/390,713, filed on Dec. 26, 2016, which is a division of application No. 15/352,555, filed on Nov. 15, 2016, now abandoned, which is a division of application No. 15/264,996, filed on Sep. 14, 2016, which is a division of application No. 15/246,446, filed on Aug. 24, 2016, which is a division of application No. 15/175,861, filed on Jun. 7, 2016, which is a division of application No. 14/682,052, filed on Apr. 8, 2015, which is a division of application No. 14/623,559, filed on Feb. 17, 2015, which is a division of application No. 14/582,236, filed on Dec. 24, 2014, which is a division of application No. 14/578,439, filed on Dec. 21, 2014, now abandoned, which is a division of application No. 14/474,268, filed on Sep. 1, 2014, now abandoned, which is a division of application No. 14/028,508, filed on Sep. 16, 2013, now Pat. No. 9,355,352, which is a continuation-in-part of application No. 14/013,018, filed on Aug. 28, 2013, now abandoned, which is a continuation-in-part of application No. 13/777,775, filed on Feb. 26, 2013, now Pat. No. 8,977,621, which is a continuation-in-part of application No. 13/247,964, filed on Sep. 28, 2011, now Pat. No. 8,868,535, which is a continuation-in-part of application No. 12/785,122, filed on May 21, 2010, now Pat. No. 8,386,456, which is a continuation-in-part of application No. 12/778,228, filed on May 12, 2010, now Pat. No. 8,239,229, which is a continuation-in-part of application No. 12/764,934, filed on Apr. 21, 2010, now Pat. No. 8,676,667.

(56) References Cited

U.S. PATENT DOCUMENTS

| | | | |
|---|---|---|---|
| 5,063,506 | A | 11/1991 | Brockweil et al. |
| 5,585,839 | A | 12/1996 | Ishida et al. |
| 5,659,766 | A | 8/1997 | Saund |
| 5,671,363 | A | 9/1997 | Cristofich et al. |
| 5,677,835 | A | 10/1997 | Carbonell |
| 5,706,497 | A | 1/1998 | Takahashi et al. |
| 5,762,552 | A | 6/1998 | Vuong et al. |
| 5,790,935 | A | 8/1998 | Payton |
| 5,794,210 | A | 8/1998 | Goldhaber et al. |
| 5,809,282 | A | 9/1998 | Cooper et al. |
| 5,819,258 | A | 10/1998 | Vaithyanathan et al. |
| 5,832,069 | A | 11/1998 | Waters et al. |
| 5,873,076 | A | 2/1999 | Barr |
| 5,873,099 | A | 2/1999 | Hogan et al. |
| 5,878,113 | A | 3/1999 | Bhusri |
| 5,878,127 | A | 3/1999 | Fleischer, III |
| 5,881,269 | A | 3/1999 | Dobbelstein |
| 5,910,981 | A | 6/1999 | Bhagat et al. |
| 5,917,899 | A | 6/1999 | Moss et al. |
| 5,931,901 | A | 8/1999 | Wolfe et al. |
| 5,987,446 | A * | 11/1999 | Corey ................... G06F 16/951 |
| 5,995,920 | A | 11/1999 | Carbonell |
| 6,028,924 | A | 2/2000 | Ram et al. |
| 6,069,310 | A | 5/2000 | James |
| 6,078,657 | A | 6/2000 | Alfieri et al. |
| 6,088,733 | A | 7/2000 | Kikuchi |
| 6,128,378 | A | 10/2000 | Diener et al. |
| 6,219,652 | B1 | 4/2001 | Carter et al. |
| 6,233,545 | B1 | 5/2001 | Datig |
| 6,243,480 | B1 | 6/2001 | Zhao et al. |
| 6,256,627 | B1 | 7/2001 | Beattie et al. |
| 6,264,560 | B1 | 7/2001 | Goldberg et al. |
| 6,282,653 | B1 | 8/2001 | Berstis et al. |
| 6,285,999 | B1 | 9/2001 | Page |
| 6,330,672 | B1 | 12/2001 | Shur |
| 6,345,182 | B1 | 2/2002 | Fabritius et al. |
| 6,363,253 | B1 | 3/2002 | Valentine et al. |
| 6,408,282 | B1 | 6/2002 | Buist |
| 6,427,132 | B1 | 7/2002 | Bowman-Amuah |
| 6,442,169 | B1 | 8/2002 | Lewis |
| 6,445,785 | B1 | 9/2002 | Chan et al. |
| 6,463,275 | B1 | 10/2002 | Deakin |
| 6,490,345 | B2 | 12/2002 | Fleischer et al. |
| 6,508,709 | B1 | 1/2003 | Karmarkar |
| 6,510,419 | B1 | 1/2003 | Gatto |
| 6,526,440 | B1 | 2/2003 | Bharat |
| 6,529,592 | B1 | 3/2003 | Khan |
| 6,529,878 | B2 | 3/2003 | De Rafael et al. |
| 6,601,044 | B1 | 7/2003 | Wallman |
| 6,614,781 | B1 | 9/2003 | Elliott et al. |
| 6,629,890 | B2 | 10/2003 | Johnson |
| 6,661,884 | B2 | 12/2003 | Shaffer et al. |
| 6,754,873 | B1 | 6/2004 | Law |
| 6,782,430 | B1 | 8/2004 | Cragun |
| 6,915,268 | B2 | 7/2005 | Riggs et al. |
| 6,947,540 | B2 | 9/2005 | Madoch et al. |
| 6,963,867 | B2 * | 11/2005 | Ford ................... G06Q 30/02 707/752 |
| 7,006,988 | B2 | 2/2006 | Lin et al. |
| 7,058,628 | B1 | 6/2006 | Page |
| 7,059,515 | B2 | 6/2006 | White |
| 7,103,536 | B1 | 9/2006 | Kanno |
| 7,216,123 | B2 | 5/2007 | Kamvar |
| 7,499,914 | B2 | 3/2009 | Dieb et al. |
| 7,505,964 | B2 | 3/2009 | Tong |
| 7,552,395 | B2 | 6/2009 | Neale et al. |
| 7,660,815 | B1 * | 2/2010 | Scofield ................ G06F 16/951 707/999.102 |
| 7,725,465 | B2 | 5/2010 | Liao et al. |
| 7,739,281 | B2 | 6/2010 | Najork |
| 7,756,850 | B2 | 7/2010 | Keith, Jr. |
| 7,805,382 | B2 | 9/2010 | Rosen |
| 7,890,526 | B1 | 2/2011 | Brewer et al. |
| 8,311,973 | B1 * | 11/2012 | Zadeh ................... G06N 7/005 706/62 |
| 8,452,765 | B2 | 5/2013 | Hoffman et al. |
| 8,527,269 | B1 | 9/2013 | Kupor et al. |
| 8,548,995 | B1 | 10/2013 | Curtiss |
| 8,615,442 | B1 | 12/2013 | Kupor et al. |
| 8,620,951 | B1 | 12/2013 | He et al. |
| 8,630,975 | B1 | 1/2014 | Guo |
| 8,645,393 | B1 | 2/2014 | Kolak |
| 8,661,029 | B1 | 2/2014 | Kim |
| 8,682,892 | B1 | 3/2014 | Panda et al. |
| 8,700,653 | B2 | 4/2014 | Hansson et al. |
| 8,719,276 | B1 | 5/2014 | Haahr |
| 8,903,800 | B2 | 12/2014 | Kakade et al. |
| 8,924,379 | B1 | 12/2014 | Kim |
| 9,009,146 | B1 | 4/2015 | Lopatenko |
| 9,053,156 | B1 | 6/2015 | He et al. |
| 9,118,655 | B1 | 8/2015 | Paczkowski et al. |
| 9,135,307 | B1 | 9/2015 | Panda et al. |
| 9,191,522 | B1 | 11/2015 | Krieger et al. |
| 9,323,808 | B1 | 4/2016 | Kanefsky |
| 9,390,174 | B2 | 7/2016 | Zhou et al. |
| 9,514,404 | B1 | 12/2016 | Corrado et al. |
| 9,514,405 | B2 | 12/2016 | Chen et al. |
| 10,025,858 | B2 | 7/2018 | Blass |
| 2002/0042793 | A1 | 4/2002 | Choi |
| 2002/0049625 | A1 | 4/2002 | Lettich et al. |
| 2002/0137217 | A1 | 9/2002 | Rowe |
| 2002/0173971 | A1 | 11/2002 | Stirpe |
| 2003/0018547 | A1 | 1/2003 | Steele |
| 2003/0036898 | A1 | 2/2003 | Duan |
| 2003/0050719 | A1 * | 3/2003 | Bao-Liang ........... G06K 9/6281 700/91 |
| 2003/0050819 | A1 | 3/2003 | Koenigbauer et al. |
| 2004/0024739 | A1 | 2/2004 | Copperman et al. |
| 2004/0093325 | A1 | 5/2004 | Banerjee et al. |
| 2005/0114324 | A1 | 5/2005 | Mayer |
| 2005/0165753 | A1 | 7/2005 | Chen et al. |

(56) References Cited

U.S. PATENT DOCUMENTS

| | | |
|---|---|---|
| 2006/0242098 A1 | 10/2006 | Wnek |
| 2007/0050393 A1 | 3/2007 | Vogel et al. |
| 2007/0094251 A1 | 4/2007 | Lu |
| 2008/0159622 A1* | 7/2008 | Agnihotri ............ G06K 9/4628 382/157 |
| 2008/0168033 A1 | 7/2008 | Ott et al. |
| 2008/0195477 A1 | 8/2008 | Kennedy et al. |
| 2008/0231443 A1* | 9/2008 | Kotter .................... G08B 13/24 340/551 |
| 2009/0100125 A1 | 4/2009 | McDowell |
| 2009/0106100 A1 | 4/2009 | Mashinsky |
| 2009/0106224 A1 | 4/2009 | Roulland |
| 2009/0150156 A1 | 6/2009 | Kennewick |
| 2009/0240683 A1 | 9/2009 | Lazier |
| 2009/0282022 A1 | 11/2009 | Bennett |
| 2010/0017267 A1 | 1/2010 | Negron |
| 2011/0125743 A1 | 5/2011 | Immonen et al. |
| 2011/0145088 A1 | 6/2011 | Bonner et al. |
| 2011/0219295 A1 | 9/2011 | Adams et al. |
| 2011/0258258 A1 | 10/2011 | Briere |
| 2012/0158633 A1 | 6/2012 | Eder |
| 2012/0203754 A1* | 8/2012 | Biran ............... G06F 16/90344 707/706 |
| 2013/0110804 A1* | 5/2013 | Davis ................... G06F 3/0304 707/706 |
| 2013/0159286 A1* | 6/2013 | Manzano Macho ........................ G06F 16/24552 707/718 |
| 2014/0032306 A1 | 1/2014 | Sukornyk |
| 2014/0201126 A1* | 7/2014 | Zadeh ................... A61B 5/165 706/52 |

OTHER PUBLICATIONS

Hearst, et al, "Cat-a-Cone: An Interactive Interface for Specifying Searches and Viewing Retrieval Results using a Large Category Hierarchy", 1997.
Zamir, et al. "Grouper: A Dynamic Clustering Interface to Web Search Results", 1999.
Dumais, et al. "Hierarchical Classification of Web Content", 2000.
Wen, et al. "Clustering User Queries of a Search Engine", 2001.
Yue, et al., "A Video Summarization Tool Using Two-Level Redundancy Detection for Personal Video recorders", 2010.
Unknown, American Banker, "Chemical Buys Trading Software from Reuters", ( v 154, n 145, p. 14, Dialog file 9, Accession No. 00500233), 1994.
Croneliusson, Roy, SAP-R3, Jan. 1999. Downloaded from https:llqupea.ub.gu.se/dspace/bitstream/2077/1359/1/hattab.IA7400.pdf downloaded on Mar. 26, 2008, 47 pages.
SAP-CAPS, 1999. Downloaded from http://web.archive.org/web/19991105101002/www.caps.com/products/sap/sapr3.htm, 3 Pages.
RoutePro, 1999, Downloaded from http://web.archive.org/web/20010627035933/www.caps.com/products/rprodsgrfrpdsgrfeat.htm, 2 pages.
Paiz, Richard, "Designing Hot Billing Systems for Large Volume and/or Complex Networks" Doctoral Dissertation, California Coast University, Nov. 1999.

* cited by examiner

CODEX SEARCH PATTERNS VIRTUAL MAESTRO

CROSS REFERENCE TO RELATED APPLICATIONS

This Non-Provisional Patent Application is a Continuation-In-Part that claims the benefit of:

co-pending U.S. patent application Ser. No. 15/944,770 filed on Apr. 3, 2018, wherein U.S. patent application Ser. No. 15/944,770 is a Divisional Application claiming priority co-pending U.S. patent application Ser. No. 15/889,150 filed on Feb. 5, 2018, wherein U.S. patent application Ser. No. 15/889,150 is a Divisional Application claiming priority co-pending U.S. patent application Ser. No. 15/829,963 filed on Dec. 3, 2017, wherein U.S. patent application Ser. No. 15/829,963 is a Divisional Application claiming priority co-pending U.S. patent application Ser. No. 15/829,916 filed on Dec. 2, 2017, wherein U.S. patent application Ser. No. 15/829,916 is a Divisional Application claiming priority co-pending U.S. patent application Ser. No. 15/708,122 filed on Sep. 18, 2017, wherein U.S. patent application Ser. No. 15/708,122 is a Divisional Application claiming priority to co-pending U.S. patent application Ser. No. 15/644,713 filed on Jul. 7, 2017, wherein U.S. patent application Ser. No. 15/644,713 is a Divisional Application claiming priority to co-pending U.S. patent application Ser. No. 15/494,497 filed on Apr. 22, 2017, wherein U.S. patent application Ser. No. 15/494,497 is a Continuation-In-Part claiming priority to co-pending U.S. patent application Ser. No. 15/486,276 filed on Apr. 12, 2017, wherein U.S. patent application Ser. No. 15/486,276 is a Continuation-In-Part claiming priority to co-pending U.S. patent application Ser. No. 15/390,713 filed on Dec. 26, 2016, wherein U.S. patent application Ser. No. 15/390,713 is a Divisional Application claiming priority to co-pending U.S. patent application Ser. No. 15/352,555 filed on Nov. 15, 2016, wherein U.S. patent application Ser. No. 15/352,555 is a Divisional Application claiming priority to co-pending U.S. patent application Ser. No. 15/264,996 filed on Sep. 14, 2016, wherein U.S. patent application Ser. No. 15/264,996 is a Divisional Application claiming priority to co-pending U.S. patent application Ser. No. 15/246,446 filed on Aug. 24, 2016, wherein U.S. patent application Ser. No. 15/246,446 is a Divisional Application claiming priority to co-pending U.S. patent application Ser. No. 15/175,861 filed on Jun. 7, 2016, wherein U.S. patent application Ser. No. 15/175,861 is a Divisional Application claiming priority to co-pending U.S. patent application Ser. No. 14/682,052 filed on Apr. 8, 2015, wherein U.S. patent application Ser. No. 14/682,052 is a Divisional Application claiming priority to co-pending U.S. patent application Ser. No. 14/623,559 filed on Feb. 17, 2015, wherein U.S. patent application Ser. No. 14/623,559 is a Divisional Application claiming priority to co-pending U.S. patent application Ser. No. 14/582,236 filed on Dec. 24, 2014, wherein U.S. patent application Ser. No. 14/582,236 is a Continuation-In-Part claiming priority to U.S. patent application Ser. No. 14/578,439 filed on Dec. 21, 2014, wherein U.S. patent application Ser. No. 14/578,439 is a Divisional Application claiming priority to U.S. patent application Ser. No. 14/474,268 filed on Sep. 1, 2014, wherein U.S. patent application Ser. No. 14/474,268 is a Divisional Application claiming priority to U.S. patent application Ser. No. 14/028,508 filed on Sep. 16, 2013 (issued as U.S. Pat. No. 9,355,352 on May 31, 2016), wherein U.S. patent application Ser. No. 14/028,508 is a Continuation-In-Part Utility Application claiming priority to co-pending U.S. patent application Ser. No. 14/013,018 filed on Aug. 28, 2013 (now abandoned), wherein U.S. patent application Ser. No. 14/013,018 is a Continuation-In-Part claiming priority to co-pending U.S. patent application Ser. No. 13/777,775 filed on Feb. 26, 2013 (issued as U.S. Pat. No. 8,977,621 on Mar. 10, 2015), wherein U.S. patent application Ser. No. 13/777,775 is a Continuation-In-Part claiming priority to co-pending U.S. patent application Ser. No. 13/247,964 filed on Sep. 28, 2011 (issued as U.S. Pat. No. 8,868,535 on Oct. 21, 2014), wherein U.S. patent application Ser. No. 13/247,964 is a Continuation-In-Part claiming priority to co-pending U.S. patent application Ser. No. 12/785,122, filed on May 21, 2010 (issued as U.S. Pat. No. 8,386,456 on Feb. 26, 2013), wherein U.S. patent application Ser. No. 12/785,122 is a Continuation-In-Part claiming priority to co-pending U.S. patent application Ser. No. 12/778,228, filed on May 12, 2010 (issued as U.S. Pat. No. 8,239,229 on Aug. 7, 2012), wherein U.S. patent application Ser. No. 12/778,228 is a Continuation-In-Part claiming priority to co-pending U.S. patent application Ser. No. 12/764,934, filed on Apr. 21, 2010 (issued as U.S. Pat. No. 8,676,667 on Mar. 18, 2014);

all of which are incorporated herein in their entireties.

FIELD OF THE INVENTION

The present invention relates generally to an Internet search engine optimizer method and system. More particularly, the present invention relates to an interface product that works independently and in parallel with a browser client and search engine supercomputer server architecture that gathers, analyzes, and distills interactive input. The optimizer transforms the input into a human knowledge search pattern with informatics set theory interpretations of natural variants comprising of key featured associations and transitives that gain factor the value of the content and attenuate the confounding variables in order to stabilize and reduce sensitivity parameter variations due to the environment. For each search pattern the optimizer continuously maintains and updates preprocessed best-fit responses.

BACKGROUND OF THE PRESENT INVENTION

The limitations, drawbacks and/or disadvantages of technologies are as follows: Search engines are based on Boolean algebra eigenvector algorithms that are used to parse and filter information indices until the top page ranks are determined and displayed to the end user. Unfortunately, some specific keywords combinations may be too narrow and confound a search by hiding optimal results. Search engines are predominately configured to perform static search patterns. Each search is processed from the ground up without taking into account many requests belonging to one reply. A session consists of consecutive related and unrelated search requests to reach the final destination.

"Internet service companies are supported by monetization of offered services. Many service-oriented businesses revolve around the mission-critical data they require to successfully earn their keep. What many businesses are now discovering is that the data itself (data that's necessary to run their business) can also serve as a sought-after, profitable commodity."

"To monetize something is to convert non-revenue generating assets into sources of revenue. In economic terms, monetize means to convert any event, object or transaction into a form of currency or something with transferable value." Source:
https://www.cbigconsulting.com/services/data-monetization-consulting/

"The process of figuring out creative ways of monetization is about as old as capitalism, which is only about 300-400 years old in its current form. The processes of monetization, thinking systematically about how to convert something into cash, is a valuable part of a business's strategic planning process." Source:
http://www.investinganswers.com/financial-dictionary/businesses-corporations/monetize "Website monetization is the process of converting existing traffic being sent to a particular website into revenue. The most popular ways of monetizing a website are by implementing pay per click (PPC) and cost per impression (CPI/CPM) advertising. Various advertising networks facilitate a webmaster in placing advertisements on pages of the website to benefit from the traffic the site is experiencing.

The two most important metrics that matter to a web publisher looking to monetize their site is "Fill Rate", or the percent (%) of inventory where advertisements can be shown by a partner advertising network, and eCPM, which is the effective cost per thousand impression dollar amount that is paid out to the publisher for showing ads to their audience." Source:
https://en.wikipedia.org/wiki/Website_monetization

BACKGROUND OF THE PRESENT APPLICATION

The limitations, drawbacks and/or disadvantages of current search engines technologies are as follows:

The environment or Internet can be considered as a massive volume telecommunication network with billions of subscribers. Search engine supercomputers gather, analyze information of the environment estimated to be 30 billion unique pages for the English language, and using eigenvectors to measure large scale indices of information stored in databases to determine the most probable result pages with the end user's match criteria. As explained before U.S. Pat. No. 6,614,893, filed as U.S. patent application Ser. No. 09/544,238 on Apr. 7, 2000 to Paiz (a parent to this Application) and its continuations teach as the size of the environment increases the level of redundancy and tax burden exponentially increases. For this reason it will be object of this invention to perform the following improvements:

1) Clean, standardize and organize the spaghetti of the environment by gathering, analyzing, distilling, managing, organizing and distributing the huge amount of information in a massive parallel distributed managerial hierarchical supercomputer commercial known as a Managerial Pyramid Switch™ or MPS™ that removes redundancy, latency and the organizational tax burden. The MPS™ organizational hierarchy environmental domain will be divided into three tiers: a) MPS™ nodes have global domain, b) Synergy Information Switch™ or SIS™ nodes have regional domain, and c) Team Work Switch™ or TWS™ have local domain. The global domain is divided by Continent, the regional domain by Country and the local domain into Country regions or LATA if in the USA.

2) Once the spaghetti of the environment is removed the system will be able to eliminate redundancy, increase throughput, and eliminate complexity exponential rate of growth associated with the size of the environment.

3) Prior art Search Engines are based on 'Boolean Algebra' eigenvector algorithms that are used to prorate and filter information indices until the top page ranks are determined and displayed to the end user. Furthermore, some specific keyword may be too bright and confound a search by hiding optimal results.

4) Search Engines are predominately designed to perform one request to one reply search patterns. Each search pattern is performed from the ground up and does not take into account many requests to one reply patterns consisting of consecutive related and unrelated searches the end user typed to reach the final destination while randomly surfing the environment.

5) Page ranks have serious limitation due to the Caesar's "divide and conquer" nature or 'Boolean Algebra' approach of deriving the top results. A system that recognizes keyword combinations and when incomplete supplies and inserts missing gaps of information, as taught in U.S. Pat. No. 6,614,893, filed as U.S. patent application Ser. No. 09/544, 238 on Apr. 7, 2000 to Paiz (a parent to this Application) where Vector CDR can be expressed as the summation of a plurality of valid vectors. The systems correlates partial vectors to create a resultant vector representing a collection of top X page ranks that is certain or possesses 100% accuracy. As taught in U.S. Pat. No. 6,614,893, filed as U.S. patent application Ser. No. 09/544,238 on Apr. 7, 2000 to Paiz (a parent to this Application), "FIG. 5 describes the linkage between IBS and TQM. The IBS not only correlates billing entities in real time, but also proactively monitors the network integrity and scans for specific patterns that might predict new churn, system failures, system volume, and/or usage behaviors. This information is immediately made available to the Engineering, Management Information Systems (MIS), and Customer Care (CSR) Operation Decision Support Systems. This new data is then used to optimize available resources and improve the overall product, quality, and service of the network. All the real time production information is made available to Decision Support Systems so that Finance, Sales, and Senior Management may perform decisions. The ability to supply real time information to the decision makers is the essences of the matter to cost justify this new technology.

In a nutshell 'Boolean Algebra' search engine can be described as logical patterns that mimic Watson like criminal investigation approach to finding the best results.

Intelligent Components

Disclosed in pages 95-96 of "Designing Hot Billing Systems for Large Volume and/or Complex Networks", a Dissertation authored by the Applicant and published in November, 1999 and incorporated herein by reference.

"Designing Hot Billing Systems for Large Volume and/or Complex Networks", a Dissertation authored by the Applicant and published in November, 1999 and incorporated herein by reference, which was incorporated by reference in the Parent Applications Conclusions: The HBS billing also integrates the Customer Care, Provisioning and Marketing data flow of information to create inter-department synergy. The synergy modifier was not analyzed in this study, but the more reliable and faster access of information to the decision makers must have its rewards. By identifying potential dissatisfied market segments, quality of products and services, and the rationale why people churn, the research numbers can be reduced even further by an additional 30 percent to a market loss of 3 percent for the HBS. This 30 percent reduction is purely speculative but would go in accordance to benefits rendered by effective synergy and TQM of large organizations. The problem in a bureaucracy is that departments do not tend to work in unison and the information is not readily available to the decision-makers, whereas, the military genius, Julius Caesar's greatest ability was to be able to anticipate his opponent's next move by scanning the environment effectively. HBS follows this logic. Furthermore, the synergy (created by Caesar's Roman Legions) working as a single unit increased the lines of communication and organizational readiness. "Knowledge is power." General George S. Patton Jr. once said the "difference between a good and a mediocre officer is that the good officer is detail oriented." The HBS is detailed oriented and is a neural network that continuously learns and improves its understanding of the changing environment. The HBS detailed oriented neural network that continuously learns and improves its understanding of the changing environment describes: "A system for large-scale processing of data in a distributed and parallel processing environment."

Disclosed in pages 97-101 of "Designing Hot Billing Systems for Large Volume and/or Complex Networks", a Dissertation authored by the Applicant and published in November, 1999 and incorporated herein by reference, which was incorporated by reference in the Parent Applications, Implications for Future Research:

A neural network Customer Care center which automatically communicates with the Data Warehouse, NIW, HBS, and has business rules for the specific market segment will be created: the subscriber originates an inbound complaint call, which is routed to the Customer Care PBX. The PBX with the IVR, identifies the user and account.

The Customer Care Intelligent Component (IC) requests the account history from the database. This process is done already by many PBX-pop screen architectures describes: "determining, for input files, a plurality of data processing tasks including a plurality of map tasks specifying data from the input files to be processed into intermediate data values."

The IC asks the appropriate HQ2 and HQ3 for downtimes and system failures and from HQ0 the user usage patterns, connection rate and equipment reliability describes: "and a plurality of reduce tasks such (as HQ0, HQ1, HQ2, and HQ3) specifying intermediate data values to be processed."

The IC makes a data mining exploration to determine the best course of action to handle the possible churn. The values are further modified by rules concerning the specific type of problem or market segment describes: "into final output data; and assigning the data processing tasks to idle ones of the worker processes".

As the user is identified via the HBS system, the call is then routed to the "best-fit" CSR. When the call reaches the CSR, a pop-up screen will appear in the computer terminal, which will guide the CSR through the entire process. Every action and request the subscriber makes is further analyzed to better help the CSR in handling the complaint. Knowledge of system failure, product malfunctions and overall NPA (Numbering Plan Area) and NXX (Local Exchange) trends will give insight into how to reduce the subscriber anxiety or frustration. Based on this knowledge, the neural network (or HBS) will improve the productivity and tenacity of the CSR or TSR in question and the neural network knowledge based on an identified user's complain describes: "determining, for input files, a plurality of data processing tasks including a plurality of map tasks specifying data from the input files to be processed into intermediate data values" and every action is further analyzed describes "and a plurality of reduce tasks such (as HQ0, HQ1, HQ2, and HQ3) specifying intermediate data values to be processed and trends will give insight of how to reduce anxiety or frustration describes "into final output data."

The same concept can be used for TSR when making outbound calls to try to sell products and services to target market segments.

It is obvious that the battleground for subscriber churn takes place in the Customer Care Center. The ability to better monitor CSR and TSR and to improve their overall image via the use of neural network scripted screens must be researched, e.g. Airlines and Cruise lines need similar type systems to better help travel agents or angry clients.

To introduce a system to generate work orders when a customer makes a complaint or a request of change of services. Once the CSR has created a work order, the HBS system will be responsible to monitor and follow up the progress of the task. The HBS system will assign ESR to provide the maintenance or installation of services and then rate the overall effectiveness and efficiency of each task. Once the work order is completed, the HBS will close the activity and rate each individual segment according to the established business rules. Failure to accomplish a working order within business rules' guidelines should be monitored separately and sent as a report to the supervisor in charge, who is ultimately responsible. Furthermore, this work order system communicates with the provisioning intelligent component to determine resource and man power availability before committing to a time-period. The provisioning component compares the PERT activity time with appropriate business rules and/or PSC or FCC regulation and/or treaties with third parties. An ALEC or CLEC, which possess work order tracking mechanisms, would force rather quickly, an ILEC to comply with many of its business arrangements and PSC or FCC regulations. This system would document and statistically validate ILEC compliance with the law. Finally, the program should have specific algorithms that decrypt the thousands of USOC messages that is cause for great confusion. The work order system communicates with the provisioning intelligent component to determine resource and assigning the data processing tasks to idle ones of the worker processes.

A HBS (or neural network) that is able to communicate with Senior Management and helps them formulate better strategic planning. The Management Intelligent Component would make live DM and NIW explorations to find where and how subscriber dissatisfaction is being generated. The system would be able to help the manager to better use the available manpower, identify market segments with above average dissatisfaction and a report card of the effectiveness of each sales campaign. With this knowledge, managers would be able to make the corresponding adjustments to better handle the threat of losing customers. Finally, the Management component would analyze competitor trends and identify their strengths and weaknesses. This ability to anticipate the opponent's next move and have a full knowledge of inventory, manpower and resources, would help the visionary to best adapt to the changing environment. The following example would be the essence of the matter of such an intelligent component and how the HBS would help the visionary to anticipate the competitors' next move. This example comes directly from the movie Patton (1970):

1) The American Army is defeated in Kasserine by Rommel's Army.
2) General Patton immediately reads Rommel's "Tank Tactics" books.
3) Patton reorganizes the US army and through his leadership restores discipline and morale to the troops.
4) The American Army intercepts a German communication that the $10^{th}$ Panzer Division will strike at dawn.
5) Patton anticipates the Desert Fox (Rommel) next move and formulates a deadly trap.
6) The American Army successfully defeats the Desert Afrika Korps (DAK).
7) Patton says "Rommel, . . . You magnificent SOB, . . . I read your book!"

Finally, to create a feasibility study, research, and install HBS technology in a large Telecom network. From theory to practice, there is a giant hurdle to jump. The author is presently developing many of the components required to build the HBS, including:

The ability to remotely program the CO to change trunks,
Having access to the content of its internal memory buffer, and
Ability to change the network routing tables on the fly.

Imagine a call that is fully correlated and vectored before being routed. This pre-correlation architecture would simplify the data flow dramatically!

Disclosed in page 1 of U.S. Provisional patent application Ser. No. 60/184,537, filed on Feb. 24, 2000 to Paiz (a parent to this Application): "Designing Hot Billing System for Large Volume and/or Complex Networks," the author presented three experiments that favorably give a rationale for applying a neural network to process billing entities. Present systems are not able to do the complex task of performing a correlation on the fly. The Hot Billing System neural network (HBS) is able to perform said task. Here there after the HBS is known as Intelligent Component Billing System (IBS).

To accomplish said task the networks use multiple Intelligent Components (IC) that work in unison that are able to generate a billing entity for all calls. The IBS scans the environment by gathering network messages such as SS7 protocol ISDN User Part (ISUP) or Asynchronous Transfer Mode (ATM) messages and Central Office Switch (CO) Call Detail Records (CDR). This information is obtained by polling SS7 messages, and then the IC filter out all unnecessary messages, and instantiate calls once, an Instant Access Message (IAM) message is obtained from a valid Leg A subscriber for the calling party CO. All the valid messages are the scrubbed and primed to the IBS_Vector_CDR format upon scanning a Release (REL) message and then inserted into the appropriate database. When a (REL) message is received the duration, cost and value of the call are immediately determined. Multiple Intelligent Component working in unison describes "a plurality of data processing tasks" and then IC filters out all the unnecessary messages including a plurality of map tasks specifying data". All the valid messages are the scrubbed and primed describes "to be processed into intermediate data values" from the input files SS7 protocol messages. The Vector_CDR describes "into final output data".

Disclosed in pages 8-9 of U.S. Provisional patent application Ser. No. 60/184,537, filed on Feb. 24, 2000 to Paiz (a parent to this Application): It is finally an object of the present invention to provide Management Synergy. The Intelligent Component Billing System neural network is based on the principal of synergy: the (HQ3) intelligent components and its subordinate HQ2 HQ1, and HQ0 integrate working capacity help distribute the load efficiently. Furthermore, buffer resources are shared to maximize productivity. For this reason, a narrow span of control is recommended. The neural network is based on a military organization. Senior HQ coordinates and plans how, when, and where to use available resources. Subordinates must work closely together to achieve each objective successfully. The Intelligent Component Billing System neural network subordinate HQ2 HQ1, and HQ0 intelligent components describe "a plurality of worker processes executing on the set of interconnected computing systems".

Disclosed in page 9 of U.S. Provisional patent application Ser. No. 60/184,537, filed on Feb. 24, 2000 to Paiz (a parent to this Application): The IBS system has specific business rules or guidelines for trapping the data from the CO in a scheduled binary time intervals. Then the CO flushes the content of the active buffer and then the IC is able to read, filter out all unnecessary information, and prime CDR data into a table of valid IBS_Valid_CDR. Each IC has a mirror image of the routing and trunks tables a CO possesses. When a call is generated that goes through more than CO to complete the call the IBS must generate a IBS_Vector_CDR. This is accomplished by designing a hierarchical structure of IC, IDW (Intelligent Data Warehouses) and/or INIW (Intelligent Network Information Warehouse) that are divided by geographical location. These are the geographical boundaries from highest to lowest. HQ5 Domain, HQ4 Region, HQ3 LATA, HQ2 NPA, HQ1 NXX, and HQ0 EXTN. The IC communicates via IBS_Comm_Message that might notify new vector CDR trajectories, present and forecasted fuzzy state and work mode scheduled queue, of each component, resource usage, resource reserves and request, and inquiry questions and responses describes "and assigning the data processing tasks to idle ones of the worker processes" based scheduled queue of each component.

Disclosed in page 10 of U.S. Provisional patent application Ser. No. 60/184,537, filed on Feb. 24, 2000 to Paiz (a parent to this Application): The Intelligent Component Billing System architecture is composed of IC that belongs to a neural network. The distribution of the tasks has been subdivided into a hierarchy organization to better represent the network. Each intelligent component or HQ0 belongs to a parent HQ1 intelligent component. In larger networks HQ2-HQ7 might exist. Higher hierarchy components would be data warehouse (IDW/INIW) having to process 50,000 transactions per minute. The highest HQx (in this case HQ7), data warehouse (IDW/INIW) describes "an application-independent supervisory process executing on the set of interconnected computing systems".

Disclosed in page 12 of U.S. Provisional patent application Ser. No. 60/184,537, filed on Feb. 24, 2000 to Paiz (a parent to this Application): IC fuzzy states:

1) Idle: The process is waiting for a message to perform a task, which describes: "assigning the data processing tasks to idle ones of the worker processes".

2) Read: The process is reading a file or multiple packets, which describes: "determining, for input files".
3) Write: The process is writing to a file or creating protocol packets (ISUP and/or ATM), which describes "a plurality of data processing tasks including a plurality of map tasks specifying data from the input files to be processed into intermediate data values."
4) Insert: The process has new SSN calls and inserting the records, which describes: "into final output data".
5) Validate: The process is placing certainty to and existing record.
6) Pattern IN: The process is reading messages from other IC, which describes: "determining, for input files, a plurality of data processing tasks".
7) Pattern OUT: The process is writing messages to other IC, which describes: "determining, for final output data, from a plurality of intermediate data processing tasks".

Disclosed in pages 12-13 of U.S. Provisional patent application Ser. No. 60/184,537, filed on Feb. 24, 2000 to Paiz (a parent to this Application): IC active agents includes:
1) IBS_Kernel: Is the process that is responsible for administrating process priorities and available resources, to change the fuzzy state of the components, and to continuously gather statistical information of network traffic, subscriber's usages and traffic volume.
2) IBS_Comm_IN is responsible for poling messages from the different IC belong to the same parent HQ describes "determining, for input files, a plurality of data processing tasks".
3) IBS_Comm_OUT is responsible for sending messages to the different IC that belong to the same parent HQ describes "determining, for final output data, from a plurality of intermediate data processing tasks".
4) IBS_CDR is responsible for reading and priming CDR flushed by the CO into HBS_Valid_CDR describes "a plurality of data processing tasks including a plurality of map tasks specifying data from the input files to be processed into intermediate data values."
5) IBS_Vector is responsible for reading and priming SS7 protocol network messages into HBS_Vector_CDR describes "map tasks specifying data from the input files" into "final output data".
6) IBS_Stats is responsible for calculating PERT activity times, wait line scheduling queues, components benchmarks, performance statistics and resource available calculator describes "assigning the data processing tasks to idle ones of the worker processes".
7) IBS_Validate creates a valid SSN number when a new call is instantiated, inserts a billing entity once a HBS_Vector_CDR is received and updates a valid record upon matching an existing record with the data received from the matching HBS_Valid_CDR.

The IBS_Kernel send new parameters to the working processes so that they can simulate the components of other IC. Amongst the properties sent to the processes are the resources, limits, and values required to perform tasks describes "assigning the data processing tasks to idle ones of the worker processes".

The HBS system was able to handle 100 percent of the traffic at all times, while the Modern System was sluggish at best and the Legacy System was not designed for live correlation. Consequently, amongst the 3 experiments, the HBS proves to:
Be cost effective and financially viable and less complex,
Improve the value of the TQM of the organization,
Have less Downtime, and Churned subscribers,
Be able to perform a live correlation in 100 percent of the records,
Be a Better Network Traffic Management and Data Mining, and
Be a Better Customer Care and Provision System.

The present invention relates generally to the field of computer networks, data accessing and processing systems. More specifically the present invention relates to a system of computers linked into a neural simulation network, or hive, with neural elements at remote sites which mimics and is placed in parallel operation, switch by switch, with an existing call routing telecommunications network to simulate the operation of the telecommunications network. The simulation network plots a call routing vector by forwardly chaining vector links through the simulation network and relaying as a response, or echo, the vector information so that the call is placed through the telecommunications network with maximum efficiency of bandwidth usage and computer capacity. Assume, for example, that the average call has seven call detail records (CDR's). The present system correlates the billing entity locally, so that the system finds and sends only the one real CDR that the system has determined to have all the valid call components. The remaining six CDR's are thereby eliminated locally and are not transmitted to a central computer since they are redundant, and six sevenths, or 86 percent of bandwidth is saved. Thus the routing vector determines which telecommunications provider will own the call and thus determines the billing rate for the call, the rate information being incorporated into the call routing vector data. The billing rate is estimated from the moment the call is initiated, and the accuracy of the estimate increases as the call progresses so that billing takes place in real time. This billing method is known as a "fuzzy system" because it takes partial data samples and continuously projects an estimated total in real time. The more data exchanged through system messages, that is through chaining, the more accurate the extrapolation becomes, until it reaches one hundred percent accuracy. The interactive simulation creates a data warehouse virtual environment. The neural network simulation or hive describes "A system for large-scale processing of data". Neural elements in parallel describes "in a distributed and parallel processing environment". The "processing environment" describes a simulation or virtual environment. This billing method is known as a "fuzzy system" because it takes partial data samples and continuously projects an estimated total in real time. The more data exchanged through system messages, that is through chaining, the more accurate the extrapolation becomes, until it reaches one hundred percent accuracy describes the following HIVE process: "determining, for input files, a plurality of data processing tasks including a plurality of map tasks specifying data from the input files to be processed into intermediate data values and a plurality of reduce tasks specifying intermediate data values to be processed into final output data; and assigning the data processing tasks to idle ones of the worker processes".

The Hive

The Internet searchable environment or (U) can be construed as a complex network with billions of web pages. The Search engine supercomputer analyzes each web page, and then uses eigenvectors to determine the highest ranked pages from the end user's match criteria.

The Hive relates to a system of computers linked into a neural simulation network, the simulation network, which comprises a hive of relatively inexpensive, smaller computers, interlinked as a hierarchy and including parent and junction point simulation computers and, respectively, dedicated computers for performing specific tasks and other computers to provide processing power and still others at the peak of the command hierarchy to synchronize and delegate tasks among the various interlinked simulation computers with continuous automatic reevaluation and redirection in real time as taught in U.S. Pat. No. 6,614,893, filed as U.S. patent application Ser. No. 09/544,238 on Apr. 7, 2000 to Paiz (a parent to this Application) for a telecom network.

Set theory by definition is the branch of mathematical logic that studies sets, which informally are collections of objects, fuzzy set theory or simply fuzzy logic to those in the field. In set theory an object is either a member of a set or not. In fuzzy set theory this condition was relaxed so an object has a degree of membership in a set, a number between 0 and 1. Algebra of set defines the properties and laws of sets is the set-theoretic analogue of the algebra of numbers just as arithmetic addition and multiplication are associative and commutative, so are set union and intersection; just as the arithmetic relation less than or equal is reflexive, anti symmetric and transitive, so is the set relation of subset. Thus U.S. Pat. No. 6,614,893, filed as U.S. patent application Ser. No. 09/544,238 on Apr. 7, 2000 to Paiz (a parent to this Application) teaches the billing rate is estimated from the moment the call is initiated, and the accuracy of the estimate increases as the call progresses so that billing takes place in real time. This billing method is known as a fuzzy system because it takes partial data samples and continuously projects an estimated total in real time. The more data exchanged through system messages that is through chaining, the more accurate the extrapolation becomes, until it reaches one hundred percent accuracy. The interactive simulation creates a data warehouse virtual environment. A Neural Network using a Fuzzy logic is also known as generating a respective numeric representation of each the features by processing each of the features using a respective embedding function.

The Hive relates to a system of computers linked into a neural network which continuously scans and gathers information from, understands, and interacts with, an environment, a system of computers linked to form a neural network is disclosed, including a hive made up of a hierarchy of interlinked individual computers functioning as a unit, the hierarchy including dedicated computers which perform certain specific tasks, processing computers which provide processing power to the unified hive, and parent computers at the peak of the command hierarchy which synchronize and delegate tasks among the other interlinked computers and while providing continuous and automatic reevaluation and redirection in real time. The interlinking of the computers making up The Hive permits execution of strategies pre-set by the user and also permits user updating and changing of the strategies as new information becomes available. The synergistic interlinking of these several computers multiplies processing power to a level many magnitudes greater than that of a single computer running as taught in U.S. Pat. No. 7,058,601, filed as U.S. patent application Ser. No. 09/514,940 on Feb. 28, 2000 to Paiz (a parent to this Application) for a generic network.

Disclosed in Col. 2, Line 39—Col. 3, Line 3 of U.S. patent application Ser. No. U.S. Non-Provisional patent application Ser. No. 09/514,940, filed on Feb. 28, 2000 (Issued as U.S. Pat. No. 7,058,601 on Jun. 6, 2006): A computer network system is provided within a virtual environment, including several computers which are networked to each other to function as a single unit, including at least one parent computer synchronizing and delegating tasks among the several computers; so that the unit scans and gathers data from the virtual environment, and processes and organizes the data-into an implementable representation of the data describes "a set of intermediate data structures distributed among a plurality of the interconnected computing systems for storing the intermediate data values".

The unit preferably additionally includes at least one dedicated computer for performing a specific task, and at least one processing computer for providing processing power to the unit. The unit alternatively delivers the implementable representation of the data in the form of a report to a user computer terminal and awaits a decision from a human user The system preferably additionally includes a strategy program within the at least one parent computer for receiving and evaluating the implementable representation of the data and for delivering a command to another computer among the networked computers based upon the evaluation of data, so that the scanning, gathering, organizing and evaluating and delivery of commands occurs substantially in real time as conditions within the environment change. Where the virtual environment includes call links meeting at several junction points and an operating computer at each of several of the junction points, the system preferably additionally includes several simulation computers within the virtual environment imitating the function of the operating computers within the environment and linked to the unit, where at least a portion of the data gathered from the virtual environment is test data generated by the simulation computers describes "producing the final output data by applying at least one user-specified, application-specific reduce operation to the intermediate data values."

Disclosed in Col. 1, Line 65—Col. 2, Line 3 of U.S. patent application Ser. No. U.S. Non-Provisional patent application Ser. No. 09/514,940, filed on Feb. 28, 2000 (Issued as U.S. Pat. No. 7,058,601 on Jun. 6, 2006): What is further needed is a system which integrates data flow between production and management by permanently scanning the environment and converting the information into data mining, trending or statistical reports on system integrity. Such a system should provide improved resource logistics, real time data mining, trending and usage analysis.

Disclosed in Paragraph [0016] of U.S. patent application Ser. No. 09/819,174, filed on Mar. 27, 2001 to Paiz (a parent to this Application): An apparatus for performing the method is also provided, including a computer hive made up of a plurality of inter-linked computer devices having specialized functions, the computers operating in unison to create a supercomputer having shared disk space and memory, in which each node belongs to the collective and possesses its own business rules and membership to an organization managerial hierarchy.

The Hive An apparatus for performing the method is also provided, including a computer hive made up of a plurality of inter-linked computer devices having specialized functions, the computers operating in unison to create a supercomputer having shared disk space and memory, in which each node belongs to the collective and possesses its own business rules and membership to an organization managerial hierarchy. The computer hive preferably includes multiple tiers of computer clusters, including: (The HIVE apparatus describes "at a computing system comprising one or more computers, a computer in the one or more computers having a processor and a memory"

(1) a software tier in which each subscriber has its own unique club member identification which is unique to the hive and the "Software tier uses a non-transitory computer storage medium encoded with a computer program, the program comprising instructions that when executed by the client device cause the client device to perform operations."

(2) an IP tier in which multiple IP servers allocate resources to the end users to enable the end users to receive live music and to interact in a virtual environment; and (3) a billing and control tier through which the computer hive validates requests, performs live billing, and controls of all of the interactions the subscribers receive as taught in U.S. patent application Ser. No. 60/193,260 (a parent of this application and incorporated herein by reference) for IP server hosts.

Virtual Maestro based on U.S. patent application Ser. No. 09/819,174, filed on Mar. 27, 2001 to Paiz (a parent to this Application) is a product of artificial intelligence, since it would be impractical to provide a real person to process personal selections for each and every subscriber. The Virtual Maestro is represented by a virtual image, either of Beethoven or Mozart, in the virtual concert hall and will play specific song or video requests of an individual subscriber, on a pay per view basis. Alternatively, the maestro will select a series of songs of videos according to the profile stored for the individual subscriber. The profile is assembled from information the subscriber provides to become a subscriber and from a history of selections made by the subscriber through the system, and the profile is in effect how the particular subscriber is clothed in the virtual world. The payments by the subscriber for selections through the maestro are higher than for selections played for a mass of subscribers by the disk jockey, because the maestro selections are made for the particular individual. As taught by U.S. Pat. No. 7,058,601, filed as U.S. patent application Ser. No. 09/514,940 on Feb. 28, 2000 to Paiz (a parent to this application) "The HIVE continuously monitoring, analyzing and tracking particular historical information that the end user is tracking as a subscriber profile can be described as "Maintaining an interest graph based on the user's own actions thus enables up-to-date tracking of a user's interests, thereby enabling generation of personalized content based on the user's interests."

The Hive added new functionalities based on U.S. patent application Ser. No. 11/085,678 on Mar. 21, 2005 to Paiz (a parent to this Application) to allow secure firewall partitions perform encrypted peer to peer (P2P) transactions as follows:

(4) A Total Quality Management (TQM) tier, also referred as Informational Portal, including means for enabling supplier regulation of public and private area privileges, and regulation of advertising delivery system content distribution. The TQM tier gathers information with regard to selection of works and merchandise purchased by each member. This information is used, in part, to customize the advertising displayed for the particular member during the purchase of merchandise, playing of specific works, and financial transactions. The HIVE neural network performs live TQM profiles as taught by U.S. Provisional patent application Ser. No. 60/184,537, filed on Feb. 24, 2000 to Paiz (a parent to this Application), "Intelligent Components (IC) and Intelligent Data Warehouse (IDW) work. First, this computers must mimic an object, in this case a Central Office Switch and/or a data mining ad hoc end-user and/or a network traffic manager. Second, imitate the assigned object by processing input, internal, mapped and output messages running at the same time (parallel). Allowing the IC and/or IDW to have a local copy of all the information files and database tables required to process a call does this. Third, is the ability to communicate with other members of the IBS neural network and to guestimated the vector owner. Fourth, is the ability to share resources with other IC components (parent-child HQ synergy). Fifth, to be able to process live call by process SS7 ATM and/or ISUP packets. Sixth, to be able to generate live billing entity." in other words "associating the first resource with the first plurality of previously submitted search queries based on user behavior data."

(5) A Spyware tier, also referred as SNOOP, a mechanism that scans the interaction with the supplier system and interacts with the client software to help insure proper identification of the person's age and location at all times. When an end users requests to use the supplier system, SNOOP verifies that the latest version of the programs and resources are made available. This program will prohibit the access to system to those that are unlicensed.

(6) Command and Control tier, also referred as Command Center, is the brain of the system, processing the information of the environment into a lingua franca and then, based on defined business rules, sets forth criteria, resource allocation and task priorities, so that subsystems can work at maximum effectiveness and efficiency as a direct result of having a clear understanding of the environment. Upon receiving a final Billing Entity, the Command Centre distributes credits, funds, licensing and royalties, to the appropriate parties.

(7) A Security tier, also referred as Crusader Technology, defining computer software comprised of a hybrid firewall system which filters out unlicensed P2P transactions, blocks potentially pirated downloads, and interacts with a supplier system to offer a consumer the best quality, product and service, along with a comprehensive array of available shipping methods. By communicating, controlling, displaying, encrypting, managing, rendering, transferring, validating and verifying, interaction with the supplier system, Crusader Technology is able to customize, update and profile the end user by utilizing an Artificial Intelligence Point of Sale Application referred to as virtual "Customer Service Representative (CSR).

(8) An Advertising tier, also referred as Media Prophet, allows Corporations to specify distinct areas of coverage, or billing the exact territorial franchise store by ANI range, IP Address or Zip Code. Based on the end user's willingness to give information the system will negotiate the best value and then verifies that the individual has consented and has giving them the up to date credits for displaying and rendering of the advertisement they want to view. This is performed by taking into account uniqueness, demographics, and frequency or usage of advertisement with a monthly and yearly period.

(9) an Anti Malware tier, also referred as Phoenix Countermeasures, consists of an independent set of nodes that analyze the known traffic and determine patterns of behaviors to filter out copyrighted materials from the ocean of files transmitted over the Internet. This software is also responsible for killing P2P file transfers that are uploading/downloading unlicensed files. This program is responsible to modifying and updating SNOOP search patterns.

Disclosed in Paragraph [0014] of U.S. Non-Provisional patent application Ser. No. 10/135,493, filed on Apr. 30, 2002 (Abandoned): In another aspect of the invention, each computer includes security means for controlling access to the system based upon local, state, federal and international laws; means for verifying the authenticity of subscriber funds deposits; billing verification means; gambling transaction validation means; and means for generating reports relating to transactions and activities for each subscriber describes "a set of intermediate data structures distributed among a plurality of the interconnected computing systems for storing the intermediate data values".

Disclosed in Paragraph [0016] of U.S. patent application Ser. No. 10/852,394 on May 24, 2004 to Paiz (a parent to this Application): Preferably, the IP tier is also responsible for providing on-demand resources to each subscribing member. The system preferably uses a virtual reality environment as a main graphical user interface means.

"Spaghetti of the environment" is similarly same to those in the field to spaghetti code "is a pejorative phrase for source code that has a complex and tangled control structure, especially one using many GOTO statements, exceptions, threads, or other unstructured branching constructs. "Spaghetti of the environment" is named such because program flow is conceptually like a bowl of spaghetti, i.e. twisted and tangled. Spaghetti code can be caused by several factors, such as continuous modifications by several people over a long life cycle. Structured programming greatly decreases the incidence of spaghetti code.

Removing the "spaghetti phenomena" is similarly same to those in the field to code refactoring and when applied to the Internet to finding independence resources after performing a normalization process that attenuates dependent and low quality links.

UCommerce relates to a universal shopping cart as per U.S. patent application Ser. No. 10/852,394 on May 24, 2004 to Paiz (a parent to this Application). XCommerce, as defined in U.S. Pat. No. 7,809,659, filed as U.S. patent application Ser. No. 11/584,941 on Oct. 23, 2006 to Paiz (a parent to this Application) converts the massive amounts of electronic information of the Internet by transforming the content into basic language business blocks and then stores its mathematical values into Environmental Bitmaps Data Structures, so that Inventory Control Systems can quantify, qualify and match/merge the best satisfying results of an end user KEYWORD request, whereas Codex is similarly same to those in the field as knowledge and customer satisfaction inventory control encyclopedia of human ideas.

The LATIN is similarly same to those in the field to standardize each message into a lingua franca using a Hungarian notation so that all the machines can communicate amongst themselves without having to spend resources doing translations and then using business rules create a Vector CDR that is a single version of truth taking into account costs, and exact path.

Rules of semantics to those in the field is similar to Rules of language "is typically said to be governed by a group of unspoken rules: phonological, semantic, syntactic, pragmatic, prosodic, and idiosyncratic. These rules shape the way language is written, spoken, and interpreted. People create communication, not languages, phrases, or letters." (Source: http://www.artandpopularculture.com/Rules_of_language). U.S. Pat. No. 7,809,659, filed as U.S. patent application Ser. No. 11/584,941 on Oct. 23, 2006 to Paiz (a parent to this application) in particular teaches: The process of improving the Informational Certainty begins by filtering the KEYWORD search by reading, comparing validating the semantic structure of the content of the all the responses and not just the highest page ranks. The supplier system measures the value of the content by comparing the quantity and quality of Simple Joins, Blocks, Ceiling and Walls, which are another name for collections of words and grammatical rules that are used to write properly in a given language.

Deductive Reasoning approach that is a clever and more intuitive criminal investigation means that mimics Sherlock Holmes case solving techniques. A language based search engine optimizer must use as point of reference a lingua franca that is mathematical and simultaneously integrates a particular language, personal, geospatial, time and corporate information. Whereas Inductive Reasoning measures popularity scores to solve for a solution.

X_FOB is similarly same to those in the field, as requesting FOB pricing using a time dimension (X) expressed in days, whereas Y_CDIF offers door to door services including customs and duties for mission critical item using time dimension (Y) express in hours.

Z_PRICE to those in the field, once the shopping cart server has performed multiple calculations the optimal solution with "the price" is displayed to the computing device, wherein the computing device can be at least one of: the end user computer terminal, computing device and or smart device, and the like.

W_RANK to those in the field teaches a search pattern that maps optimal answers to the end user. W_RANK can be static for assisted input or dynamic when simulating an end user randomly surfing the web to find the final destination. The mathematical field of topology allows the creation of dynamic pattern using set theory rules of association, transitivity, and the combining with fuzzy logic each entity is given relevancy and likelihood value. W_RANK for search engines is the same as generating a respective numeric representation of each the features by processing each of the features using a respective embedding function, wherein each of the embedding functions is specific to features of a respective feature type.

A Cherry Picking process to those in the field can be defined by limitations taught in claim 1 of U.S. Pat. No. 7,908,263, filed as U.S. patent application Ser. No. 12/146,420 on Jun. 25, 2008 to Paiz (a parent to this Application), which states: (A) deciphering and solving an optimal search pattern mathematical equation using deductive reasoning, (B) translating the end user's language based request into a single search pattern equation, (C) obtaining information from any give language by using math in lieu of linguistics and (D) consolidating all related and significant requests into a resultant environment that contains all of the relevant and corresponding dynamic and improved hierarchical set to create an outcome optimal hierarchical sets.

The CORE List or Codex Encyclopedia, to those in the field, can be defined by limitations taught in claim 2 of U.S. Pat. No. 7,908,263, filed as U.S. patent application Ser. No. 12/146,420 on Jun. 25, 2008 to Paiz (a parent to this Application), which states: determining based on the quality of the keyword combination of the managerial hierarchical partition exists in the search pattern database, and thus having readily available and pre-processed the optimal response, requiring no further calculations, bypassing the usage of existing search engine capabilities.

The Hive performs the following:

(A) Transforms Data: cleans, standardizes and organizes the spaghetti of the environment by organizing the information into managerial hierarchy structure.

(B) Remove chaos and anarchy: Once the 'spaghetti of the environment' is eliminated creates command messages that are also known as Summary Reports that coordinate and synchronize each node to operate at maximal output capacity. Each node operates without adversely affecting the network flow of data. The Hive maximizes available throughput and limits the exponential rate of growth of complexity as the size of the environment increases.

(C) Convert Requests into Ideas: Search Engines dependency on Boolean algebra use inductive reasoning popularity scores to find the top results. In contrast, The Hive using deductive reasoning to interpret interactive input as being part of an idea being formulated by both the left and the right sides of the brain. When a request is incomplete The Hive probabilistically supplies and inserts missing gaps of information. The interactive input "providing query characters input in the query input field to a search service as a first query suggestion request."

Boolean algebra Search Engines use eigenvector algorithms to parse and filter information indices until the top page ranks are determined and displayed as output. Each search is processed from the ground up, analyzing the searchable environment, without taking into account multiple requests belonging to one session while randomly surfing the web.

The Hive uses the optimizer software residing in a computing device memory executing instructions based on rules of grammar and semantics to transform input into a search pattern as follows:

Relative Master Indices: keeps in existence for each search pattern a relative Master Index and continuously purifies and synchronizes the plurality of relative Master Index that permits to match/merge and then correlate the Internet's Master Index in real time.

Identify new significant content: The Optimizer continuously scans and detects the Internet searchable environment for new content with significant difference quality to update each search pattern's improved environment relative Master Index and top (n) pages as output.

Dynamically Updates Output: The Optimizer rank value is dynamically adjusted by matching independent variables and related keywords belonging to the search pattern to generate a content value. The Optimizer "cherry picks" the best content value web pages as output. The output is forward chained back to the end user's terminal and displayed.

Simulates the Entire Superset of valid Search Patterns: The Optimizer is a method and system for simulating Internet browser search capacities that cleans, standardizes, organizes, and transforms the massive amount of data into a lingua franca comprising of valid keywords, term clusters, and unique geospatial patterns contained in the Internet collectively known as patterns that exist in each page. The relative Master Index for each search pattern is stored and updated as crawlers detect significant changes in the environment.

BRIEF SUMMARY OF THE PRESENT INVENTION

Summary as Taught by Related Applications

As taught in U.S. Pat. No. 7,058,601, filed as U.S. patent application Ser. No. 09/514,940 on Feb. 28, 2000 to Paiz (a parent to this Application):

The Hive having a media value database that is in digital communication with The Hive that is searched to monetize and commercialize each transformed input and corresponding optimal output as follows:

Real time optimization and strategy execution system to function as a single unit, including at least one parent computer synchronizing and delegating tasks among the several computers; so that the unit scans and gathers data from the virtual environment, and processes and organizes the data into an implementable representation of the data.

Delivers the implementable representation of the data in the form of a report to a user computing device or computer terminal and awaits a decision from a human user.

Human Knowledge Entities: Continuously processes and filters raw data into primed data comprehensible for human monitoring and evaluation as a summary report object.

The computing device communicating to the Hive is in digital communication to search the Codex and a webpage database residing in the Codex that stores in memory the master index and the partial master index for each element of the Codex.

Index Refined Entities analyzes and parses through news, data and information in real time to determine portions thereof having relevance to the recently primed data received.

Personalized (Dynamic) Entities executes a set of software instructions to compare the primed data to end user-defined parameters to automatically generate output.

Proactively Identifying Significant Entities: Provides data warehousing and business intelligence analysis, should the primed data be deemed relevant.

Updating End User's Terminal: Determines the information being tracked by an end user, customizing news, data and other information based upon the particular information being tracked, and automatically updating the end user with the latest trending information.

Continuous Assessment: Performs automatic reevaluation and redirection, coordinates, controls, manages, prioritizes, and synchronizes the tasks of each subordinate node and thus "the timer being set to expire after a time period" for each task.

As taught in U.S. Pat. No. 7,050,813, filed as U.S. patent application Ser. No. 10/926,446 on Aug. 25, 2004 to Paiz (a parent to this Application)

Partial Differential Equation Vectors Model:

The Hive creates summarized information and builds a valid vector CDR that renders remaining CDR obsolete. The Hive environmental bitmaps are summarized information of the simulation network, used to maximize throughput, redundancy is eliminated minimizing saturation. The valid Vector CDR is a multi-variant single version of the truth Vector. The simulation network environmental bitmaps is the basis for the Summary Report object.

The Hive nodes summarize information of the simulation network. The Hive nodes stores informational certain summarize information of the current conditions of simulation network that is used to remove the spaghetti phenomena by normalizing the simulation environment. Now, the Hive transfers the exact conditions and route patterns of the entire network to each node, permitting every time a call is instantiated the creation and assignment of the necessary known resources to create an exact route.

The Hive solves solutions with two or more independent variable. The solution requires an equation with a plurality of independent variables. Thus we replace the traditional vector with Partial Differential Equation Vectors using Set Theory and then solves for the independent variables (I, J, K), to create a billing entity and resultant vector. The node controlling Partial A functions (alternatively know as a subscriber) creates a final resultant vector that includes all the circuits.

As taught in U.S. patent application Ser. No. 10/852,394 on May 24, 2004 to Paiz (a parent to this Application)

The Hive functions and characteristics are as follows:

Computer Network System: Consists of a plurality of artificial intelligence nodes, programmed to perform predefined tasks based on the current conditions of the environment.

CPU Nodes: are autonomous and in real time analyze, evaluate, gather and process information from the environment. From incipiency upon receiving the fuzzy logic piece of information that triggers a new or updated task.

Managerial Hierarchy: All nodes are configured into a managerial hierarchy, the Upper tiers control and coordinate and the Lower Tier constitutes the workhorse of the system.

Synergy: Every predefined cycle each node synchronizes the latest inventory. Nodes request siblings for any excess buffer resources to complete a task using vertical and lateral synergy. Parent nodes use their chain of command to coordinate their subordinates.

Eliminates the Spaghetti Phenomena: standardizes raw information into primed data so that Information Certainty is achieved and thus removes the Spaghetti Phenomena.

Primes Vector or Call Detail Records (CDR): Lingua franca messages or vectors contain the trajectory and all transactional segments information. Each assigned hierarchical owner plots the vector trajectory so that nodes can communicate amongst themselves via forward and reward chaining.

Avoids Taxing the Throughput: Upper nodes use environment bitmap information to control and coordinate the traffic in order to avoid taxing available throughput.

Maximal Throughput: Bitmap information permits each node via synergy to shares resources with other nodes with substantial buffer to eliminate the tax burden and waste.

Analyzes Network Traffic: Informational traffic is measured allowing nodes of each tier perform the non-obvious task synchronizing and managing their subordinates to use synergy to minimizing waste before permitting data to be transmitted through their chain of command.

Informational Certainty: Nodes remove waste at incipiency, so the computer network system can be considered a real time invention.

Stabilizes the Flow of Information: The managerial hierarchical stabilize the flow of information and allows nodes to use synergy to work as a single unit permitting the computer network to create a virtual instance of the organizational environment.

Real Time System: Once the spaghetti phenomena is eliminated, informational certainty is achieved. The system rearward chains the routing vector through the simulation network to the point of origin and analyzes and evaluates the best usage of network resources.

As taught in U.S. Pat. No. 7,809,659, filed as U.S. patent application Ser. No. 11/584,941 on Oct. 23, 2006 to Paiz (a parent to this Application):

XCommerce, is a method that simulates the entire superset of potential valid interactive input regular expression requests construed during an Internet browser search and converting the results set into a vector based statistical data that enable efficient and accurate searching. Indexing searches as follows:

Managerial Hierarchical Index Relationships: a request is broken down into keywords and clusters, and then converts them into a search pattern. Keyword and clusters are also known as one or more token, certain parameters to a search and plurality of features of a resource, wherein each of the features is of a different feature type;

Determining what is Relevant and Irrelevant: Pages that match a Relationship Index are relevant, and those that do not are irrelevant.

The Internet environment is a super block that is partitioned into a managerial hierarchy. The primary index relationship creates blocks, then secondary index relationship creates sub blocks and, afterwards the tertiary index relationship creates mini blocks. "Index Relationships are also known as embedding functions"

Identifies Static Search Patterns: The computer network system determines if the search pattern already exist and if yes sends the output to the end user.

Calculates Dynamic Search Patterns: The system uses managerial hierarchical relationship indices to create optimal size partitions and probabilistically determines a match. When a match occurs the Optimizer picks the top (n) pages with the highest values.

Finds New Search Patterns: Stores each new search patterns and top (n) pages.

Displays Top (n) pages: Sends and displays the output in an order to the end user.

As taught in U.S. Pat. No. 7,908,263, filed as U.S. patent application Ser. No. 12/146,420 on Jun. 25, 2008 to Paiz (a parent to this Application):

A search engine optimizer, hereinafter referred as Cholti, gathers interactive input from a browser. The optimizer reorganizes the interactive input as optimal input that is sent to the search engine, and then the output is sent to the end user. Each request is converted into a search pattern and stored as a mathematical equation that mimics the left (linguistics) and right (geospatial) side of the brain. The mathematical equation is used in lieu of linguistics.

Codex, as defined in U.S. Pat. No. 8,386,456, filed as U.S. patent application Ser. No. 12/785,122, filed on May 21, 2010 (a parent of this application):

Codex, is a comprehensive collection of search patterns that are stored in a managerial hierarchical manner. The HIVE lingua franca consists of a plurality of concurrently operating block domains, and the sum of all the blocks is the Internet.

Each computing device is in digital communication to search the Codex. The webpage database residing in the Codex stores in memory the master index and the partial master index for each valid interactive input regular expression request or element of the Codex:

Lottery mathematics: Cholti, and Codex using the benefit of U.S. Pat. No. 7,809,659, filed as U.S. patent application Ser. No. 11/584,941 on Oct. 23, 2006 to Paiz (a parent to this application) and U.S. Pat. No. 8,676,667, filed as U.S. patent application Ser. No. 12/764,934 on Apr. 21, 2010 to Paiz (a parent to this Application) teaches how to improve accuracy of a requests by using independent variables (I, J or K) to map and create managerial hierarchical partitions of the Internet environment such as: from top to bottom superset (I), set (I, J) and subset (I, J, K) datasets.

Hot and cold analysis: uses logic mathematics to estimate the size of the environment as the end user types interactive input.

Simulating the Human Brain:

Human Brain: Each linguistic Glyph is assigned to the [L] left side of the brain and each geospatial Glyph is assigned to the [R] right side of the brain and the Anchor is the best common denominator Glyph.

The dominant tendency of each request is given a [L] linguistic, and [R] geospatial tendency, and then Cholti reorganizes, maps and plots the Glyphs to create a managerial hierarchical relationship index.

Human Brain Intelligence: Transforms each search pattern and identifies independent variables based on mass partitions of the Internet and creates join, simple, hybrid, complex and optimal pyramids (layers of refinement).

Human Brain Wisdom: analyzes the top (n) pages and expands each [AX], [BX] and [CX] Glyph equation with key featured association dependent variables.

Cholti picks one of four search strategies: [LL], [LR], [RL], and [RR], which have different set of business rules to analyze the Internet and limits partitions not to exceed 1 billion or (2^30) pages and thus eliminates the principal confounding variable, which is the exponential rate of growth of the environment.

[L+R] Managerial Relationship Events

If the independent variable (I) is represented by the Historical Event "American Civil War"{1863}, where "American Civil War" is the left side of the brain variable (I) and 1863 is the right side of the brain (X), and are merged to a single event or superset (I!).

Gamma Functions

Cholti and Codex, using the benefit of U.S. Pat. No. 7,809,659, filed as U.S. patent application Ser. No. 11/584,941 on Oct. 23, 2006 to Paiz (a parent to this Application) and U.S. Pat. No. 8,676,667, filed as U.S. patent application Ser. No. 12/764,934 on Apr. 21, 2010 to Paiz (a parent to this Application), teach how to create search patterns that improve the accuracy of a request. The likely and unlikely analysis uses Gamma functions to solve for the size of the environment.

For example: the end user types 1863 American Civil War, and the Optimizer maps using [L] left side of the brain term cluster "American Civil War" and with [R] right side of the brain 1863 to create "American Civil War" (1863). The "War between the States" is also synonymous with the "American Civil War", and thus "between the" which are dependent variables since they have a mass less than 1. The Dominant Tendency and the keyword "States" which has a mass of 1+ is likely. The keywords (1861, 1862, 1864, and 1865) are unlikely.

Partial Differential Equations: When using Partial Differential Equations usually the solution is not unique due to the fluid and dynamic conditions of the search process, and ergo input combination usage behavior directly affects the size of the environment (or boundary of the region) where the solution is defined.

2003 (issued as U.S. Pat. No. 6,614,893 on Sep. 2, 2003) and U.S. patent application Ser. No. 09/514,940, filed on Feb. 28, 2000 (issued as U.S. Pat. No. 7,058,601 on Jun. 6, 2006) that is absent of the spaghetti phenomena and is organized in several layers of refinement to eliminate the exponential rate of growth the primary confounding element of the search process, and furthermore, having Vector V that is a single version of the truth that is absent of redundancy, spam and virus links. When performing said task the system correlates the content of each paragraph, and page belonging to the same site. The system primes each paragraph, and this is when confounding data is eliminated by supplying the missing gaps of information.

In U.S. Pat. No. 7,809,659, filed as U.S. patent application Ser. No. 11/584,941 on Oct. 23, 2006 to Paiz (a parent to this Application), Rules 118, 119 and 120 teaches a neural network how make concise, precise and optimal searches after using lexical features layers of refinement for each search pattern.

U.S. Pat. No. 7,908,263, filed as U.S. patent application Ser. No. 12/146,420 on Jun. 25, 2008 to Paiz (a parent to this Application) teaches how a neural network mimics the human brain, and performs a comparative analysis of a plurality of requests, eliminates confounding data by supplying missing gaps of information, primes the actual content of the optimal environment paragraph by paragraph to elucidate the best fitting content recommendation. "Mimics the human brain is also known as a Deep Network"

U.S. Pat. No. 7,809,659, filed as U.S. patent application Ser. No. 11/584,941 on Oct. 23, 2006 to Paiz (a parent to this Application), U.S. Pat. No. 7,908,263, filed as U.S. patent application Ser. No. 12/146,420 on Jun. 25, 2008 to Paiz (a parent to this Application) and U.S. Pat. No. 8,868,535, filed as application Ser. No. 13/247,964 on Sep. 28, 2010 (a parent to this Application) teach the following:

| TIER 1 | Join Pyramid | 1,000,000,000 pages | 50%-60% accuracy | [[Vague Search]] |
| TIER 2 | Simple Pyramid | 1,000,000 pages | 61%-85% accuracy | [[Concise Search]] |
| TIER 3 | Hybrid Pyramid | 10,000 pages | 86%-95% accuracy | [[Precise Search]] |
| TIER 4 | Complex Pyramid | 100 pages | 96%-99% accuracy | [[Optimal Search]] |
| TIER 5 | Optimal Pyramid | Final destination | 100% accuracy | [[Direct Search]] |

As taught in U.S. patent application Ser. No. 11/085,678 on Mar. 21, 2005 to Paiz (a parent to this Application):

The Valorized Optimal Advertisement maximizes customer satisfaction and measures accuracy and media value to the Corporate Sponsor.

The Shopping Cart uses the managerial hierarchical relationship index to obtain the human brain equation that contains the probabilistic weight of each valid Glyph to gain factor or attenuate advertisements decisions.

As taught in U.S. patent application Ser. No. 13/247,964—Issued as U.S. Pat. No. 8,868,535 (a parent of this application and incorporated herein by reference)

Codex, using the benefit of U.S. Pat. No. 7,809,659, filed as U.S. patent application Ser. No. 11/584,941 on Oct. 23, 2006 to Paiz (a parent to this Application) and U.S. Pat. No. 8,676,667, filed as U.S. patent application Ser. No. 12/764,934 on Apr. 21, 2010 to Paiz (a parent to this Application), cleans, organizes, inventories, standardizes and mirror image of the existing Internet environment. The mirror image of the existing Internet environment is a neural network which continuously scans and gathers information from, understands, and interacts with, an environment as per U.S. patent application Ser. No. 10/603,963, filed on Jun. 25, "Join Pyramid, Simple Pyramid, Hybrid Pyramid, Complex Pyramid, and Optimal Pyramid are also known as Neural Network layers for classification of the input or generating an alternative representation of the features of the resource"

When referring to the final destination: The global, regional and local scope may differ. For example: a (local) map may be valid, the (global) home page of the company and an (global) encyclopedia definition or (regional, local) news item; nevertheless if a checkmate combination is found, the user's intent is known.

As taught in U.S. patent application Ser. No. 13/777,775—Issued as U.S. Pat. No. 8,977,621 (a parent of this application and incorporated herein by reference)

Build the Summary Report Objects

A. The Hive neural network simulates the entire superset of valid interactive input regular expression construed during an Internet browser search and then organizes and distributes the searchable environment using at least one index relationship, and then hierarchically creates a chain of command comprising of super blocks, blocks, sub blocks, mini blocks and elements. The entire managerial hierarchical chain of command is index refined, wherein each position probabilistically maps an improved environment with a corresponding partial master index that ranks in order of value from highest to lowest each site and web page.

Transform Interactive Input into Search Patterns

B. Assigning to each unit (or position) of the chain of command a search pattern.

C. Storing each valid search pattern into the 'CORE List' database.

D. Setting a vector value to search pattern based on estimated environment size and the partitioning the interactive input into keywords and clusters that are transformed into Glyphs.

Transform input keywords and clusters into a Glyphs (vector) based search patterns.

Assign a vector value to each Glyph depending if they are independent, dependent or complement variables. Independent variables are synonymous with index relationships.

Create the Improved Environments

E. Each position of the chain of command is a partition of the Internet searchable environment and can be referenced from the 'CORE List' using index relationships. The index relationships of each search pattern are used to create an improved environment.

F. For each element of the 'CORE List' statistically normalize and data integrate each site and web pages belonging to each improved environment into a partial master index.

Likelihood Analysis

G. Measures inductively each element of the 'CORE List' using the Likelihood Analysis applying associative and transitive relationships to synthesize linguistic and geospatial information key featured associations. The key featured associations and transitives are dependent and complement variables gain factor the vector value of each page.

Relevancy Analysis

H. Measures deductively each element of the 'CORE List' using the Relevancy Analysis applying rules of association and transitivity to identify confounding variables. Assign to each unit object a feedback equation that attenuates content with confounding variables in order to stabilize and reduces sensitivity parameter variations due to the environment.

Storing and Updating the 'CORE List'

The Hive Stores the latest top (n) results or the summary report in the 'CORE List' database as follows:

First when Interactive Input:

A. Identify each keyword and cluster interactively belonging to the input and immediately convert input into index relationships.

B. Query the 'CORE List' to map the most probable position (or unit object).

C. Display to end user the estimated environment size of the input and the improved environment size using the most probable position (or unit object).

(i) Static Output: Determine if the most probable position contains the final destination and, if yes, then displays the summary report object to the end user. The output is readily available and preprocessed no further calculations are required.

(ii) Dynamic Output: Obtains the key featured association and transitives and feedback equation of the most probable position (or unit object) and correlate the results. Set a vector value to each page, using the hot algorithm to gain factor key featured association and transitives and the cold algorithm to attenuates the vector value of each page.

D. Displays top (n) pages: Sends and displays the output in an order to the end user. Second when Assisted Input:

A. Identify each keyword interactively and offer Assisted Input command instruction to the end user. Each Assisted input maps the index relationship belonging to a unit object.

B. Obtain decision from end user and the selected unit object from 'CORE List'

C. Display to end user the selected assisted input from the 'CORE List'

Third when Smart Input:

A. Obtain the right side of the brain check mate combination Global Positioning System (GPS) coordinates and identify the commercial Glyph of the interactive input. Then transform the commercial Glyph and GPS coordinates into smart input and derive the index relationship that maps a unit object.

B. Query the 'CORE List' to map the most probable position.

C. Display the 'CORE List' optimal output based on GPS coordinates.

D. Determine if a valid static output exist. If yes, the output is readily available and no further calculations are required. If no create the Dynamic Output and display Fourth when Personal Input:

A. Identify interactive, assisted and smart input and convert input into an index relationship that maps a position (or unit object).

B. Query the 'CORE List' to map the most probable position.

C. Offer a Personal Input list of command instruction to the end user. Each element of the list is obtained by performing the Hot/Cold analysis of the most probable position.

D. Obtain Personal input decisions from end user.

E. Interactively display to end user the input and corresponding optimal output.

F. Once the confounding variables are eliminated display the final destination.

Improved Environment: A search pattern indexes the searchable environment using index relationships to create an improved environment. The primary index relationship picks a relevant environment that is built using a reverse chaining algorithm to map between 1 and 2 billion pages. For example: Animal would include vertebrate or invertebrate, mammals or birds.

For example, when Tiger is selected at least one relevant environment is available, first is Animal relevant environment, another is the Military relevant environment, and finally the Sports relevant environment. Animal is [LL], Military is [LR], and Sports [RR] search patterns. Why do you ask? Well, [LL] is Tiger that is an animal, whereas [LR] is a tank that was used in WWII (1939-1945), whereas [RL] Detroit Tigers is a commercial Glyph or smart input that contains a right brain checkmate. Nevertheless, each unit objects of Tiger yield an improved environment, since each valid unit object is considered its own environment. Each improved environment has a partial master index that maps each page and site with a value.

Optimal Solution: Once a search pattern yields the final destination, the human brain has a left side and right side checkmate combination and thus a direct search.

As taught in U.S. patent application Ser. No. 14/013,018 (a parent of this application and incorporated herein by reference)

Direct Searches

Interactively discovers command instructions that eliminate confounding variables to modify the search pattern in accordance with the instructions from the end user that creates a direct search or personal input that automatically yields the final destination.

Online Purchasing System

The Shopping cart, a computing device software application, performs advertisement, financial resource management, inventory control and online purchasing in real-time facilitating the ads and logistical distribution of door-to-door goods using a chosen shipping method.

X_FOB Method for the Internet

The X_FOB method furnishes free content, offers paid content using the proceeds derived from Advertisements, and makes paid downloadable product available upon the checkout command instruction is received.

Y_CDIF Method

The Y_CDIF method finds the best Price per Unit (P/U) product, whereas Rush adds time as a dimension for figuring out the optimal inventory delivered door to door.

Advertisement Method

The Advertisement Module offers sponsored command instructions comprising targeted links and target Automatic Number Identification (ANI) prioritized using supply side economics (bids) to the end user and compensates them for watching or sharing their information to purchase licensed P2P audio and video works. Furthermore, displays valorized optimal advertisements to consent the sharing of information with corporate sponsor and receive credits to purchase audio and video works.

As taught in U.S. patent application Ser. No. 14/028,508 (a parent of this application and incorporated herein by reference)

Informatics Set Theory Constructs Based on Semantics and Human Knowledge

Core List Elements Rules

Before doing any calculations, existing inductive reasoning search engines partition the Internet based on language and then subdivide and optimize based on country.

Rule 1: Searchable Environment: Deriving zero index relationships and using the Internet (U) as the environment and ranking each web page to the master index. Therefore, each page belonging to Internet environment is normalized and probabilistically ranked.

Rule 2: Improved Environment: Using primary index relationship (I) to subdivide the Internet to create Block (I) to map an improved environment attenuating any page not belonging to block (I). For example: Block (I) is "AMERICAN CIVIL WAR".

Rule 3: Optimal Environment: Using primary index relationship (I) and then nesting secondary index relationship (J) to subdivide the Internet to create sub block (I, J) to map an optimal environment attenuating any page not belonging to sub block (I, J). For example: Sub Block (I, J) is "AMERICAN CIVIL WAR"+ROBERT E. LEE.

Rule 4: Optimal Dataset: Using primary index relationship (I) and then nesting secondary index relationship (J) and then nesting tertiary index relationship (K) to subdivide the Internet to create mini block (I, J, K) to map an optimal dataset attenuating any page not belonging to mini block (I, J). For example: Mini Block (I, J, K) is "AMERICAN CIVIL WAR"+ROBERT E. LEE+BATTE OF GETTYSBURG.

Rule 5: Partial Master Indices: Ranking for each partition each web page to a relative master index. For example: each Super Block relevant environment ranks 1 billion pages, each Block (I) improved environment 1 million pages, each Sub Block (I, J) optimal environment ranks 10,000 pages, and each Mini Block (I, J, K) optimal environment ranks 100 pages. Combining with U.S. Pat. No. 7,809,659, filed as U.S. patent application Ser. No. 11/584,941 on Oct. 23, 2006 to Paiz (a parent to this Application) which teaches a Super Block a join layer of refinement, Block (I) is an Simple layer of refinement, a Sub Block (I, J) a Hybrid layer of refinement and Mini Block (I, J) is a complex layer of refinement, and Final Destination is an Answer layer of refinement.

Rule 6: Grouping of Concepts: Binding and mapping the block (I) into the Internet environment (U), the Sub Block (I, J) into the Block (I), and the Mini Block (I, J, K) into the Sub Block (I, J). Partitioning the Internet grouping each human knowledge concept applying rules of semantics and grammar of the specific language Internet (U).

Rule 7: Managerial Hierarchy of Concepts: Hierarchically subordinating each relative master index to their parent the relative master index and also subordinating the chain of command to the master index. Each page belonging to a Block (I) belongs to their parent Super Block (U) that belongs to their specific language Internet (U). In a first example: Managerial hierarchy of concepts is Dogs (I)→Animals (U)→English Internet (U).

Rule 8: Geospatial partition: Each Block (I) is a geographic area. For example: USA (I)→North America (U)→World (U) and (North Miami Beach|33160) (I, J, K)→Florida (I, J)→USA (I) used for smart input right side of the brain checkmate combinations.

In an example, organize all human laws and then store all of them in a single site, consisting millions documents in multiple languages and belonging to a plurality of countries; and picking for each combination the top 1 million documents. The first step would be to subdivide based on category, in this case language, thus the Superblock of laws, would be categorized based on language and further subcategorized by country, thus (English+USA) laws.

Now, we want to further optimize (English+USA) laws side of the site, by organizing the documents into a managerial hierarchy using geospatial independent variables (I, J, K); where (I) represents USA and all federal laws; (J) represents state laws, such as Florida; and (K) represent local laws such as Miami. At this point a user could use his Managerial hierarchy of concepts to perform the following searches: FIRST: "FS" is translated into (I, J) or (USA, FLORIDA) for Florida Statutes. SECOND: The user adds the keyword "718" that is translated into Condominium law. THIRD: The user edits the request to FS 718.504 that maps the prospectus section, and then further refines the search to FS 718.506 1(d) to map statutes of limitations of publication of false and misleading information to yield the optimal output: "Under no circumstances shall a cause of action created or recognized under this section survive for a period of more than five (5) years after the closing of the transaction".

The State of Florida legislature organized the Florida Statues into a hierarchy of concepts. In this case FS is the block, 718 is the sub block, 718.506 is the mini blocks, and 718.506 1(d) is an element. Other hierarchy of concepts examples: the bible and encyclopedias.

Static Analysis Rules

Rule 9: Human Concepts (or Glyphs from U.S. Pat. No. 7,908,263, filed as U.S. patent application Ser. No. 12/146, 420 on Jun. 25, 2008 to Paiz (a parent to this Application)): Identifying a [L] left brain linguistic based checkmate combination when three (3) directly related linguistic index relationships (I, J, K) exist. In a first example: (1) "AMERICAN CIVIL WAR" (2) Add Robert E. Lee (3) Add Gettysburg. (1-3) becomes Historical Event BATTE OF GETTYS- BURG. (1) Block (I) is "AMERICAN CIVIL WAR" (2) has ROBERT E. LEE as (J) and (3) has BATTE OF GETTYSBURG as (K). The Human Concept Gettysburg is not used for GPS coordinates (smart input), but instead for the American Civil War battle.

Rule 10: Geospatial Data: Analyzing using [R] right side of the brain to map and plot each recognized geospatial independent variables glyphs into index relationships and then establishing the primary filter as the primary index relationship (X), the secondary filter as the second index relationship (Y), and the tertiary filter as the third index relationship or (Z). For example: 33160 automatically becomes USA (X)+FL (Y)+(33160|North Miami Beach) (Z).

Rule 11: Vector Addition: Adding the vector value of each index relationship into a resultant geospatial vector value that determines the significance level. For example: The vector value of (USA, FL, North Miami Beach, 33160) is a precise search with 10,000 web pages.

Rule 12: Geospatial Vector Addition: Using the resultant geospatial vector value to determine the smallest partition of the Internet that will serves as point of origin for the search process. For example: Vector (USA, FL, North Miami Beach, 33160) or (x, y, z, w) is a subset of the visible environment (USA, FL) with 1,000,000 reasonable pages, that maps an improved environment with 10,000 probable pages, attenuating any page that is not close the computing device GPS coordinates of the center point of the zip code to render and display direction map.

Rule 13: Hot and Cold Algorithm (or Usage Pattern of Behavior or Interest Graph): Relevant keywords and concepts become independent variables, and attenuate irrelevant keywords and concepts. In a first example: Battle of Gettysburg, maps "American Civil War USA Pennsylvania Gettysburg July 1863" keywords as independent variables, and attenuates 1861, 1862, 1864 and 1865, knowledge of the facts makes them irrelevant.

Rule 14: Plotting Geospatial Vectors: Comparing the resultant geospatial vector value against mass limits to determine how many linguistic index relationships exist. In another example: The user types or says the keyword WALMART the input becomes a smart input and transforms the keyword WALMART into a commercial concept and uses the computing device GPS (X, Y, Z, W) components map an optimal search with four (4) independent variables.

Rule 15: Master Index: Deriving no index relationships and using the Internet (U) as the environment and using a popularity probability to rank each web page uniquely.

Rule 16: Partitioning: Deriving one (1) geospatial index relationship and subdividing the Internet using primary index relationship to create a block (X) to attenuate any page not belonging to block (X). For example: The geospatial keyword France attenuates any page that does not make reference to the keyword France (X).

Rule 17: Sub partitioning: Deriving a two (2) geospatial index relationship and subdividing the Internet nesting the primary and secondary index relationships to create a sub block (I, J) and attenuating any page not belonging to sub block (X, Y). For example: "USA+PA" as (I) and "GETTYSBURG" as (J) are joined to map Set (I, J) with 10,000 probable pages.

Rule 18: Index Refinement: Deriving a three (3) index relationship and subdividing the Internet nesting primary, secondary and tertiary index relationships to create a mini block (I, J, K) attenuating any web page not belonging to mini block (X, Y, Z). For example: When the three related independent variables: "AMERICAN CIVIL WAR" (I), "GENERAL ROBERT E. LEE" (J), and "GETTYSBURG" (K) are join together to create a search pattern, the geospatial keywords {USA, PA, Gettysburg} and the Date: Jul. 1-3, 1863 are use to gain factor pages in the analysis as being superior. Furthermore, U.S. Pat. No. 8,676,667, filed as U.S. patent application Ser. No. 12/764,934 on Apr. 21, 2010 to Paiz (a parent to this Application) teaches Index Refinement up to the respective (nth) level index relationship.

Dynamic Analysis Rules

Rule 19: Substitution: Substituting (I) when null with (X), substituting (J) when null with (Y), substituting (K) when null with (Z); For example: the user types "33160" is transformed into a smart input, and (I) maps "USA", (J) maps "FLORIDA", and (K) maps 33160, Aventura. A concept category may substitute (I) and sub category (J) when null.

Rule 20: Smart Input: Identifying [R] right brain checkmate combinations when three index relationships or GPS (X, Y, Z) coordinates exists. For example: The computing device converts a "WALMART" search pattern into smart Input, by adding the GPS (X, Y, Z) coordinates, and renders a map using parameters" (USA, FL, Aventura, 33160).

Rule 21: Smart Search: Performing deductive reasoning by adding the index relationships of [LR] both sides of the brain to create a resultant equation vector value that determines the significance level. For example: smart input WALMART (USA, FL, Aventura, 33160) has four independent variables first "WALMART", second USA+FL, third City of Aventura and fourth Zip Code 33160, and the device console GPS (X, Y, Z) coordinates.

Rule 22: Smart Partitions: Using the resultant equation vector value to determine the smallest partition of the Internet that will serves as point of origin for the search process. For example: input WALMART (USA, FL, Aventura, 33160) has a partition comprising the valid pages that are located within X miles of the user's computing device GPS (X, Y, Z) coordinates.

Rule 23: Category: Assigning each index relationship to concept (or Glyphs or feature attributes) relevant to the search category. For example: Input WALMART (USA, FL, Aventura, 33160). The category for "WALMART" is a commercial concept (or glyph or feature attributes) that yields direct sales via www.walmart.com, or by directing the user to the store addresses closest to the user's computing device GPS (X, Y, Z) coordinates. "WALMART" based on the encyclopedia human knowledge category is also related to its competitors "TARGET", and "BEST BUY", which are also commercial concepts (or Glyphs).

Rule 24: Rule of Relevancy: Identifying the most relevant codex pages based on the index relationship and obtaining the top (n) web pages of each category and the optimal inventory control data structure containing "related objects". For example: "WALMART" becomes the commercial Glyph for the multinational store chain of supermarkets, and the human knowledge encyclopedia with display as output corporate information, mapping for computing devices, news, and www.walmart.com in order to be able to purchase online, in addition offer related searches. Rules of relevancy are what discover key featured or feature attribute associations.

Rule 25: Human Knowledge Related Concepts: Analyzing the related objects to find missing gaps of information. For example: When searching a Summary Report object displays the optimal dataset of a specific search pattern, whereas the related searches are similar objects that are trending or have similarly same characteristics, that might attract the end user's attention. Leonardo Di Vinci, will have as related searches Michelangelo, and Rafael Sanzio maestros, and the master pieces of Mona Lisa and the Last Supper paintings to name a few.

Rule 26: Events: Matching, mapping and mixing pair combinations of two categories against each other to determine direct relationships and relevancy between two (2) categories.

Rule 27: Hot Algorithm (Interest Graph): Emphasizing high probability categories combinations associated to the mathematical equation that yields the final destination.

Rule 28: Cold Algorithm (Satisficing and Churn): De-emphasizing low probability categories combinations associated to the mathematical equation that yields the final destination.

Rule 29: Assisted (Alternatives) Search: Integrating index relationships (I) and (X) into event (I!) and deriving the index relationships using the event (I!) to create element (I, J, K).

Rule 30: Smart Search: Integrating index relationship (J) and (Y) into event (J!) and deriving the index relationships using the event (J!) to create element (I, J, K) and Rule 31: Direct Search: Identifying [LR] left and right brain checkmate combinations when six index relationships or (I, J, K, X, Y, Z) exists.

Index Refine Rules

Rule 32: Normalizing Content (Cherry Picking): Reading, validating and confirming the content of top ranked valued (n) responses belonging to the optimal sized environment.

Rule 33: Inventorying Content: Validating the best responses based on content value. For example: Thorough analysis elucidates the page with the highest relevant content.

Rule 34: Organizing Knowledge: Selecting the best fit element subdivision to create the optimal sized environment. For example: When creating new elements to the chain of command picking the search pattern with the highest information certainty and thus accuracy.

Rule 35: Cherry Picking: Picking the best fit content and top ranked valued (n) responses as output. For example: Selecting the Summary Report containing the optimal dataset.

Rule 36: Arranging Output: Sending and displaying output to a user's terminal. For example: The output is sent to the end user's console device arranged in an order (highest first).

Renew Indices Rules

Rule 37: Respective (nth) Level Purification: Simulating for each codex page the optimal environment in real time and assigning a relative master index. For example: Each summary report object indexes the preprocessed optimal output comprising of the top (n) pages.

Rule 38: Respective (nth) Level Synchronizing: Continuously scanning the environment and updating each codex page as each new web page is identified having a higher value than the lowest value stored web pages; associate the new web page to the codex page; disassociate the lowest valued web page to the codex page; storing and updating changes in real time to the codex pages. For example: The content of the encyclopedia is updated in real time as significant new documents are detected keeping up to date all the preprocessed optimal output.

Rule 39: Real Time Encyclopedia (Linguistic Word Pattern from U.S. Pat. No. 7,809,659, filed as U.S. patent application Ser. No. 11/584,941 on Oct. 23, 2006 to Paiz (a parent to this Application)): Continuously storing and updating in real time the at least one collection of top (n) web pages, and the top (n) sites geospatial information. For example: To bypass the search engine capacities once the optimal output for a search pattern changes, the Encyclopedia database updates the summary report object with the latest information.

Rule 40: Respective (nth) Level Optimizing: Continuously storing and updating in real time relative master index belonging to each codex page. For example: Once an optimal dataset of the Codex changes the relative master index is updated in real time.

New Master Indices Rules

Rule 41: Master Index Scheduling: Determining at predefined time intervals ("determining, when the timer has expired") the total number of web pages in the codex and for each codex page in its chain of command. For example: The system continuously verifies the entire content of the Internet, in particular when a new master index is created. Once the new master index assigns new probabilities to each document, each relevant element of the Codex of human knowledge is updated if the optimal dataset changed.

Rule 42: Master Index Synchronization: Determining at predefined time intervals ("determining, when the timer has expired") the total number of significant difference changes in the Internet and then revaluing each site that updated one of its top ranked (n) web pages. For example: When significant content changes triggers the creation of a new partial master index, the new documents not existing in the master index are incorporated, and each relevant element of the Codex is updated if the optimal dataset changed.

Rule 43: Master Index Trending: Purifying, mapping and plotting each element of the old master index into the new master index using the content value of the relative master index of the highest vector valued codex page. For example: Once the system scans, gathers, trends and updates the (massive) latest significant difference changes of the Internet, the old master index is updated and transformed into a new master index reflecting the current conditions.

Rule 44: Master Index Renewal: Continuously creating, storing, synchronizing and updating in real time the (massive) new master index and relevant Codex summary report object.

Rule 45: Real time Master Index: Purifying, transforming and updating new master index and in turn the codex and the entire (massive) chain of command of codex pages.

Variance Sampling of the Searchable Environment

[AX]: The Boolean algebra or Searchable environment analysis of the Internet environment eliminates from calculation any page without a valid Inventory.

Valid Inventory: Means that a page matches at least one keyword of a given search pattern, where based on the content, trending and quality of the site a given page can be consider to have a fuzzy state such as 1=improbable, 2=reasonable, 3=probable, 4=most probable and 5=final destination, while randomly surfing the Internet.

[BX]: A Gamma function measures the search pattern based on the number of independent variables to adjust the size of the environment. [BX] can be categorized as follows: (x) AS IS: classical inductive reasoning search for the past 40 years, (y) Assisted Input: matches exactly a human knowledge concept, idea or trending combination of keywords, (z) High quality search: use reference sites only, (w) Smart Input: right side of the brain checkmate combination using GPS coordinates, (+++) a direct search, where input automatically maps output.

[AX]: Eigenvectors eliminate irrelevant pages belonging to the Internet environment map a searchable environment for each search pattern object, and in turn becomes the new relevant Internet (U) that is further index refined to create the

[BX, CX, DX, and EX] layers of refinement in order to inventorize the content of each page and site.

[BX]: Gamma function attenuates improbable pages to create the improved environment that is a subset of the searchable environment after normalizing the probabilistic spatial environment to remove redundancy, spam and virus links. The Codex for each Search Pattern creates the [BX, CX, DX and EX] layers of refinement or "neural network set of intermediate reduction data structures" and stores the top (n) pages into a partial Master Index.

[CX]: First Index Refinement attenuates reasonable pages from calculation. [DX]: Second Index Refinement attenuate probable pages from calculation. [EX]: After [BX] performed the first variance sample size and then [CX] the second variance sample index refining of the improved environment based on a search pattern, can derive the optimal dataset as a third variance sample size. The system stores optimal dataset.

[EX]: Third (Nth) Index Refinement attenuates most probable pages from calculations and elucidates at least one final destination that belongs to the optimal dataset. The total number of valid final destinations equals third variance sample size, ergo only direct searches where input with certainty maps output have 1 final destination dataset. The system can keep tract of personalized activities and stores each valid output.

To Summarize [AX to EX] (deep neural network subject layer reductions): The [AX] search reduces the order of magnitude from billions to millions. The [BX] search reduces the order of magnitude from millions to 1,000,000. The [CX] search reduces the order of magnitude from 1,000,000 to 10,000. The [DX] search reduces the order of magnitude from 10,000 to 100 and finally the [EX] search has informational certainty and reduces the order of magnitude from 100 to 1 bypasses randomly surfing the web.

Real Time Index Refinement

The HIVE or Codex updates partial changes of the Internet after analyzing discrete sample sizes of 100 to 1,000,000 pages based on the quality of the parent sites. For example: A 100 page sample size is used when the highest site rank is ≥8, a 10,000 page sample size when the highest site rank is ≥6, otherwise the sample size=1,000,000 pages.

First Index Refinement: A weighted sample of the Internet with first index refinement means that 1,000,000 low quality site weighted pages were analyzed and 1,000 or the square root of the weight will update the Codex. First Index Refinement=SQRT (1,000,000)=1,000.

Second Index Refinement: A weighted sample of the Internet with Second Index Refinement means that 10,000 medium quality site weighted pages were analyzed 32 and/or the square root of the weight will update the Codex. Second Index Refinement=(long) SQRT (First Index Refinement or 1,000)=32.

Third (Nth) Index Refinement: A weighted sample of the Internet with Third (Nth) Index Refinement means that 100 high site quality weighted pages were analyzed and 6 or the square root of the weight will update the Codex. Third (Nth) Index Refinement=(long) SQRT (Second Index Refinement or 32)=6. The Codex for each level of refinement stores and updates each optimal dataset in the encyclopedia.

Inductive Reasoning systems use the brute force approach and will compare all the documents like a chess program analyzing all the permutations, whereas Deductive Reasoning systems predict the sample size of probable, most probable and answer documents prior to any calculation as a search pattern, and thus minimizing the required throughput to perform the task.

Once the Codex knows the quality of the parent site for each document using rules of semantics, it can analyze the sample as a search pattern like chess grandmasters do and thus avoid tax burden calculations. Weighted samples: documents are given value based on the quality of the site, and furthermore of the frequency of same site documents within the sample.

Site Frequency Sample size approximately 1,000,000 weighted pages.

TABLE 6

Weighted low site page value for First Index Refinement

| Quality | 1 | 2 | 3 | 4 | 5 | 6 | 7 | 8 | 9 | 10+ |
|---|---|---|---|---|---|---|---|---|---|---|
| 6 | 1 K | 1 K | w | w | w | w | z | z* | | |
| 5 | 300 | 300 | 1 K | 1 K | w | w | w | w | z | z* |
| 4 | 1 | 2 | 4 | 10 | 25 | 60 | 130 | 350 | 700 | 300 |
| 3 | 1 | 1 | 3 | 3 | 3 | 50 | 510 | 300 | 600 | 100 |
| 2 | 1 | 1 | 1 | 3 | 3 | 3 | 10 | 10 | 10 | 30 |

Site Frequency Sample size approximately 10,000 weighted pages.

TABLE 7

Weighted medium site page value for Second Index Refinement

| Quality | 1 | 2 | 3 | 4 | 5 | 6 | 7 | 8 | 9 | 10+ |
|---|---|---|---|---|---|---|---|---|---|---|
| 8 | 300 | 300 | y | x* | | | | | | |
| 7 | 300 | 300 | y | y | x | x* | | | | |

Site Frequency Sample size approximately 100 weighted pages

TABLE 8

Weighted high site page value for Third (Nth) Index Refinement

| Quality | 1 | 2 | 3 | 4 | 5 | 6 | 7 | 8 | 9 | 10+ |
|---|---|---|---|---|---|---|---|---|---|---|
| 10 | n* | | | | | | | | | |
| 9 | 50 | n* | | | | | | | | |

(n) denotes limit = 1
(x) denotes limit = 100
(y) denotes limit = 1,000
(z) denotes limit = 10,000
(w) denotes limit = 100,000
*Stop adding pages to sample Index Refinement Examples Using Simplified Math Once the HIVE or Codex knows the quality of the parent site for each document using rules of semantics, it can analyze the sample as a search pattern like chess grandmasters do and thus For example: (x) As is classical inductive reasoning search the search pattern is "A+B+C" and maps a searchable environment of (2^28) or 268,435,456 pages and when converted into a search pattern using a gamma function maps an improved environment with 16,777,216 pages or (y) after normalizing the probabilistic spatial environment to eliminate redundancy, spam and virus links, from calculation as improbable pages. This means that 268,435,456−n=16,777,216 or n=251,658,240 pages, where eliminated from calculation.

The first index refinement for (x) yields 16,384 pages and for (y) yields 4,096 pages after eliminating from calculation reasonable pages.

The second index refinement for (x) yields 128 pages and for (y) yields 64 pages after eliminating from calculation probable pages.

The third (nth) index refinement for (x) yields 12 pages and for (y) yields 8 pages after eliminating from calculation most probable pages, and these pages are considered final destinations that belongs to the optimal output.

For example: (x) Assisted input using static analysis rules of semantics becomes transformed input "A+B+C" and maps a searchable environment of (2^28) or 268,435,456 pages, and when converted into a search pattern or (y) maps an improved environment, after normalizing the probabilistic spatial environment to eliminate redundancy, spam and virus links, with 524,288 pages. This means that 268,435,456−n=524,288 or n=267,911,168 pages, where eliminated from calculation.

The first index refinement (or deep neural network subject layer) for (x) yields 16,384 pages and for (z) yields 725 pages after eliminating from calculation reasonable pages.

The second index refinement (or deep neural network subject layer) for (x) yields 128 pages and for (z) yields 27 pages after eliminating from calculation probable pages.

The third (nth) index refinement (or deep neural network subject layer) for (x) yields 12 pages and for (z) yields 6 pages after eliminating from calculation most probable pages, and these pages are considered final destinations that belongs to the optimal dataset. Thus, the assisted input is more accurate than a classical "AS IS" search, and the deep neural network output has less final destinations for (z) than (y).

For example: (x) Smart input using static analysis rules of semantics becomes transformed input "A" and maps a searchable environment of (2^28) or 268,435,456 pages and when converted into a search pattern or (y, w) using a GPS checkmate gamma function maps an improved environment after normalizing the probabilistic spatial environment to eliminate redundancy, spam and virus links, with 32,768 pages. This means that 268,435,456−n=32,768 or n=268,402,688 pages, where eliminated from calculation.

The first index refinement (or deep neural network subject layer) for (x) yields 16,384 pages and for (w) yields 181 pages after eliminating from calculation reasonable pages.

The second index refinement (or deep neural network subject layer) for (x) yields 128 pages and for (w) yields 14 pages after eliminating from calculation probable pages.

The third (nth) index refinement (or deep neural network subject layer) for (x) yields 12 pages and for (w) yields 4 pages after eliminating from calculation most probable pages, and these pages are considered final destinations that belongs to the optimal output. Thus, the smart input is more accurate than assisted input and the classical "AS IS" search, and the deep neural network output has less final destinations for (w) than (y) and (x).

For example: (+++) Direct search using static analysis rules of semantics becomes transformed input "A" and maps a searchable environment of (2^28) or 268,435,456 pages and when converted into a search pattern (y, z, w) after normalizing the probabilistic spatial environment to eliminate redundancy, spam and virus links, using a left brain and right checkmate combination gamma function maps an improved environment, (in this case an Optimal element (A) using the benefit of U.S. Pat. No. 7,809,659, filed as U.S. patent application Ser. No. 11/584,941 on Oct. 23, 2006 to Paiz (a parent to this Application)), with 1 page or (+++) after removing from calculation all but 1 as improbable pages. This means that 268,435,455 pages, where eliminated from calculation. (+++) means informational certainty.

The first index refinement (or deep neural network subject layer) for (x) yields 16,384 pages and for (+++) yields 1 page after eliminating from calculation reasonable pages.

The second index refinement (or deep neural network subject layer) (x) yields 128 pages and for (+++) yields 1 page after eliminating from calculation probable pages.

The third (nth) index refinement for (x) yields 12 pages and for (+++) yields 1 page after eliminating from calculation most probable pages, and the input maps optimal output. Thus, a direct search is more accurate the (+++) input maps exactly the final destination output.

Real Time Index Refinement Concepts

The index refinement transforms the content of each page into Glyphs and uses valid keyword and clusters in order to identify key featured (featured attribute) associations and transitives. Each default human knowledge concept and valid keyword regular expression object is index refined, by probabilistically and contextually identifying valid sub ordinates using positional branching and creates billions of smart input and shopping cart objects.

Normalization is the process to remove redundancy, and using the benefit of U.S. Pat. No. 6,614,893, filed as U.S. patent application Ser. No. 09/544,238 on Apr. 7, 2000 to Paiz (a parent to this Application) the ambient intelligence analyzes all the links from mapping the page as vector V is progressively constructed for each individual call by forward chaining through the simulation computers, and using the benefit of U.S. Pat. No. 7,908,263, filed as U.S. patent application Ser. No. 12/146,420 on Jun. 25, 2008 to Paiz (a parent to this application) a Super Page for each request has a Deductive Reasoning W_Rank Basis value that ranges from 0.001 (no good) to 10 (awesome).

Positional, Probable, Plausible Branching

Each positional branching element of Codex can be further refined using another independent variable (n+1) to create probable branching objects, and further refined using independent variable (n+2) reasonable branching to create trillions of new objects.

Encyclopedia Superset of Summary Report Objects or Optimal Dataset

Each Superset (I), Set (I, J), Subset (I, J, K) have their own unit object in the superset of regular expression chain of command. Each element Summary Report object contains the top (n) results that become output and are displayed in an order from highest to lowest, and also the key featured association and transitive of related concepts or entities and feedback equations that permit deductive reasoning set theory constructs analysis.

Human Knowledge Superset (I) Expansions: Each Superset (I) can have subordinates by using associative entities as independent variables (J) and (K) each possessing their own unit object. For example: The Internet or Superset (U) can be subdivided by country domains.

Human Knowledge Set (I, J) Expansions: Each Set (I, J) can have subordinates by using key featured associations and transitives as independent variables (I) (when null) and (K) sub filters each possessing their own unit object. For example: Battle of Gettysburg event can be part to Superset ("Historical Battles") or to Superset ("American Civil War").

Human Knowledge Subset (I, J, K) Expansions: Each Subset (I, J, K) can have subordinates by using key featured associations and transitives as independent variables (I, J) (when null) sub filters each possessing their own unit object. For example: 33160 is an event that can be part to Superset ("Florida") and Set ("Florida", "Restaurant") and so forth.

For each Superset, Set and Subset object the Codex creates metadata and stores the human brain equation use both [L] left brain equation English language key featured associations, and [R] right brain equation geospatial key featured association, and then gain factors the Top Results, and then using deductive reasoning feedback Glyphs equation to attenuates content with confounding variables to stabilize variations due to the environment.

The Codex using Summary Reports dataset derived from Business Intelligence metadata and human brain equation can now display the highest satisficing advertisements to the user and thus yield direct sales. Satisficing is a decision-making strategy or cognitive heuristic that entails searching through the available alternatives until an acceptability threshold is met.

The Codex continuously scans, scans and gathers the environment. Using the human brain, the Internet environment has been broken down. [R] The right side of the brain partitions the Internet into a plurality of super blocks, blocks, sub blocks, mini blocks and elements, whereas [L] the left side of the brain performs the same task using rules of linguistics and semantics based on the frequency and direct relationships between keywords and term clusters.

Then mimicking the human brain to simulate deductive reasoning to create a language based equation, a geospatial based decision, a human decision equation to interpret numerical and text data into transform input that maps a search pattern representing the mathematical equation used to determine the optimal partition of the Internet.

To reach 100% accuracy and precision the confounding elements of the search must be eliminated. The optimizer system uses deductive reasoning means of the feedback Glyphs equation that attenuates content with confounding variables in order to stabilize and reduces sensitivity parameter variations due to the environment. Direct searches eliminate the randomly surfing the web process and in turn automatically yields the final destination output.

Proactively Intercepting New Items

FIRST: A Web Crawler identifies a News Document and immediately converts the raw data into primed data by performing data mining and statistical analysis of the content reading the title, links and reading from the document each sentence and paragraph to identify relevant key featured or feature attribute associations and transitive relationships and thus eliminating most words of the document as being irrelevant. Upon receiving a significant difference document from the web crawler, the Codex proactively updates all the end users (interest graphs) that are tracking, trending or searching for relevant information.

Proactively Intercepting New Files

SECOND: A Web Crawler identifies a New Document and immediately converts the raw data into primed data eliminating most words of the document as being irrelevant, the New Document is assigned a new page rank and all the relevant objects in the chain of command are updated. If the file is significant, the system for each position updates the optimal dataset and has a partial master index for each position of the chain of command. Finding multiple significant documents will trigger to renew the master index. Upon receiving a significant difference document from the web crawler, the Codex proactively updates all the end users (interest graphs) that are tracking, trending or searching for relevant information.

The system analyzes and indexes the News Document and then for each valid search pattern assigns a commercial, content, elasticity, popularity, trending and volatility values that determine what is relevant within the newly identified document.

Significant difference search patterns based on the newly derived elasticity and volatility values are geometrically gain factored, since the commercial, content and popularity values are mostly static. When the New Document is determined to be of significant difference, the new document is proactively intercepted and is sent to the end user (interest graph) that is tracking or trending for a relevant search pattern. This automatic process is not a blind or brute force method instead it is a total quality management satisficing algorithm (avoid churn) designed to minimize the output messages sent the end user.

Commercial Value: The Site commercial value for each new primed document.

Content Value: The quality and relevancy of each search pattern within the content.

Elasticity Value: Measures the frequency search patterns is updated.

Popularity Value: Measures the value of the links and citations.

Trending Value: Search patterns within the content that are currently popular.

Volatility Value measures how many end users have searched the site based on the elasticity value of the site. This value is gain factored with exponential increments.

The Commercial, Content, Elasticity, Trending and Volatility values are adjusted based on the size of the improved environment they belong, thus a Subset (I, J, K) with 100 pages that has a new significant difference event with be affected more dramatically, than a Superset (I) with 1,000,000 pages or the parent Super Block with 1 billion pages.

Positional Branching (Set Theory Interpretation of Human Knowledge Concepts)

FIRST: Each summary object has a unique position in the chain of command.

SECOND: Each index relationship has key featured associations and transitives.

THIRD: Valid subordinates to each position are offered to the end user.

For example: USA would offer each of the fifty (50) States and corresponding counties and cities.

FOURTH: When a position is selected a new dataset is created.

For example: American Civil War is the search pattern selected from US History Superset (I) and then the user selects Robert E. Lee search pattern from US Military General Set (I, J). American Civil War becomes the first request and Robert E. Lee the second request. Now, the user picks Battle of Gettysburg from historical event Subset (I, J, K). The Battle of Gettysburg and its managerial hierarchical relationship indices becomes the third request, and the (feature attributes) Glyphs belonging to American Civil War and Robert E. Lee Glyphs become dependent variables. Glyphs are valid entities belonging to the human knowledge encyclopedia.

Search Pattern: This is obtained from the end user interactively typing or speaking letters or completed words and optionally selecting assisted function command instructions.

(1) American Civil War (1st search pattern)

(2) Robert E. Lee (2nd search pattern)+American Civil War Glyph.

(3) Battle of Gettysburg (3rd pattern)+American Civil War+Robert E. Lee Glyphs.

For example: Now, the user picks the commercial Glyph game command instruction.

FIFTH: Each position can have subordinates available such as commercial, and map objects. In this case, computer games command instructions related to the Battle of Gettysburg.

(4) Computer game (Assisted search command instruction) Battle of Gettysburg+American Civil War+Robert E Lee Glyphs.

Search Pattern: This is obtained from the end user interactively typing or speaking.

SIXTH: Analysis of the superset of keyword regular expression will elucidate for each position, input that requires, maps, directions and Shopping Cart interface objects that yield personal input. For example: The user picks a particular Battle of Gettysburg Computer Game (Product ISDN number 1234 . . . 123). (5) The Product ISDN number 1234 . . . 123 is a direct search.

The Codex Bitmaps the preprocessed top (n) pages is based on the type of environment Superset (I)=1,024, Set (I, J)=256 and Subset (I, J, K)=64. For each position branching of the chain of command exhaustively calculating all the permutations of the combination of each key featured association and nested transitives relationships.

Probable Branching (Set Theory Interpretations Using Associative Relationships)

Search Pattern: This is obtained from the end user interactively typing or speaking. The Codex analyzes the preprocessed top (n) pages by mapping each associative construct as a probable index relationship to the search pattern by attenuating pages not matching the index relationship and determines for each (feature attribute) associative construct if a new position exists when the number matches exceed the size of the next level (nth) object.

Probable objects: Superset (I) creates Set (I, J) with 256 pages, Set (I, J) creates Subset (I, J, K) with 64 pages and Subset (I, J, K) creates Elements (I, J, K, L) with 16 pages.

For example: When the Codex performs an informatics nesting such a Probable Branching Set (I, J)=American Civil War+Robert E. Lee. The Codex data mines relevant (feature attributes) associative and transitive concept entities to the Probable Branching object.

Plausible Branching (Set Theory Interpretations Using Transitives Relationships)

Search Pattern: This is obtained from the end user interactively typing or speaking. In this case, transitive relationships are mapped to the plausible index relationship. For each valid probable branching position the Codex promotes each transitive construct as a reasonable index relationship to the search pattern. The Codex exhaustively for each transitive construct determines if a new position exists when the number matches exceed a threshold.

Likely (featured attribute) objects are as follows: Superset (I) creates Subset (I, J, K) with 64 pages, Set (I, J) creates Elements (I, J, K, L) with 16 web pages and Subset (I, J, K) creates Answers with 4 pages. For example: When the Codex performs an informatics nesting such as a Reasonable Branching of Subset (I, J, K) American Civil War+George Meade+Gettysburg. Each document of the American Civil War is likely to have Generals Robert E Lee and George Meade, but none would be able to construct an interpretation using set theory of both Generals with the Mexican America War within the 1861-1865 timeline.

Personalized Index Refinement

Search Pattern: This is obtained from the end user interactively typing or speaking The Codex personalizes the preprocessed top (n) responses belonging to the optimal dataset that are displayed as output in an order from highest to lowest.

FIRST: Promotes a key featured association as an index relationship. For example: End user selects American Civil War search pattern and then selects Gettysburg.

(1) American Civil War (First search pattern). End user's interactive input.

(2) Battle of Gettysburg (Second search pattern)+American Civil War.

If the search pattern does not exist the Codex does as follow:

SECOND: For example: Now, the end user exhaustively continues with the interactive input process (personalized index refinement) by selecting additional command instruction (featured attributes or alternative query suggestions).

THIRD: This process attenuates each page not having the new index relationships.

FOURTH: Repeatedly, the end user adds new index relationships and attenuates pages not having the new index relationships until the size of the environment reaches one.

Assisted (alternative) Input: Exact search patterns based on human knowledge.

Smart Input: Search patterns that can incorporate GPS coordinates to render a map.

Personal Input: Input with the highest informational certainty that automatically map the output requiring no further calculations and bypassing search engine capacities.

The Optimizer Transforms Interactive Input into Search Patterns

Search Pattern: This is obtained from the end user interactively typing or speaking. The Optimizer system transforms the user's interactive input into search patterns. Each search pattern has a unique managerial hierarchical indices and a set of natural variant command instructions (alternative or feature attribute) associative and transitive entities to aid the user improve the input and remove the confounding elements of the search process.

The Codex Bypasses Input Going to the Search Engine

Search Pattern: This is obtained from the end user interactively typing or speaking. When the optimizer system is absent, Codex preemptively analyzes interactive input and then transforms the input into Concepts (or Glyphs or Entities) and afterwards converts the (feature attribute to a search) Glyphs into a search pattern. Now, the Codex determines if a valid Summary Report optimal dataset exists by matching the search pattern index relationships. If yes, proactively sends the output to the end user in an order from highest to lowest.

The Codex Optimizes Input Going to the Search Engine

When the Optimizer system is absent and an exact match summary report object or optimal dataset does not exist the Codex performs the following:

FIRST: Replaces the input with the closest valid search pattern.

SECOND: Unused or Glyphs or Entities become filters of the search process.

THIRD: The search pattern equation becomes the basis for all calculations.

FOURTH: Maximizes (gain factors) unused Glyphs or Entities that have dynamic hot input values.

FIFTH: Minimizes (attenuates) unused Glyphs that have dynamic cold input values.

SIXTH: Sends the optimal input to the search engine.

As taught in U.S. patent application Ser. No. 14/028,508 (a parent of this application and incorporated herein by reference)

The HIVE or Codex Applies Indexing Refinement Using Set Theory

Now, that a valid summary report was found using informatics set theory branching means the preprocessed summary report object or optimal dataset can be gained factor and attenuated using the unused (scenario, alternative or feature attribute) glyphs.

The Optimizer system personalizes interactive, assisted and smart input into transform input using dynamic analysis rules of semantics. The ability to send optimal input to the search engine incorporates by reference the Optimizer Patented related art.

The Codex stores index refined human knowledge: Now, that human knowledge has been arranged in hierarchical distribution, each valid keyword and cluster search pattern object is created using the first independent variable that attenuates irrelevancy. The top results are stored and continuously optimized to bypass the search engine capacities. Each First Significant difference object maps a Superset (I), and has a weighted 1 million web pages. Each of these objects has a corresponding concise search equation with key featured (scenario, alternative or feature attribute) associations and transitives that map an improved environment.

Concise search equations map Superset (I) environments and belong to the simple layer of refinement. Precise search equations map Set (I, J) optimal environments and are stored in the hybrid layer of refinement. Now, we have 128 million summary report objects. Optimal search equations maps Subset (I, J, K) optimal solutions and are stored in the complex layer of refinement. Now, we have billions Summary Report objects. Further, index refinement or relevant 'related objects' or (feature attribute) permits the creation of trillions of objects.

As taught in U.S. patent application Ser. No. 14/013,018 (a parent of this application and incorporated herein by reference)

Shopping Cart/Advertisement Subsystem

The HIVE or Codex for direct search equations after receiving command instructions to remove the confounding elements of the search process, and is able to put buyers and sellers together using X_FOB and Y_CDIF means. Direct searches are created with the end user's dynamic mathematical equation with six independent variables, and thus have Informational Certainty. Personalized Summary Report (interest graph) objects are stored in the user history.

Each summary report object, similar to a Site organization, by default has its own chain of command comprising of the most probable subordinates using informatics set theory branching that analyzes the best fit web pages of the search pattern mathematical equation derived improved environment. During the index refinement analysis of each search pattern, web pages that yield GPS and mapping information are gain factored and stored in the summary report object. Shopping cart information that yields X_FOB or Y_CDIF information is also gained factor. For example, the free content of the web page yield an intellectual property (music song) that the end user will want to watch or listen.

Each geospatial summary report object that represent a populated partition of the world geography is bound by a commercial chain of command template that is specific to country, state and county and its demographics. Each object subdivides the content as if to create a yellow and white pages phone book of the web pages that are bound to the improved environment, for example, restaurants, types of restaurant, specific restaurants, and then maps the information into smart input. End user's known IP Addresses and GPS coordinates are converted into ANI-like information and are also incorporated. The shopping cart also incorporates demographics and trending satisfactions dimensions. Using informatics set theory branching of each of the summary report objects yields trillions of possible permutations with a probabilistic vector value only and that may be stored. The HIVE or Codex can furnish to the user the optimal preprocessed results by having stored the trillions of possible permutations.

The HIVE or Codex updates in real time each partial master index, summary report object (scenario, alternative or feature attribute) using set theory branching.

As taught in U.S. patent application Ser. No. 15/486,276 (a parent of this application and incorporated herein by reference)

Legacy search engines mimic inductive reasoning popularity based methods for finding the best results, whereas the HIVE or Codex solves for the optimal environment using deductive reasoning set theory constructs analysis to find the optimal dataset and best results. The Internet must be organized by the HIVE or Codex into a chain of command comprising of superblocks, blocks, sub blocks, mini blocks and elements (scenario, alternative or feature attribute) depending on the amount of independent variables contained in each search pattern. Each position branching of the chain of command belonging to the entire superset of regular expressions is stored in the 'CORE List' database. The HIVE or Codex upon detecting a new valid and unique input creates a new unit object in the 'CORE List' database.

The Optimizer interactively transforms input into a search pattern. The output is sent to the user browser and displays the top (n) results, in an order from highest to lowest, requiring no further calculation and bypassing the search engine capacities. Each unit object search pattern has a Summary Report object or optimal data with the preprocessed top (n) results or output.

The [L] left side of the brain equation uses index relationships (I, J, K), which maps the improved environment. The [R] right side of the brain equation uses geospatial (X, Y, Z) index relationships. The entire superset of keyword regular expressions and human knowledge is converted into search patterns object that possesses independent variables (I, J, K, X, Y, Z).

The 'CORE List': (hereinafter referred as the Encyclopedia) organizes human knowledge using categories and subcategories all unique keywords and clusters.

The HIVE or Codex: The Summary Report dataset of each entity objects stores the Top (n) Results, (or pre-calculated optimal dataset) using rules of linguistics and semantics. Upon identifying from the virtual environment significant difference trending data (interest graph), the Codex, updates the entire superset of (alternative or feature attribute) objects.

Positional Branching entity objects: the HIVE or Codex, index refines the virtual environment applying set theory interpretations using conditional probability calculations to create hundreds of millions positional branching objects (scenario, alternative or feature attribute). Each Positional Branching object (I) is a Superset (I).

Probable Branching entity objects: The Codex index refining each positional branching entity object using set theory associative relationships (n+1) to create billions of probable branching objects (scenario, alternative or feature attribute). Each Probable Branching object (J) is a Set (I, J) of Superset (I).

Plausible Branching entity objects: The Codex index refining each positional branching entity object using transitive relationships (n+2) to create trillions of plausible branching objects (scenario, alternative or feature attribute). Each Plausible Branching object (K) is a Subset (I, J, K) of Superset (I).

Web Crawlers: Continuously scan, gather and parse information from the Internet and transform new file raw data into primed, normalized, and mapped data (hereinafter referred to as primed data), for human monitoring and evaluation (interest graph to avoid churn).

HIVE: Using the benefit of U.S. Pat. No. 6,614,893, filed as U.S. patent application Ser. No. 09/544,238 on Apr. 7, 2000 to Paiz (a parent to this Application), the summit cluster reevaluates, synchronizes and coordinates the Codex and then uses web crawlers and the information gathering cluster subsystem to continuously gathers, distills and analyzes the Internet environment executing informatics set of instructions based on rules of semantics.

Primed Data: Validates each word of the input using rules of linguistics, semantics and human knowledge to assign a mathematical lingua franca meaning that becomes the optimal input. For example: Cat is mapped to Gato in Spanish and Chat in French.

Webpage database: Web Crawlers executes software instructions using rules of semantics to parse each new file and prime the content into data comprehensible for human monitoring and evaluation and then stores all index relationship combinations (scenario, alternative or feature attribute). Web Crawlers upon finding significant amount of primed data update the master index and the entire chain of command partial master indices. When the Codex actuates the Master Index, then all elements of the Encyclopedia are synchronized.

Search Pattern Matching: The Optimizer searches the Encyclopedia for a match and uses the corresponding partial master index to gain factors and attenuates pages to create a personalized optimal environment and to discover natural variants command instructions to help the user randomly surf the web. When the Search Pattern Matching is an exact match then the search process is bypassed and the optimal dataset is automatically sent to the end user computing device and display as output in a order from highest to lowest.

Encyclopedia: Stores and updates the entire superset of human knowledge objects that are derived from index refining as follows:
 (A) The searchable environment using positional branching,
 (B): The improved environment using probable branching, and
 (C) The optimal environment using plausible branching.

Web: The system upon discovering a search pattern can respond to interactive input sends the optimal dataset as output, bypassing the search engine and displays the output.

Rules of Semantics, as based on claim 1 of U.S. Pat. No. 8,456,386, is as follows: CORE List Element Rules teaches how to build each element of the managerial hierarchy Encyclopedia. Static Analysis Rules teaches how to create search patterns for single requests, whereas Dynamic Analysis Rules apply for at least two requests. Index Refine Rules teaches how to update elements of the Encyclopedia, and Renew Indices Rules teaches how using samples of significant difference the master index and partial master indices are updated in real time. Finally the New Master Index Rules teaches how to actuate the Master Index.

Internet: described as a spatial virtual environment comprising billions of links that maps Site and Web Pages and associated group of audio, product, services and video resources.

Searchable Environment: A subset of the Internet using 'Boolean Algebra' to eliminates pages not having at least one word or concept of the interactive input.

Search Pattern: The optimizer maps and transforms the interactive input into a lingua franca mathematical search pattern and probabilistically maps the Improved Environment.

Improved Environment: The 'AFTER' after culling the searchable environment using the independent variables to probabilistically remove redundancy and improbable web pages.

Optimal Environment: A high quality small sample subset of the Improved Environment after mapping the Search Pattern and by gain factoring natural variants.

Optimal Dataset: Comprises of the top (n) results when using Static Analysis Rules, the best-fit results when using Dynamic Analysis Rules, and the final destination when information certainty exists and the input automatically maps the output.

Natural Variants (feature attributes): Using rules of association, likelihood and relevancy, the optimal dataset is analyzed to offer command instructions to assist the search.

Interactive Input: As the end user types or speaks input comprising of letters, words and numbers that are mapped into relational entities upon searching the encyclopedia.

Transforms Input: The Optimizer maps the interactive input into an optimal input after find missing gaps of information, category, and index relationships.

Category: Each search is assigned a human knowledge category.

Sub-Category: Once a category is identified that maps an independent variables using informatics set theory branching assign a natural variant subcategory based on the search pattern and then determines the type of search and corresponding type of output. For example: WALMART becomes smart input that uses the GPS coordinates of the end user to render a map.

Media Value Database: The Hive monetizes the financial value of the optimal dataset using the Shopping cart and Advertisement subsystem.

Virtual Maestro: Artificial intelligence entities that analyzes optimal input and pattern matches searching the Encyclopedia to find an optimal dataset. The summit cluster monetizes the dataset as the output permitting the Virtual Maestro to engage using a script in a substantive communication with the end user.

Script database: The Virtual Maestro uses the optimizer to discover a search pattern and then the Codex searches the Encyclopedia to identify natural variants in order to promote products and services using the monetized optimal dataset.

Interactive Output: the Virtual Maestro probabilistically maps as output each relevant relational entities responses upon searching the encyclopedia and based on the analysis of best fit responses decides how to instantiate communication via a script with the end user.

Informatics Set Theory Branching of an Object

Informatics set theory branching: Creates (feature attributes) objects using layers of refinement to cull the searchable environment into exact size improved environments.

First, creates concise search objects with an environment of 1,000,000 pages.

Second, creates precise search objects with an environment of 10,000 pages.

Third, creates optimal search objects with an environment of 100 pages.

Natural Variants (key featured, scenario, alternative or feature attribute) Objects: Analysis of a search pattern improved environment using informatics set theory constructs discovers relevant knowledge branches or associations. For example: (1) American Civil War+Battle+Gettysburg, using interactive input will yield the same as (2) Gettysburg+July 1863 yields the Historical Event of the Battle of Gettysburg.

Usage Pattern of Behavior (Interest Graph): Now, the order of the word, and the frequency of the words affect the vector value of each word or cluster using the Hot and Cold algorithm and informatics set theory branching to gain factor and attenuate the context of each page belonging to the optimal dataset during the cherry picking of personalizing the output.

Informatics Set Theory Branching: does not require to correlate spatial environments when the command instruction maps an existing object and can discover additional natural variations identified during the index refinement of an improved environment. Each natural variant (feature attribute) object is assigned to a corresponding layer of refinement.

Natural Variants (Alternative or Scenarios) Belonging to an Object

Informatics set theory sub branching: from 'AFTER' improved environment further analysis creates natural variant objects as follows:

First, concise search variants with 100,000 pages.
Second, precise search variants with 1,000 pages.
Third, optimal search variants with 10 pages.

Command instruction (alternative) dataset collection: The optimizer searches the Encyclopedia to discover probabilistic natural variant (featured attributes) objects using trending, freshness and elasticity valuations (interest graph) of human knowledge concepts. The user controls, decides and picks how to refine the input.

User Selected refinement: For example: selecting a command instruction readily maps a concise, precise, optimal, direct search objects using knowledge discovery set theory constructs data extracts concise, precise and optimal search variants are offered to the end user.

[AX] is a low accuracy 'Boolean Algebra' search with an ambient size in the millions.

[BX] is a concise search with one assigned category and independent variable.

Thus, the 'BEFORE' is a vague search, and the 'AFTER' is a concise search that maps a human knowledge concept belonging to the Encyclopedia, and has an optimal dataset.

[CX] is a precise search with one sub category and 2 or 3 independent variables.

Thus, the 'AFTER' is a concise search that maps an improved environment, and the 'IMPROVED' after finding missing gaps of information is a precise search that maps a human knowledge concept that is part of the Encyclopedia, and has an optimal dataset.

[DX] is an optimal search with many subcategories and 3 to 5 independent variables.

Thus, the 'IMPROVED' is a precise search that maps an optimal environment or Output that is a subset of the improved environment, and the 'OPTIMAL' after eliminating the confounding elements is a optimal search that maps a plurality of related human knowledge ideas and concepts belonging to the Encyclopedia, and has an optimal dataset.

[EX] is when the input automatically maps (mathematically in lieu of linguistics) the output, and the deductive reasoning checkmate combination is dissected to make the corresponding semantics and human knowledge equivalences that yield the final destination.

In a nutshell, the process of index refinement uses probabilities to eliminate pages from calculation [AX] uses 1, [BX] 2, whereas [EX] has the highest (N), where the greater the value for (N) the more accurate, reliable and robust the set theory constructs calculations.

Checkmate Combination where Input Maps Output

[EX] offers direct searches, where the input automatically maps the output. In some cases the search process ends and instantiates an Virtual Maestro communication with the user.

Customer Satisfaction Business Intelligence Calculations

The system, performs analysis of the optimal dataset in order to offer natural variants command instructions, and then performs business intelligence set of informatics instructions to commercialize and monetize the dataset as output, and sends the output as a response to the user based on what is being said or typed interactively as input. The human makes the decisions used to measure behavior as interactive input is transformed into a personalized search pattern.

The Virtual Maestro analyzes both the personalized search pattern and the output, and then searches the script database to obtain the AI Script dataset, containing the informatics set of instructions of how to communicate with the end user. Alternatively to engage in a dialogue.

For example: When the user transforms typing "AME" into "AMERICAN CIVIL WAR" by selecting a command instruction, the end user has selected a concise search and then user continues to type "BA" that becomes "AMERICAN CIVIL WAR BATTLES" by selecting a command instruction, the end user has selected a concise search natural variant; afterwards the user continues to type "GE" that becomes "AMERICAN CIVIL WAR BATTLES GETTYSBURG" by selecting a command instruction (alternative query suggestions), the user has selected a precise search, now the system analyzing the usage pattern identifies the Historical Event of the Battle of Gettysburg that occurred Jul. 1-3, 1863 that is an optimal search.

What is the difference between the searchable environment, improved environment, and the optimal environment, first the searchable environment is a 'Boolean algebra' estimation of the number of links belonging to a spatial virtual environment given a regular expression. The optimizer uses static analysis rules to transform interactive input comprising of words and numbers into a concept that becomes a search pattern. The system normalizes the searchable environment in order to remove redundancy, spam and viruses, and improve information certainty and maps an improved environment using W_RANK method of layers of index refinement. The optimal environment is a high quality small sample subset of the improved environment that is updated in real time as significant difference changes occur in the Internet, and is stored as an optimal dataset, containing the optimal element (A) or final destination.

First example for the search pattern "American Civil War", the searchable environment has 200,000,000 links and displays as output. Does this mean the search engine eliminated 199,999,990 by actual reading them? No, the lion share is irrelevant from the searchable environment. How is this accomplished? First, spam and virus are eliminated. Second, normalizing duplicates to figure out from U.S. patent application Ser. No. 12/778,228, filed on May 12, 2010 (issued as U.S. Pat. No. 8,239,229 on Aug. 7, 2012) inventory in hand or U.S. Pat. No. 6,614,893, filed as U.S. patent application Ser. No. 09/544,238 on Apr. 7, 2000 to Paiz (a parent to this Application) V vector that represent the single version of the truth links, to map an improved environment of 1,000,000 reasonable pages that represents a concise search. Third, now using quality values any page beyond the first variance sample size is attenuated. In this, case SQRT (200,000,000) equals 14,142 pages. Fourth, the Codex creates a precise search object with 10,000 probable pages.

The resulting 10,000 probable pages are still too much. If an end user reads 1 paragraph from the top 10,000 results they would have read the equivalent of the Bible. Fifth, probabilistically create an optimal environment with a second variance sample size or SQRT (10,000) or 100 most probable pages. Finally, the system figures out that potentially 10 final destinations exists based on the third variance sample size. This explains and justifies the need to perform EX index refinement to the nth layer that is SQRT (10) or 3 belonging to the third variance sample size, in order to recommend with certitude results after cherry picking the actual content that are satisfying to the end user based on business intelligence and content inspection.

U.S. Pat. No. 7,908,263, filed as U.S. patent application Ser. No. 12/146,420 on Jun. 25, 2008 to Paiz (a parent to this Application) further teaches that a plurality of searchable environment may exists during a session while randomly surfing the web, and thus a improved environment, and the optimal environment. First, the searchable environment is a 'Boolean algebra' estimation of the number of links belonging to at least one spatial environment for at least regular expression, as the optimizer uses dynamic analysis rules of semantics that interactive input is transformed from words and numbers into a concept that becomes a search pattern, the system normalizes the at least one searchable environment in order to remove redundancy and reach information certainty and maps a dynamic improved environment using W_RANK method of a plurality of layers of index refinement.

The optimal environment is a subset of the improved environment that is updated in real time as significant change is detected in the Internet, and is stored as an optimal dataset; then the optimizer performs the Hot algorithm to gain factor data and Cold algorithm to attenuate data based on usage pattern of behavior. Using the benefit of U.S. Ser. No. 09/514,940, filed on Feb. 24, 2000 (issued as U.S. Pat. No. 7,058,601 on Jun. 6, 2006) First: Continuously processes and filters raw data into primed data comprehensible for human monitoring and evaluation as an optimal dataset. Second: Analyzes and parses through news, data and information in real time to determine portions thereof having relevance to the most recent primed data received. Third: Analyzes primed data in real time to determine portions thereof having trending relevance. Fourth: Executes a set of software instruction to compare the primed data to the search pattern in real time. Fifth: Proactively pattern matches the optimal environment, picks the optimal dataset (alternative or feature attributes query suggestions) as output and automatically sends the personalized output in an order to the end user.

Sending Optimal Dataset to the End User

The system responds to direct input software instruction based on set theory branching by the Optimizer and takes both sides of the human brain checkmate combination to discover the optimal dataset and update the user with personalized final destinations.

Transforming Raw Documents into Primed Data for Monitoring and Evaluation

The Client software builds interactively input from the end user console devices, and using rules of semantics to creates a search pattern, and the user's profile to find missing gaps of information to discover during the refinement process natural variations of the concept.

The system uses web crawlers to continuously gather, distill and analyze the Internet using Index Refine Rules to updated recent News and content Documents and then web crawler parse and prime into valid search pattern for human monitoring and evaluation. The system uses business intelligence to commercialize and monetize content to trend data (Interest Graph).

Rules of Semantics to Store Entities into the Encyclopedia

The system stores hierarchically the entire superset of regular expressions and human knowledge search patterns into the encyclopedia data warehouse. Then the Optimizer uses human knowledge obtained from the encyclopedia to perform informatics Set theory constructs by applying rules of semantics to transform interactive input into a search patterns, and dynamically adjusts values based on usage patterns of behavior, discovering Natural Variants.

The system proactively determine the freshness, volatility and elasticity of the significant difference changes in order to measure trending data, and then searches the Encyclopedia, and webpage database using informatics set theory constructs based on positional, probable, and plausible branching in order to find natural variant command instructions relevant to the interactive input and cull the searchable environment to map an improved environment.

The Web Crawlers upon detecting a significant difference News and/or Documents from the Internet, parse, prime and map data and store them into the Webpage database. The system executing informatics instructions using Renew Indices Rules of semantics searches the Encyclopedia data warehouse trending data to discover human knowledge to gain factor the improved environment and probabilistically map each search pattern using the First Variance sample analysis to find positional branching to identify relevant, associative and transitive natural variant command instructions comprising of concise, precise, optimal searches objects.

The system upon finding a valid object in the Encyclopedia and responds with the optimal Output and offers as command instructions valid positional, probable and plausible branching Interactive Input alternatives, otherwise if a new optimal object is discovered, the system immediately index refines the searchable environment into a chain of command of subordinate natural variants consisting of key featured associations and transitives entities. The system sends the optimal dataset offered to the end user as part of the output.

The system when relevant adds the GPS coordinates of the computing device to the search pattern to respond with the optimal dataset that is display in an order as output. The system responds to direct input upon identifying a both sides of the human brain checkmate combination to discover the final destination and update the user with personalized dataset.

The Web Crawlers attenuates the improved environment performing the Second Variance sample analysis to find probable branching natural variant command instructions comprising of concise, precise, optimal searches offered as (alternative or feature attributes) ADDITIONAL KEYWORDS that aid the end user to reach the final destination.

The Web Crawlers inventories the improved environment, performing the Third Variance sample analysis to identify plausible branching in order create and store in the Encyclopedia the optimal dataset derived from the analysis of the optimal environment. The First, Second and Third Variance samples analysis probabilistically maps each interactive input transformed into a search pattern to create an optimal dataset that includes, page links, hyperlink to relevant human knowledge, advertisements, maps, and natural variants as (alternative suggestion) ADDITIONAL KEYWORDS that aid the end user to further index refine the search.

The system updates and renews the plurality of partial master indices and immediately "determining, when the timer has expired" actuates the New Master Index that contains the most current significant changes in the environment.

Using the benefit of a software that permits user update and change strategies as new information becomes available as defined in U.S. Pat. No. 7,058,601, filed as U.S. patent application Ser. No. 09/514,940 on Feb. 28, 2000 to Paiz (a parent to this application), (feature attributes or alternative suggestion to the query) ADDITIONAL KEYWORDS, as defined in U.S. Pat. No. 7,809,659, filed as U.S. patent application Ser. No. 11/584,941 on Oct. 23, 2006 to Paiz (a parent to this Application), Key Featured Associations and Transitives, as defined in U.S. Pat. No. 7,908,263, filed as U.S. patent application Ser. No. 12/146,420 on Jun. 25, 2008 to Paiz (a parent to this Application), as "Related objects" such as Peoples names, telephone numbers, particular copyrighted titles and links to downloadable audio media devices such music, and copyrighted pictures that belong to Super Sites are examples of Objects as defined in U.S. Pat. No. 8,386,456, filed as U.S. patent application Ser. No. 12/785,122, filed on May 21, 2010 to Paiz (a parent to this Application) and personal input command instruction (Interest Graph) which eliminate the confounding elements of the search as defined in U.S. Pat. No. 8,977,621.

Thus, the system, identifies search patterns using rules of semantics and dynamically correlates data with knowledge branching to offer nested entity command instructions based on usage patterns of behavior. And offers direct search natural variants (Interest Graph) objects having a checkmate combination and with certainty automatically map the final destination.

The system correlates data by gain factoring most probable pages, and attenuating reasonable and probable pages using variance sample sizes to create the optimal environment. The system has billions of optimal dataset saved as preprocessed output, and acts as an interceptor of messages to bypass the search engine, and eliminating repetitive.

The system performs index refinement to the nth word and updates the Encyclopedia. In this case, dynamically assigns the independent variables to a search pattern, and then using human knowledge offers natural variants command instructions based on the user's decisions.

The system finds:
(1) Superset (I) performing positional branching to discover nested entity objects,
(2) Set (I, J) performing probable branching finds key featured associations natural variants objects,
(3) Subset (I, J, K) performing plausible branching finds key featured transitives to create the optimal datasets where input automatically maps and formats pre-calculated and preprocessed output, and displays the output to the user bypassing the search capacities. Finally, the system updates ambient changes to renews the plurality of partial indices within a predefined time "determining, when the timer has expired" to create a new master index.

The system performs index refinement using Rules of Semantics to map a partial master index to each search patterns: First: index relationship (I) normalizes the searchable environment and creates a simple layer of refinement using the benefit of independent claim 1. U.S. Pat. No. 7,809,659, filed as U.S. patent application Ser. No. 11/584,941 on Oct. 23, 2006 to Paiz (a parent to this Application) (layers of refinement). Second: index relationship (J) using linguistics and trending data discovers associative entities of the search pattern to create the hybrid layer of refinement. Third: index relationship (K) using geospatial and correlated data to discover transitive entities of the search pattern to create the complex layer of refinement. Using the benefit of U.S. Pat. No. 8,676,667 index refining to the (nth) to pick the output that is sent to the user that becomes human indicia for monitoring and evaluation to inventory the content of the Internet.

The system using the benefit of U.S. Pat. No. 7,058,601, filed as U.S. patent application Ser. No. 09/514,940 on Feb. 28, 2000 to Paiz (a parent to this application) programmed uses rules of semantics to parse documents and upon determining portions thereof having relevance to monitoring and valuation from the primed data to measures freshness, volatility and elasticity of the significant difference changes as trending data executes software instructions based on business intelligence to maps and updates entities objects and natural variants in the Encyclopedia. The system updates and renews the plurality of partial indices and proactively build datasets using the Encyclopedia, and Webpage database, and performs historical analysis and automatically updating output of the end user's Recognized Search Pattern to the end user (Interest Graph).

The system pattern matching the primed data and trending data to the end user's recognized Search Pattern in order to proactively generate optimal input using the benefit of U.S. Pat. No. 7,908,263, filed as U.S. patent application Ser. No. 12/146,420 on Jun. 25, 2008 to Paiz (a parent to this Application) to gain factoring associative and transitive natural variant of the entities object as relevant and likely and attenuate irrelevant and unlikely to probabilistically map the optimal spatial environment or dataset and pick the personalized output hat is sent to the user. The system, keeps record of each end user's Search Pattern for human monitoring and evaluation.

The system commercializing and monetizing the user's search patterns using the Media Value database when using the Shopping Cart and Advertisement subsystem. Using the benefit of U.S. patent application Ser. No. 09/819,174, filed on Mar. 27, 2001 to Paiz (a parent to this Application) Virtual Maestro engages in a substantive communication with the user using the script database in order to promote products and services.

The system synchronizes all Virtual Maestro residing on the user console device to obtain interactively input using the benefit of U.S. patent application Ser. No. 09/819,174, filed on Mar. 27, 2001 to Paiz (a parent to this Application) allowing the artificial intelligence entities to instantiate substantive communication with users and promote as product licensed audio and video intellectual property "The Virtual Maestro is a product of artificial intelligence can also select and play televised or radio broadcast sports events selected by the individual subscriber, These events are stored in the system memory as they are broadcast from their source, so that the subscriber has the option of having a time delay introduced." The Virtual Maestro obtains from the Optimizer the optimal input and from the Encyclopedia the optimal dataset, and then searches the Script database using the "profile stored for the individual subscriber" to communicate with the user and sell licensed intellectual property.

The system uses the optimal input to pattern match the Encyclopedia to obtain the optimal dataset of an entity object, and related Positional, Probable and Plausible branching command instructions offered as natural variants entities to aid the end user in a search. The Virtual Maestro using the Script database to communicate updates to the output and offers (Interest Graph) ADDITIONAL KEYWORDS that aid the end user as associative and transitive natural variant entities to enhance the communication and "seem smart as if a human".

Using the benefit of U.S. patent application Ser. No. 09/819,174, filed on Mar. 27, 2001 to Paiz (a parent to this Application): "The selection of works by each subscriber is recorded and stored for marketing purposes and for automatic selection of works for the subscriber, such as by a Virtual Maestro. This information is used in part to customize the advertising displayed for the particular subscriber during playing of subsequently selected works. One such form of customized advertising is song or video previews which seem to fit within the established and individualized pattern of individual subscriber access. The accessed and played works also help a subscriber decide whether to purchase a compact disk or audio tape of a musical selection, or a digital video disk or video tape of a movie or music video. Such purchase is optionally offered through the supplier. In this way the system boosts rather than competes with compact disk and video sales." in this case the supplier is the system using (Interest Graph) business intelligence through the Virtual Maestro.

The system has rules of semantics for personalized objects by executing software instructions in particular keeps track of each user's search pattern for human monitoring and evaluation. Proactively, the system upon detecting a significant difference change to relevant search pattern automatically communicates (alternative suggestion to the query) to the user.

The system (Interest Graph) commercializes and monetizes the optimal dataset adding Shopping Cart and Advertisement functionalities using the Media Value database, now the Virtual Maestro executes software instructions to analyze the output with the Script database to instantiate communication with the user knowing and understanding what they are searching by possessing their trending data and personalized input probabilistic spatial environment inventoried as a collection of additional keywords (feature attribute) entity objects.

Virtual Maestro Interaction with the End User.

For Example: When the user transforms saying or typing "BIL" into "BILLY JOEL" by selecting a command instruction, the end user has selected a entity object and then the end user continues to type or say "JU" that becomes "BILLY JOEL JUST THE WAY YOU ARE" by selecting a command instruction, the end user has selected a natural variant (alternative suggestion, or feature attribute to the query) object; afterwards the user continues to type "HD" as in high definition quality that becomes "HD BILLY JOEL JUST THE WAY YOU ARE", the user has selected a nested entity object, now the system analyzing the usage pattern (Interest Graph) identifies a copyrighted product. Now the Virtual Maestro upon validating and/or furnishing licensing displays the intellectual property!

For Example: The Virtual Maestro creates the simulation input using the historical search usage pattern of behavior, and licensing and transactional information. During the interactions with the user obtains demographics, and measures level of satisfaction given a simulation output. The user asks the Virtual Maestro to monitor and update the World Cup qualifiers, immediately the question will be what type of event and offers a list of possibilities, otherwise the system would inundate the human with too much trivia simulation input. The user forgets to place a restriction and Virtual Maestro says player X got a yellow card, player Y is about to shot a corner kick . . . etc, after a while of being overwhelmed with the simulation output . . . the user say just update goals and final scores, and let me see all the related video highlights in particular for the Mexico-Germany game. Using the benefit of U.S. Pat. No. 7,058,601, filed as U.S. patent application Ser. No. 09/514,940 on Feb. 28, 2000 to Paiz (a parent to this application) the Virtual Maestro "continuously scans and gathers information from, understands, and interacts" and automatically detect the optimal dataset and engages in a direct communication with the human.

This means the system licenses, monetizes and commercializes all intellectual property presented to the end user (Interest Graph) by the Virtual Maestro as simulated output. The Virtual Maestro uses the scripting software residing in the memory of the device console and executes software instructions to analyze simulation input, comment or critique from its own perspective, using demographic, trending and satisficing usage patterns to avoid churn.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE PRESENT INVENTION

Figure 1:
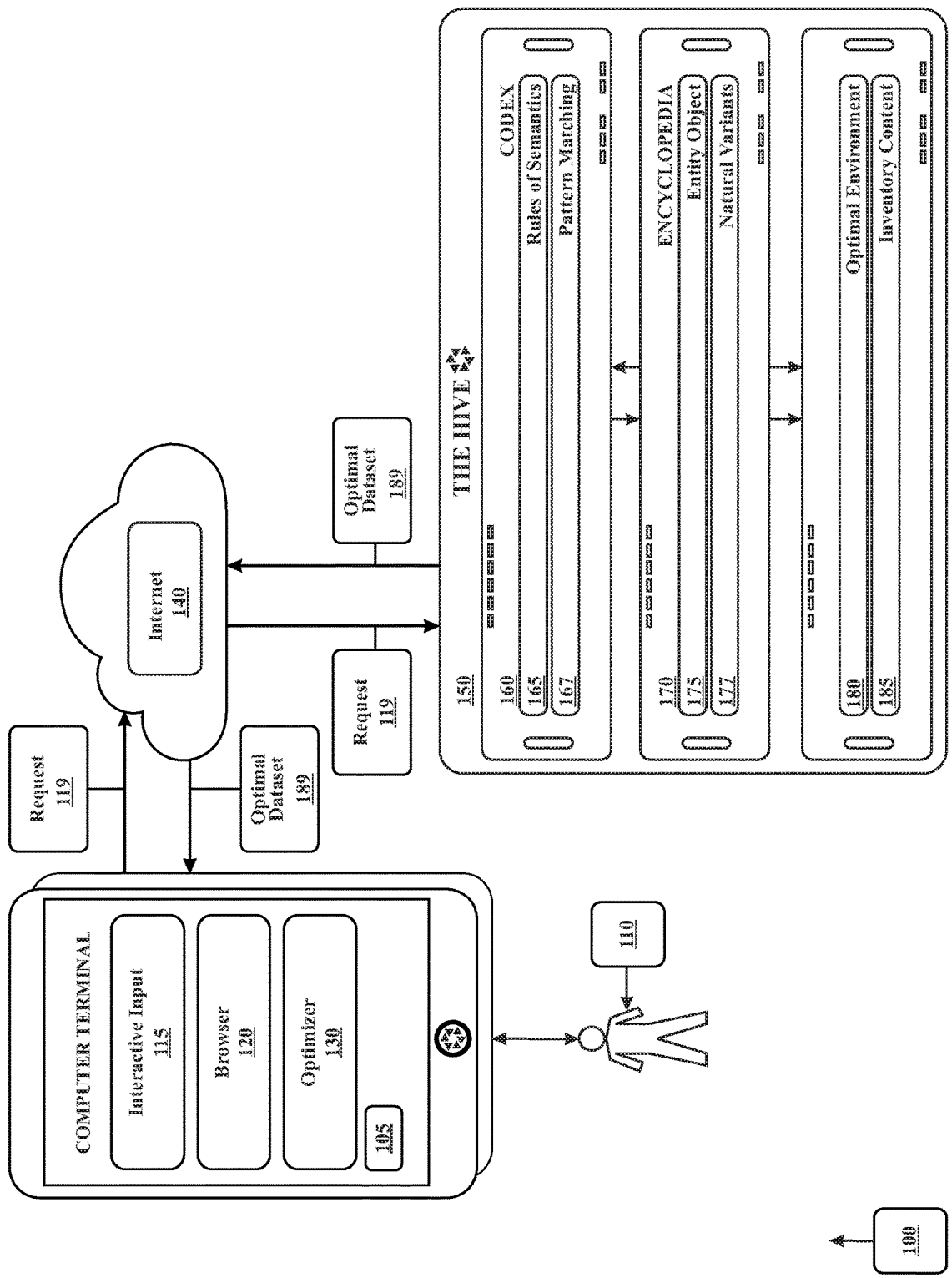
FIG. 1 presents an exemplary schematic flow diagram representing a Multilingual Search System in accordance with a first embodiment of the present invention.

In regards to FIG. 1, users 110 having a computer terminal 105, or subscriber device in digital communication with the Internet 140 and the system or the Hive 150, a browser 120, and an optimizer software program 130 residing in memory executing a set of instructions to transform interactive input 115 into a request 119 using rules of semantics 165 to find missing gaps of information and pattern matching 167 the Codex 160 to find an Entity Object 175.

U.S. Pat. No. 7,809,659, filed as U.S. patent application Ser. No. 11/584,941 on Oct. 23, 2006 to Paiz (a parent to this Application) teaches that an Entity Object 175 are bound to a simple layer of refinement or Superset (I) after commercializing and removing redundancy of the searchable environment, and subordinated associative Entity Object 175 are bound to a hybrid layer of refinement or Set (I, J), and that each subordinated transitive Entity Object 175 are bound to a complex layer of refinement or Subset (I, J, K), where I, J and K are independent variables, and Subset (I, J, K) are subordinate to Set (I, J) and Superset (I). The top weighted results become the optimal dataset 189 that becomes the output sent to users 110 computer terminal 105.

U.S. Pat. No. 7,809,659, filed as U.S. patent application Ser. No. 11/584,941 on Oct. 23, 2006 to Paiz (a parent to this Application) teaches: W_RANK: Electronic Files, Internet links and the associated HTML content can be standardized, organized and transformed into geospatial information. W_RANK: uses eigenvectors to identify the value of each link and its content, and the system must normalize this information into a compatible Partial Vector CDR. The lion share of the conversion and normalization is done by the specialized programming of the system 150, which gathers, distills and analyzes the virtual environment by mapping, standardizing, organizing and transforming the information into logical groups and sets (knowledge graphs) to make them compatible and can also be personalized when using a historical profile (Interest Graph).

The collection of valid and relevant top pages becomes the optimal dataset 189 that probabilistically maps an optimal environment 180 and each web page and portions thereof having relevance to the Entity Object 175, 177 becomes Inventory Content 185 that are offered as ADDITIONAL KEYWORDS (Suggestions) that aid the end user to reach the final destination.

Figure 2:
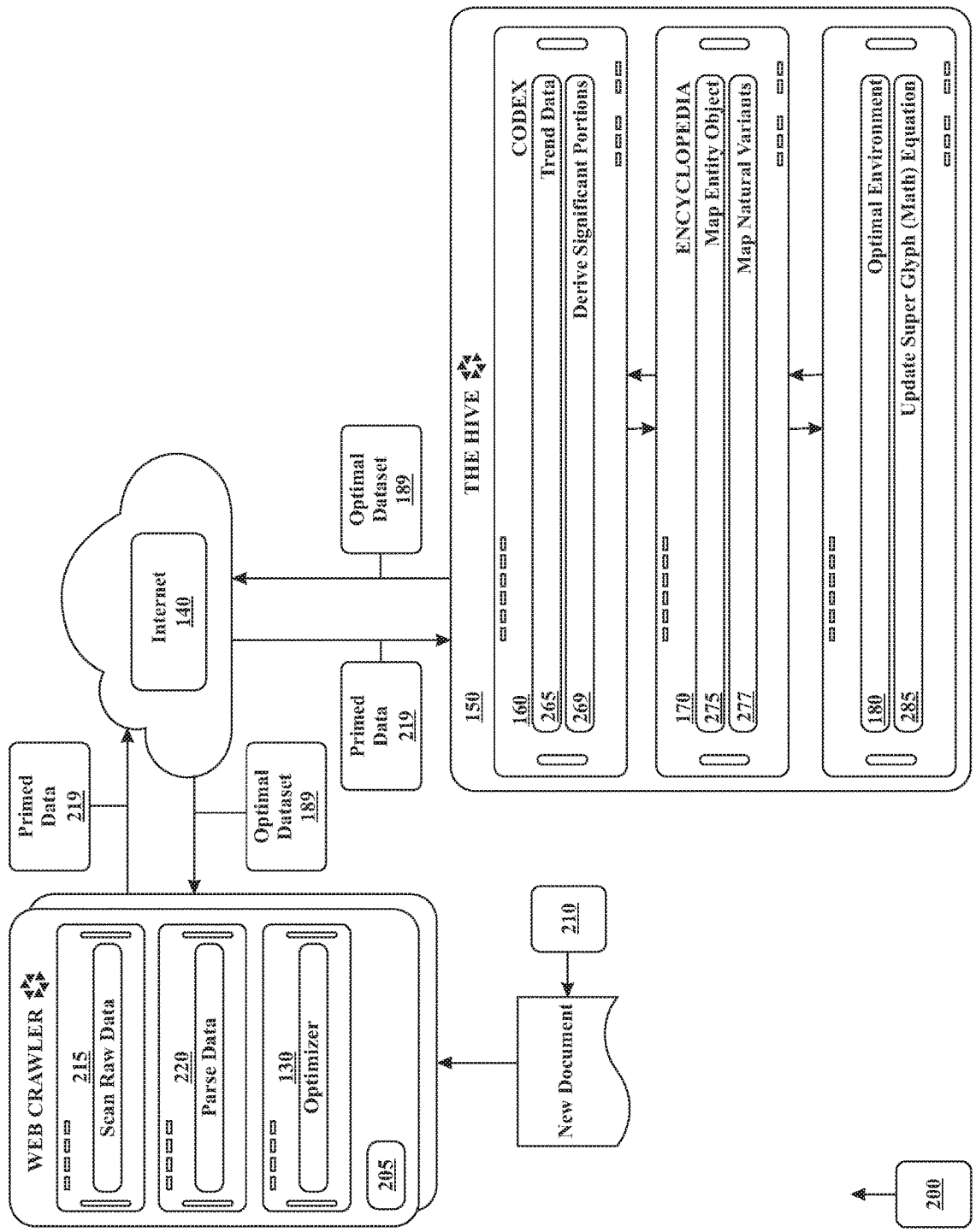
FIG. 2 presents an exemplary schematic flow diagram representing a process of creating/updating a Multilingual Human Knowledge Encyclopedia in accordance with the first embodiment of the present invention.

In regards to FIG. 2, the Web Crawler sub system 200 continuously monitors and scans changes in the virtual environment in this case the Internet 140, coordinating Web Crawlers 205, to identify New Documents 210 and then using an Optimizer program 130 to parse data 220 using rules of grammar and semantics to process raw data 215, into primed data 219 comprehensible for human monitoring and evaluation and sends the primed data to the HIVE 150.

The HIVE 150 continuously updates the Codex 160 with the primed data 219 to determine patterns of behavior or trend data (or Interest Graph) 265 fluctuations that identify changes in the virtual environment and then derives significant portions 269 of the content to update in real time the Encyclopedia 170 and map entity objects 275 and subordinated layer of refinement natural variants 277. For each mapped (feature attributes and alternative suggestions) entity object 275, 277 belonging to a layer of refinement, the human knowledge encyclopedia 170 updates the corresponding optimal environment 180 and super glyph mathematical equation 285 is used to select the output that is sent to the end user.

U.S. Pat. No. 7,809,659, filed as U.S. patent application Ser. No. 11/584,941 on Oct. 23, 2006 to Paiz (a parent to this Application) teaches in particular each (initial search query) entity object 275 has a join, simple, hybrid, complex and optimal layers of refinement, wherein the subject layers corresponding to the managerial hierarchical partition (alternative suggestions) sub partition for a given keyword search. And U.S. Pat. No. 7,908,263, filed as U.S. patent application Ser. No. 12/146,420 on Jun. 25, 2008 to Paiz (a parent to this application) teaches how to transform the keyword search into a mathematical lingua franca search pattern, and for each entity object corresponding layer of refinement the top (n) results become the optimal environment 180.

Figure 3:
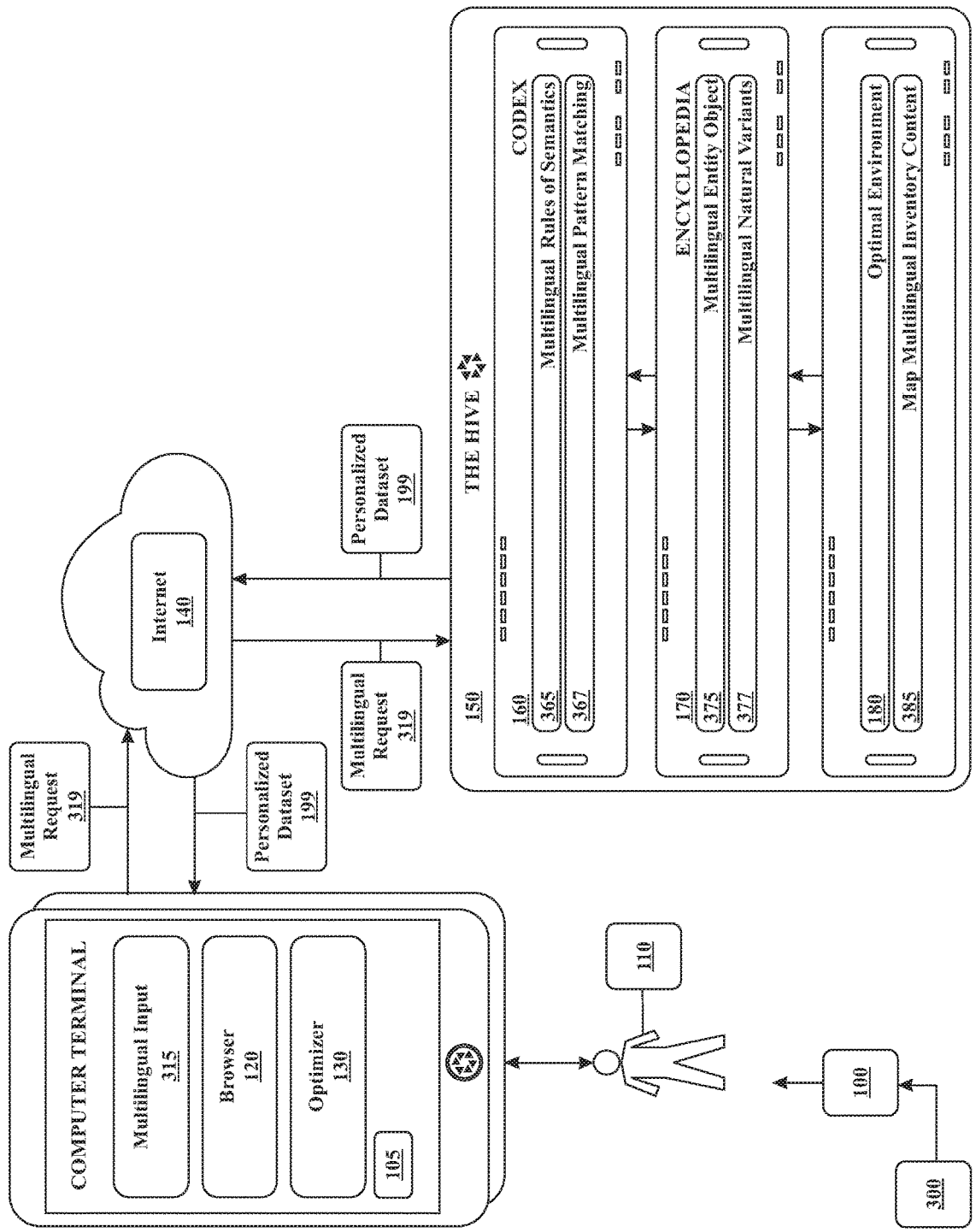
FIG. 3 presents an exemplary schematic flow diagram representing a Multilingual Requests (mapping lingua franca translations) in accordance with the first embodiment of the present invention.

In regards to FIG. 3, A Multi lingual Search Engine System 300 working in parallel with the Search Engine system 100 has a plurality of users 110 using a computer terminal 105, or device console in digital communication with the Internet 140, and the Hive 150, using a browser 120, and an optimizer software application 130 residing in memory executing a set of instructions to transform multi lingual interactive input 315 using for each language the corresponding rules of grammar and semantics to find missing gaps of information into a request 319.

The Hive 150 programmed with artificial intelligence programs performs predefined ad hoc tasks using the Codex 160 inventory control system based on multi lingual rules of semantics 365 to perform multi lingual pattern matching 367 based on associative, likelihood and relevancy comparisons using the human knowledge encyclopedia 170 to identify the most significant multi lingual Entity Object 375 and corresponding set of "feature attributes" or "alternative query suggestions to the initial search" or Natural Variants 377 command instructions key featured associations and transitive related subordinated Entity Objects 375 that can be used to improve the end user multi lingual interactive input 315.

U.S. Provisional patent application Ser. No. 60/184,537, filed on Feb. 24, 2000 to Paiz (a parent to this Application) teaches how to provide a common language Lingua Franca to the HIVE 150 that allows all components to communicate amongst themselves, and assigns a social security number to tract each unique transaction, in this case Entity Object 175 or Multi lingual Entity Object 375 stored in the Encyclopedia. Also how to integrate all the communication packets and vector trajectories into a lingua franca so that all the component might understand, taking into account each of the manufactures black boxes that only need to interact with the network. This form of component encapsulation protects technology while allowing the system to be open and to use its own packet format. The HIVE 150 integrates data mining warehouses to continuously monitor each user activities and usage patterns of behavior with the environment to probabilistically weight customer satisfaction and churn (Interest Graph) and improve the TQM of the organization and provide live decision support systems and personalized output.

The collection of valid and relevant top pages becomes the (Interest Graph) or personalized dataset 199 that probabilistically maps an optimal environment 180, and each web page and portions thereof having relevance to the Entity Object 375, 377 becomes multi lingual Inventory Content 385 that are offered as "feature attributes" or "alternative suggestions" or ADDITIONAL KEYWORDS that aid the end user to reach the final destination.

Figure 4:
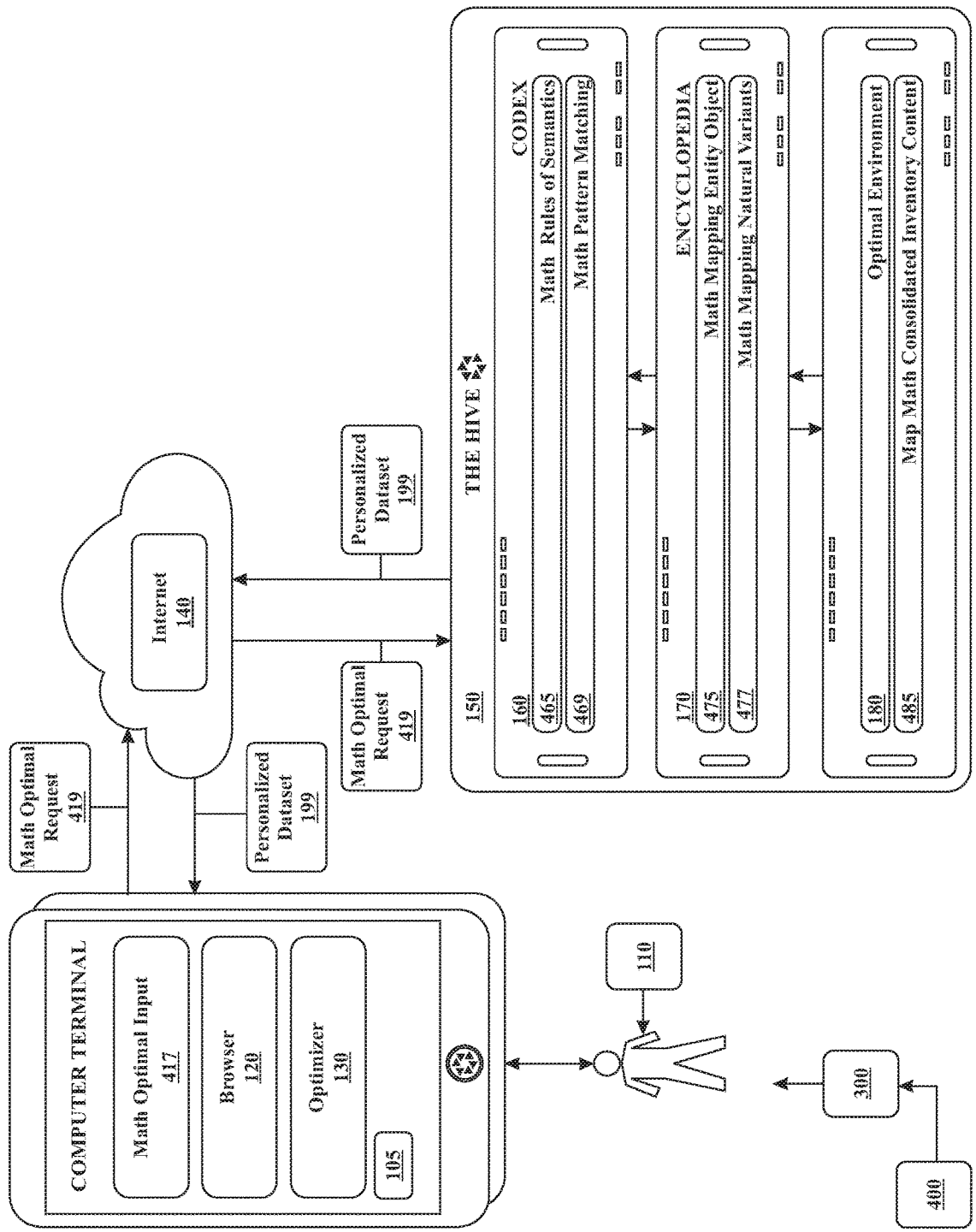
FIG. 4 presents an exemplary schematic flow diagram representing a Super Glyph Math Request (in lieu of linguistics) in accordance with the first embodiment of the present invention.

In regards to FIG. 4, Super Glyph Math Probabilistic Spatial Environment 400 uses the optimizer software application 130 residing in memory executing a set of instructions to create a math optimal input 417 for the Search Engine System 100 and Multi Lingua Sub System that has a plurality of users 110 using a computer terminal, or device console 105, in digital communication with the Internet 140 and the Hive 150 using a browser 120 to search with the math optimal request 419. U.S. Pat. No. 7,908,263, filed as U.S. patent application Ser. No. 12/146,420 on Jun. 25, 2008 to Paiz (a parent to this Application) teaches first, deciphering and solving and optimal Super Glyph mathematical equation using deductive reasoning, second translating the end user's language based request into a single Super Glyph equation and third using the Super Glyph equation to obtain information from any give language by using math in lieu of linguistics.

U.S. Pat. No. 7,809,659, filed as U.S. patent application Ser. No. 11/584,941 on Oct. 23, 2006 to Paiz (a parent to this Application) teaches in particular: the working XCommerce was originally fine tuned using English and Spanish, so that the system could readily import other languages. Since, the English language is used as the lingua franca for trade and commercial transactions.

The Hive 150 programmed with artificial intelligence programs performs predefined ad hoc tasks using the Codex 160 inventory control system based on math rules of semantics 465 to perform math pattern matching 467 based on associative, likelihood and relevancy comparisons using the Encyclopedia 170 to identify the most significant math Entity Object 475 and corresponding set of Natural Variants 477 command instructions ("feature attributes" or "alternative suggestion") or key featured associations and transitive related subordinated Entity Objects 475 that can be used to improve the end user math optimal input 417.

The collection of valid and relevant top pages becomes the personalized dataset 199 that probabilistically maps an optimal environment 180, and each web page and portions thereof having relevance to the Entity Object 475, 477 becomes math consolidated Inventory Content 485. Note: 175, 177 are single language Entity Object, 375, 377 are multi lingua Entity Objects and when searched mathematically in lieu of linguistics 475, 477 using a right side of the brain search using a set of vectors offered as "feature attributes" or "alternative suggestions" or ADDITIONAL KEYWORDS that aid the end user to reach the final destination.

Figure 5:
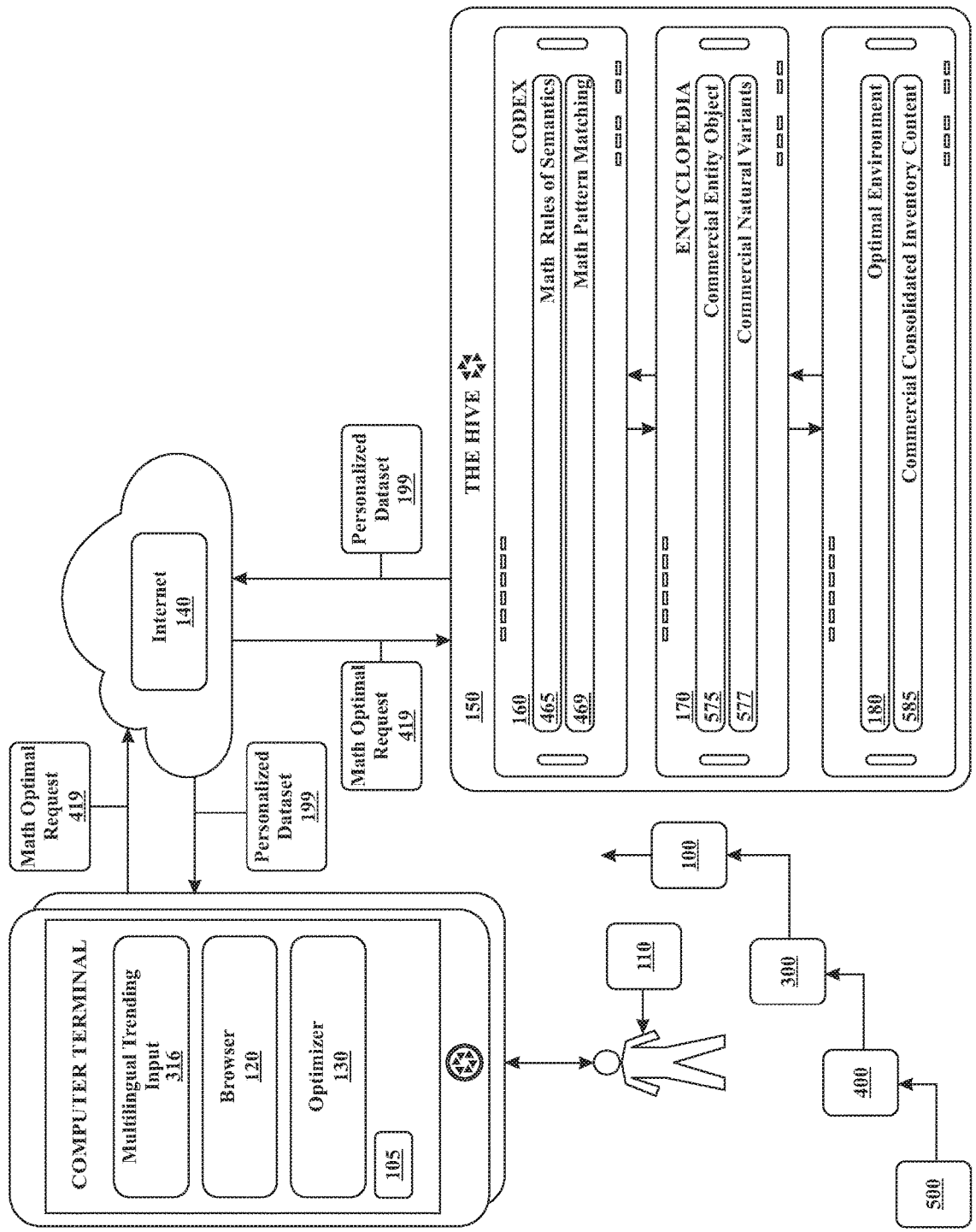
FIG. 5 presents an exemplary schematic flow diagram representing a Lingua Franca Requests (monetized and commercialized) in accordance with the first embodiment of the present invention.

In regards to FIG. 5, the illustration is similar to FIG. 4, except FIG. 5 uses the Encyclopedia 170 to commercialize and monetize Entity Objects 575, and Natural Variants 577 values belonging to the probabilistic spatial environment. This is how the bills are paid, and 3rd parties compete to displays advertisements to the users based on interaction, demographics and usage pattern (interest graph), to create commercial value consolidated Inventory Control 585. Intertwining ideas and concepts probabilistically using commercial, language, demographic and geospatial data.

U.S. patent application Ser. No. 11/085,678 on Mar. 21, 2005 to Paiz (a parent to this Application) teaches Optimal Valorized Advertisement using a distributed system amongst the territorial boundaries that organizes, mimics and is programmed to find and match the most valuable customized targeted and consensual advertisement between multiple Corporate Sponsors a one specific individual. The system can be filtered and monitored as smart input using local Zip Code, or Global based on the fact that the person demographics and X, Y, Z GIS coordinates are known. This will allow Corporations to specify distinct areas of coverage, or billing the exact territorial franchise store by ANI range, IP Address or Zip Code. Based on the end user's willingness to give information the system will negotiate the best value and then verifies individual consent and gives them the up to date credits for displaying and rendering of the advertisement they want to view. The Hive 150 takes into account (the interest graph): uniqueness, demographics, and frequency or usage of advertisement such as daily, weekly, monthly and yearly periods to commercialize the spatial environment 500.

Multi language concepts in FIG. 1 to FIG. 5 can also be applied follows:

Single Language: As the user types or speaks interactive input, or preferably using the benefit of U.S. Pat. No. 7,908,263, filed as U.S. patent application Ser. No. 12/146,420 on Jun. 25, 2008 to Paiz (a parent to this Application) transforms the input into a search pattern using rules of grammar and semantics. Now, the system 150 bypasses the search engine and searches the Codex 160 and responds with optimal links, and additional entity object also known as "feature attributes" or key featured associations and transitives that aid the end user reach the final destination.

Mathematical Language: Interactive input using the benefit of U.S. Pat. No. 7,908,263, filed as U.S. patent application Ser. No. 12/146,420 on Jun. 25, 2008 to Paiz (a parent to this application) is transformed into a vector V search pattern using rules of grammar and semantics with a corresponding Super Glyph equation. Then the system 150 searches the Codex 160 and responds with optimal links, and additional entity objects also known as "feature attributes" or key featured associations and transitives that aid the end user reach the final destination.

Geospatial Language: Interactive input using the benefit of U.S. Pat. No. 7,908,263, filed as U.S. patent application Ser. No. 12/146,420 on Jun. 25, 2008 to Paiz (a parent to this application) is transformed into an optimal input using rules of grammar and semantics and then using the benefit of U.S. Pat. No. 7,809,659, filed as U.S. patent application Ser. No. 11/584,941 on Oct. 23, 2006 to Paiz (a parent to this Application) the end user's location to map a smart input search pattern with a corresponding Super Glyph equation the system 150 searches the Codex 160 and responds with optimal links, and additional entity object also known as "feature attributes" or key featured associations and transitives that aid the end user reach the final destination.

Commercial Language: same as geospatial when a commercial keyword exists the Shopping Cart functions identifies entity objects as FOB pick up or delivery locations or ANI.

FIGS. 6 to 10 Present a Second Embodiment (Surveillance of Input/Output)

Figure 6:
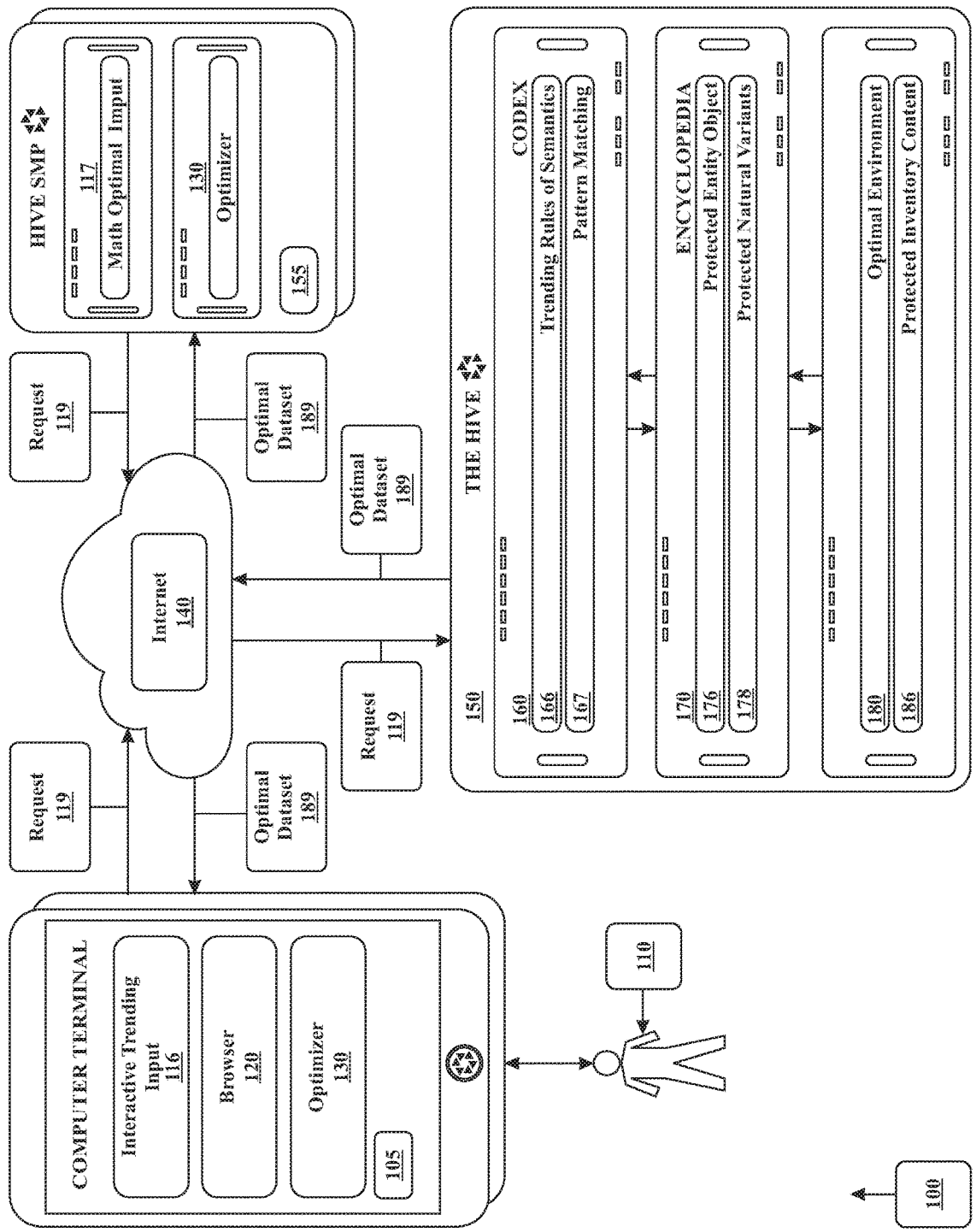
FIG. 6 presents an exemplary schematic flow diagram representing a Surveillance Search System in accordance with a second embodiment of the present invention.

In regards to FIG. 6, the Search Engine system 100 has a plurality of users 110 using a computer terminal 105, or subscriber device or device console, and software for imparting artificial intelligence to system hardware HIVE SMP 155, in digital communication with the Internet 140 and the Hive 150, using a browser 120, and an optimizer software application 130 residing in memory executing a set of instructions to transform interactive trending input 116 using rules of grammar and semantics to find missing gaps of information into a request 119.

The Hive 150 continuously updates the Codex 160 with significant primed data to Map Optimal Input 117 and determine patterns of behavior using trend rules of semantics 166 to identify changes in the environment. Then performs pattern matching 167 using associative, likelihood and relevancy comparisons to search the human knowledge Encyclopedia 170 to identify protected Entity Object 176 and subordinated Entity Objects 175 and related key featured associations and transitive Natural Variants 178 offered as ADDITIONAL KEYWORDS that aid the end user to improve the end user interactive trending input 116.

The collection of valid and relevant top pages becomes the optimal dataset 189 that probabilistically maps an optimal environment 180, and each web page and portions thereof having relevance to the Entity Object 175, 177 becomes Protected Inventory Content 186 that are used as ADDITIONAL PROTECTED KEYWORDS tract user interactive trending input 116.

Figure 7:
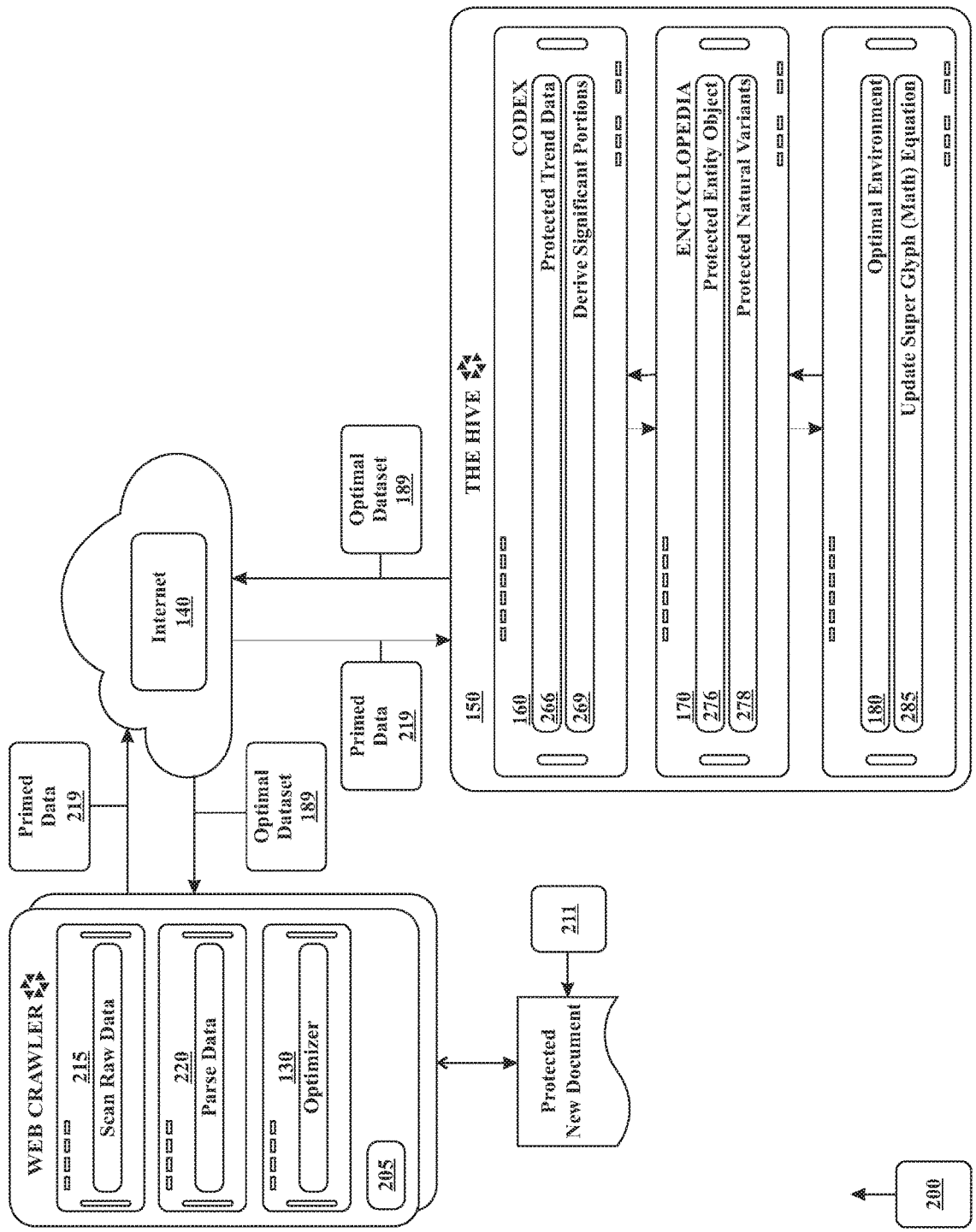
FIG. 7 presents an exemplary schematic flow diagram representing a process of creating/updating a Surveillance Human Knowledge Encyclopedia in accordance with the second embodiment of the present invention.

In regards to FIG. 7, the Web Crawler sub system 200 continuously monitors and scans changes in the virtual environment or the Internet 140, coordinating a plurality of Web Crawlers 205, to identify protected New Documents 211 and then using an Optimizer 130 parse data 220 using rules of grammar to process and organize raw data 215, into primed data 219 comprehensible for human monitoring and evaluation and sends the primed data to the Hive 150.

The Hive 150 continuously updates the Codex 160 inventory control system with the primed data 219 to determine patterns of behavior or protected trend data 266 fluctuations to identify changes in the virtual environment. Then derives significant portions 269 of the content to update in real time the Encyclopedia 170 and map protected entity objects 276 and subordinated layer of refinement protected natural variants 278. For each protected mapped entity object 276, 278 belonging to a layer of refinement the human knowledge Encyclopedia 170 updates the corresponding optimal environment 180 and super glyph map equation 285 used to derive the output that is sent to the end user.

Using the benefit of U.S. Pat. No. 7,809,659, filed as U.S. patent application Ser. No. 11/584,941 on Oct. 23, 2006 to Paiz (a parent to this Application) each entity object 275 has a join, simple, hybrid, complex and optimal layers of refinement, wherein the subject layers corresponding to the managerial hierarchical partition sub partition for a given keyword search. Thus when doing surveillance the same applies to protected entity objects 276. U.S. Pat. No. 7,908,263, filed as U.S. patent application Ser. No. 12/146,420 on Jun. 25, 2008 to Paiz (a parent to this Application) transforms the keyword search into a mathematical lingua franca search pattern, and for each entity object corresponding layer of refinement the top (n) results become the optimal environment 180.

Figure 8:
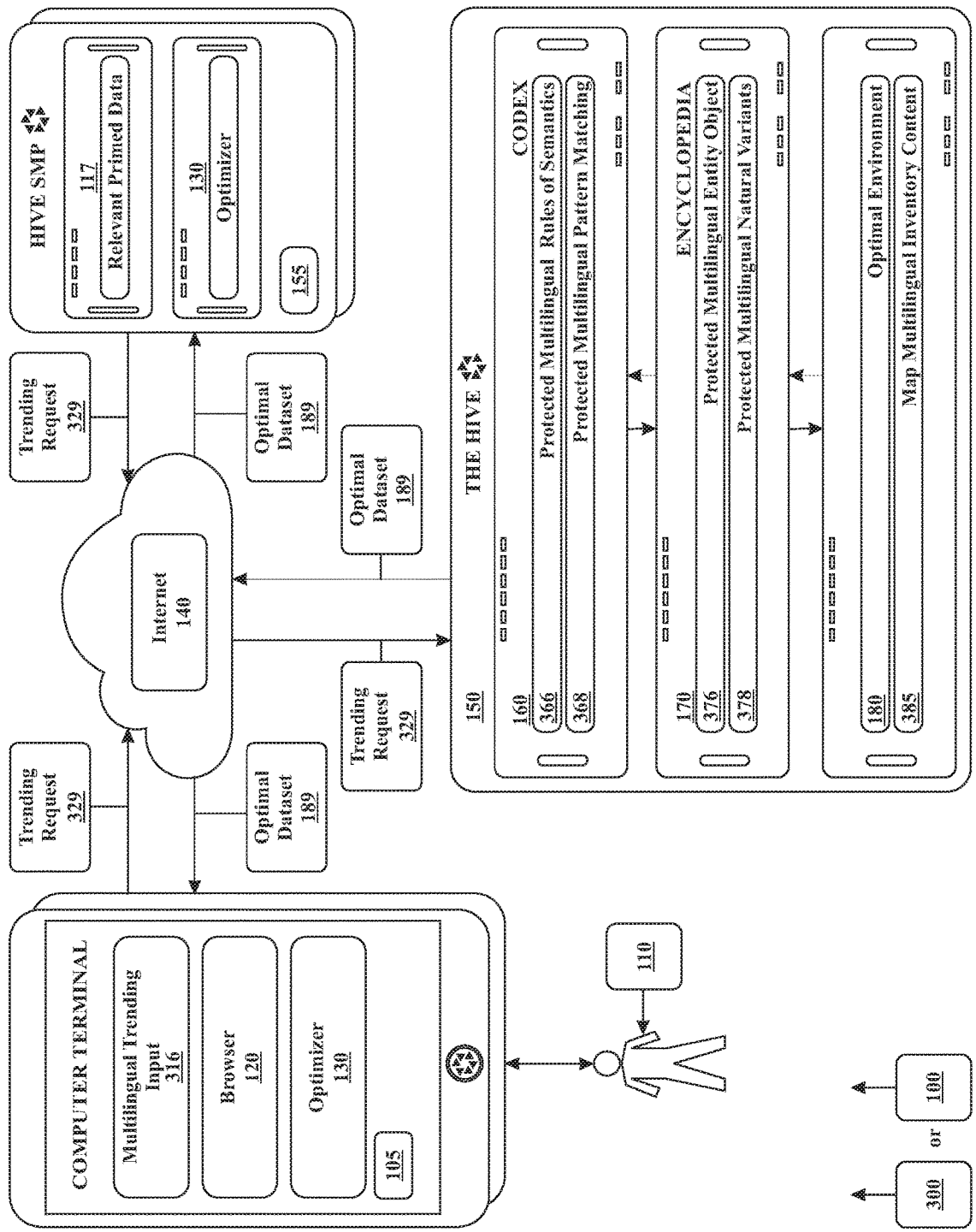
FIG. 8 presents an exemplary schematic flow diagram representing a Surveillance Requests (mapping translations) in accordance with the second embodiment of the present invention.

In regards to FIG. 8, the Multi lingual Search Engine System 300 works in parallel with the Search Engine system 100 has a plurality of users 110 using a computer terminal 105, or device console, using a browser 120, and an optimizer software application 130 residing in memory executing a set of instructions to transform multi lingual interactive input 315 using for each language the corresponding rules of grammar and finding missing gaps of information into a request 319 in digital communication with the Internet 140 and the Hive 150.

The Hive 150 programmed with artificial intelligence programs performs predefined ad hoc tasks using the Codex 160 inventory control system applying protected multi lingual rules of semantics 366 to perform protected multi pattern matching 368 using associative, likelihood and relevancy comparisons to search the human knowledge Encyclopedia 170 to identify significant protected Entity Object 376 and subordinated protected multi lingual Entity Objects 385 and related key featured associations and transitive natural variants 378 to tract as ADDITIONAL PROTECTED KEYWORDS end user multi lingual trending input 316.

U.S. Provisional patent application Ser. No. 60/184,537, filed on Feb. 24, 2000 to Paiz (a parent to this Application) teaches how to provide a common language Lingua Franca to the HIVE 150 that allows all components to communicate amongst themselves, and assigns a social security number to tract each unique transaction, in this case Entity Object 175 or Multi lingual Entity Object 375 object stored in the Encyclopedia. The HIVE 150 data mining software continuously monitors the environment to provide live decision support systems.

The collection of valid and relevant top pages becomes the personalized dataset 199 that probabilistically maps an optimal environment 180, and each web page and portions thereof having relevance to the Entity Object 375, 377 becomes multi lingual Inventory Content 385 that are offered as ADDITIONAL KEYWORDS that aid the end user to reach the final destination.

Figure 9:
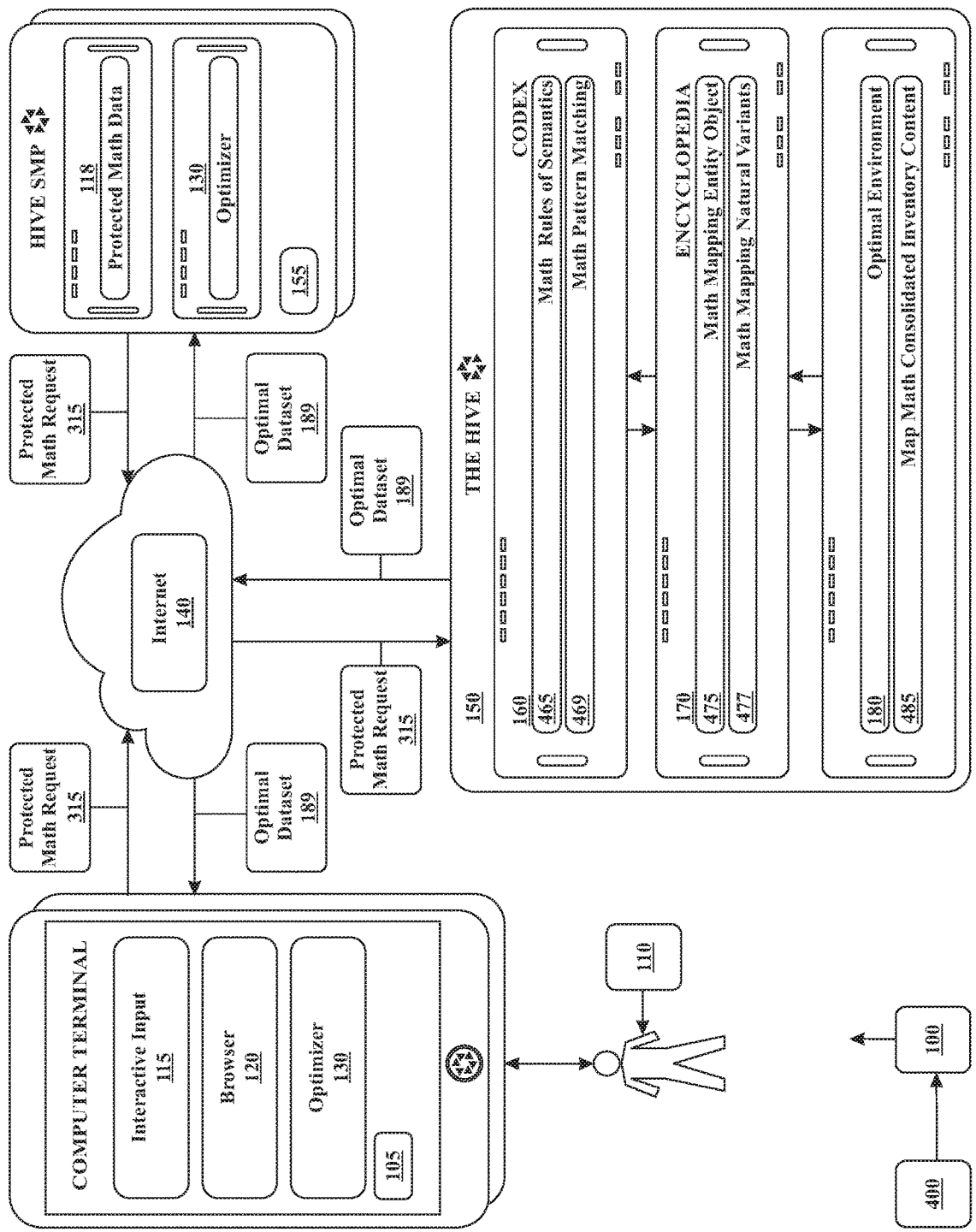
FIG. 9 presents an exemplary schematic flow diagram representing a Super Glyph Math Surveillance Request (in lieu of linguistics) in accordance with the second embodiment of the present invention.

In regards to FIG. 9, Super Glyph Protected Math Probabilistic Spatial Environment 400 uses the optimizer software application 130 residing in memory executing a set of instructions to transform text, audio and video input into a protected math input 118 for the Search Engine System 100 that has a plurality of users 110 using a computer terminal, or device console 105, and software for imparting artificial intelligence to system hardware HIVE SMP 155, using a browser 120 in digital communication with the Internet 140 and the Hive 150 to search with the protected math request 418 in lieu of the traditional linguistic request. U.S. Pat. No. 7,908,263, filed as U.S. patent application Ser. No. 12/146,420 on Jun. 25, 2008 to Paiz (a parent to this Application) teaches first, deciphering and solving and optimal Super Glyph mathematical equation using deductive reasoning, second translating the user's language based request into a single Super Glyph equation and third using the Super Glyph equation to obtain information from any give language by using math in lieu of linguistics. U.S. Pat. No. 7,809,659, filed as U.S. patent application Ser. No. 11/584,941 on Oct. 23, 2006 to Paiz (a parent to this application) teaches XCommerce uses English and Spanish, so that the system could readily import other languages. In this case, math.

The Hive 150 programmed with artificial intelligence programs performs predefined ad hoc tasks using the Codex 160 inventory control system based on math rules of semantics 465 to perform math pattern matching 467 using associative, likelihood and relevancy comparisons to search the Encyclopedia 170 and find significant math Entity Object 475 and collection set of subordinated Entity Objects 475 comprising of key featured associative and transitive Natural Variants 477 that might improve the user's protected math request 418.

The collection of valid and relevant top pages becomes the personalized dataset 199 that probabilistically maps an optimal environment 180, and each web page and portions thereof having relevance to the Entity Object 475, 477 becomes math consolidated Inventory Content 485. Note: 175, 177 are single language Entity Object, 375, 377 are multi lingua Entity Objects and when searched mathematically in lieu of linguistics 475, 477 are math Entity Objects offered as ADDITIONAL PROTECTED KEYWORDS that aid the end user to reach the final destination, where the command instructions are presented preferably using linguistic entity objects to end users 110 and as lingua franca mathematical Super Glyphs to the Virtual Maestro 700.

Figure 10:
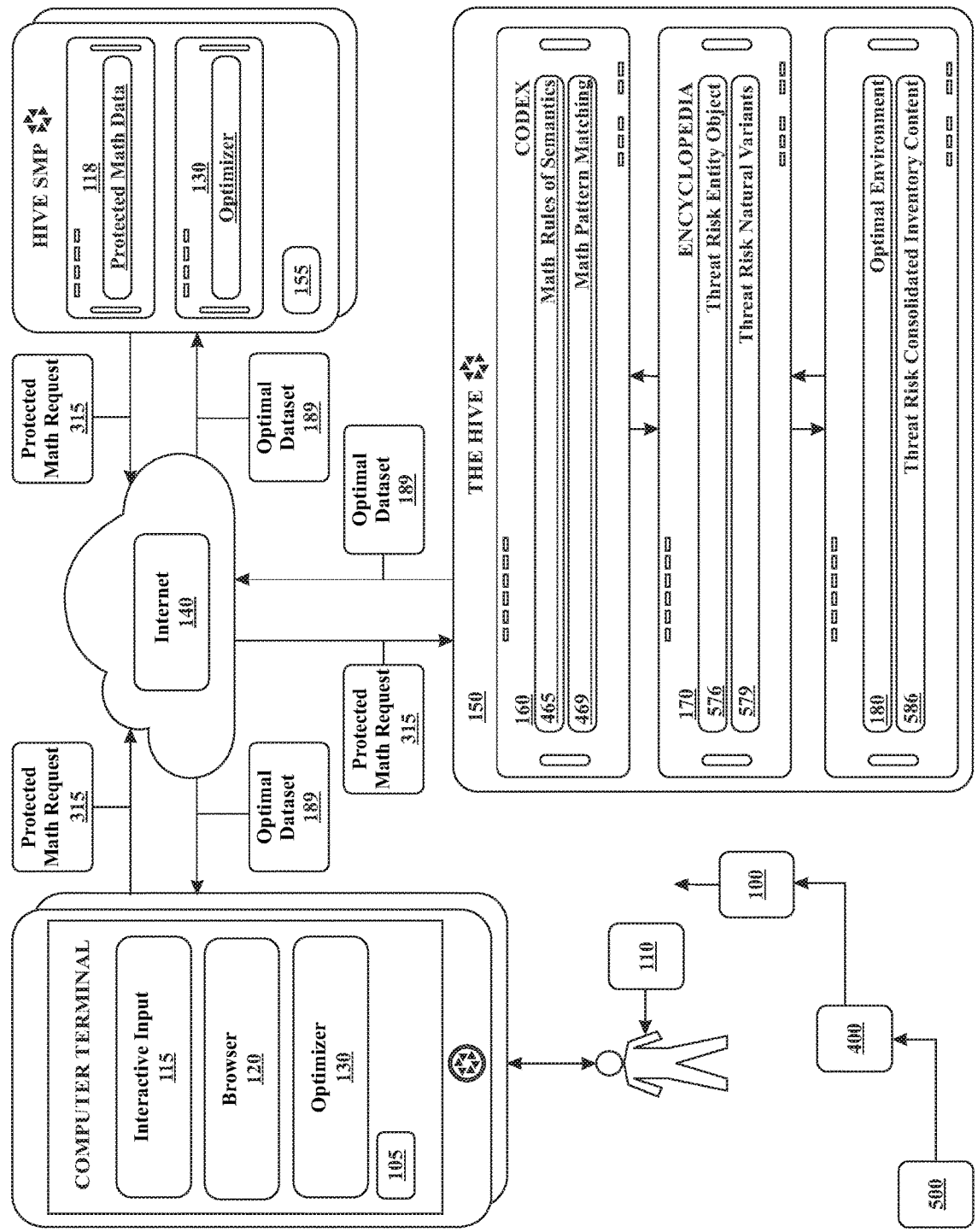
FIG. 10 presents an exemplary schematic flow diagram representing Lingua Franca Surveillance Requests (threat and social pattern) in accordance with the second embodiment of the present invention.

In regards to FIG. 10, threat rating the Super Glyph Math probabilistic spatial environment 400 based on safety values of the threat risk Entity Objects 576, and threat risk Natural Variants 579, which is information used to perform surveillance on the users, and creates the threat risk consolidated Inventory Control 586. Intertwining ideas and concepts probabilistically with threat risks based on probable cause, commercial, content, demographic and geospatial data.

U.S. patent application Ser. No. 11/085,678 on Mar. 21, 2005 to Paiz (a parent to this Application) teaches Phoenix Countermeasures: consists of an independent set of nodes that analyze the known traffic and determine patterns of behaviors to filter out copyrighted materials from the ocean of files transmitted over the Internet. This software is also responsible for killing P2P file transfers that are uploading/downloading unlicensed files. This program is responsible to modifying and updating SNOOP search patterns. And SNOOP consists of a plurality of Spy ware software that are continuously detecting P2P file transfer over specific IP Address and Website based known geographical location. Each P2P requires a transmitter and receiver end users that are identified and then update the Information Portal with each end user "piracy" threat level, identity, demographics and approximate known X, Y, Z GIS. The Hive 150 assigns risk "piracy" threat levels based on the usage pattern of behavior and GPS coordinates.

FIGS. 11 to 15 teaches how the Virtual Maestro 700 reads the Super Glyph equation and the corresponding Codex Page 169 to perform knowledge discovery and figure out the layer of refinement to know what the human wants and can communicate, the Optimizer 130, Scripted Algorithm 630 and Virtual Maestro 700 store the information in the user profile.

In particular, the software for imparting artificial intelligence to system hardware HIVE SMP 155, the Virtual Maestro 700 scripts understands and interacts or communicates via (A) Interactive, (B) Assisted, (C) Smart, Personalized and (D) Direct Input and furnishes Inventory Content 185 statistical objects that probabilistically are offered as ADDITIONAL KEYWORDS that aid the end user to reach the final destination, and attenuates the lion share of links as improbable or irrelevant as follows:
  (A) Monitoring Interactive Input 2 or Assisted Input 3 independent variables
  (B) Reactive Smart Input 4 independent variables using GPS data.
  (C) Proactive Personalized Input 5 independent variables using TDR
  (D) Interacts Direct Input 6 independent variables since input maps output.

Figure 11:
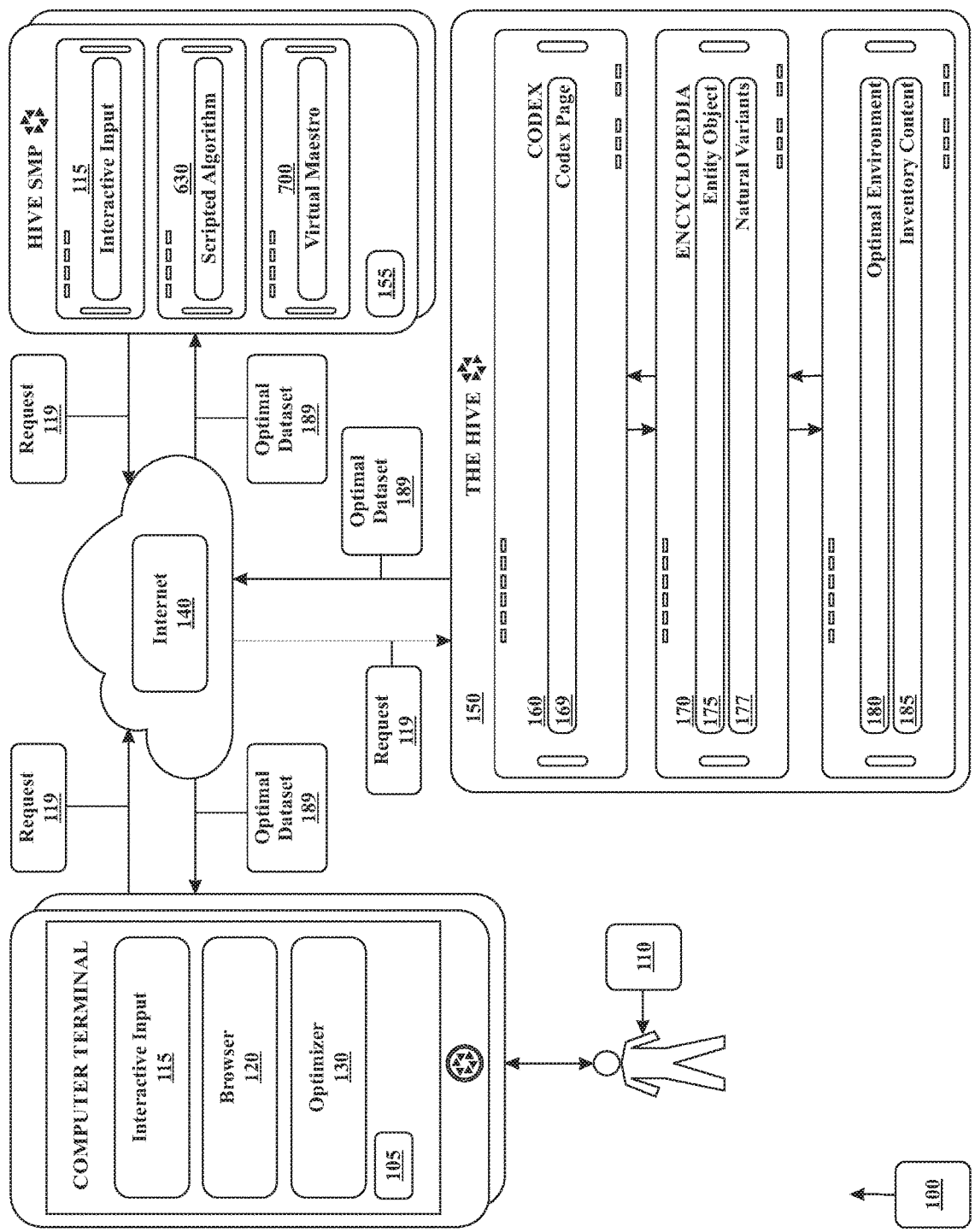
FIG. 11 presents an exemplary schematic flow diagram representing a Scripted Interactive Virtual Maestro Communication in accordance with a third embodiment of the present invention.

In regards to FIG. 11, Scripted Interactive Virtual Maestro Communication from FIG. 1, as the user 110 types in the Browser 120 or speaks to the optimizer software application 130 residing in memory of the computer terminal 105, executes a set of instructions to transform interactive input 115 into a request 119, and is in digital communication with the Codex 160 inventory control system to search and find the best fit Codex Page 169, and responds with the pre-calculated and preprocessed optimal environment 180 and corresponding Inventory Content 185. Now, in parallel as the end user types or speaks the Scripted Algorithm application 630 residing in memory executes a set of instructions to transform interactive input 115 into a request 119, and sends it to the Codex 160 inventory control system, and responds with the optimal environment 180 and corresponding Inventory Content 185.

Now, the Optimizer 130 the software for imparting artificial intelligence to system hardware HIVE SMP 155, uses the optimal environment 180 Super Glyph equation to map and weight the probabilistic spatial environment Inventory Content 185, and offers Entity objects 175 and Natural Variants 177 that aid the end user to reach the final destination.

Note: The user's optimizer software application 130 creates the optimal input whereas the Virtual Maestro obtains the optimal input from the preprocessed and pre-calculated Inventory Content 185, and Entity objects 175 and Natural Variants 177 of a particular Codex Page 169.

Figure 12:
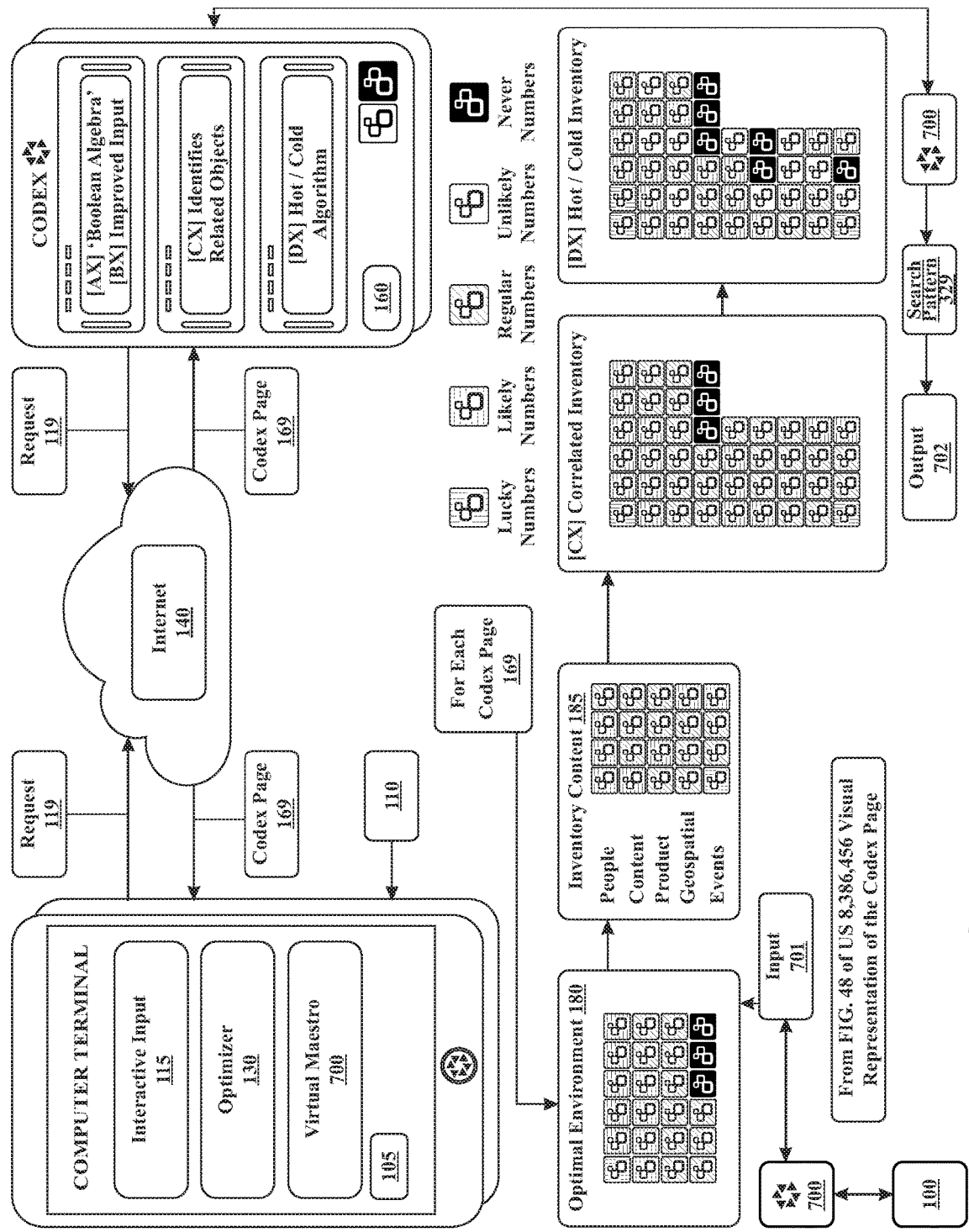
FIG. 12 presents an exemplary schematic flow diagram representing a process where the Virtual Maestro creates a probabilistic spatial environment for an output in accordance with the third embodiment of the present invention.

In regards to FIG. 12, Virtual Maestro creates the output probabilistic spatial environment for the system 100 from FIG. 1 as the user types or speaks or makes decisions using the Virtual Maestro 700. The optimizer software application 130 residing in memory executes a set of instructions to transform interactive input 115 into a request 119, and is in digital communication with the Codex 160 to search and find the best fit Codex Page 169, and responds with the pre-calculated and preprocessed optimal environment 180 and corresponding Inventory Content 185, and offers Entity objects 175 and Natural Variants 177 that aid the end user to reach the final destination.

During the process of index refinement of human knowledge the Codex 160 performs the process of Triangulation Deductive Reasoning or TDR: First: [AX] Maps a searchable environment using 'Boolean Algebra'. Second: [BX] Finds missing gaps of information and attenuates using Never Glyphs the lion share of web pages. Third: [CX] Identifies Related Objects and purifies using Unlikely Glyphs attenuate web pages as improbable until mapping an optimal environment 180 and creates and stores the dataset of Entity objects 175 and Natural Variants 177 in the corresponding Codex Page 169 as probable branching combinations. Fourth: [DX] Performs the Hot/Cold algorithm to gain factor Regular, Likely and Lucky Glyphs that are variables that significantly improve a search pattern 329.

When Index Refining to the Nth transitives or plausible constructs index relationships are mapped. For each valid probable branching 960 position the Codex 160 promotes each transitive construct as a plausible index relationship to the search pattern 329. The Codex 160 attenuates pages not matching the index relationships and exhaustively for each transitive construct determines if a new position exists when the number matches exceed a threshold.

The Hive 160 upon receiving a request 119 sends the Codex Page 169 to the Optimizer 130 and Virtual Maestro 700. The Inventory Content 185 comprises Lucky, Likely, Regular command instructions organized by inventory 'related object' subcategories types offered as ADDITIONAL KEYWORDS that aid the end user to reach the final destination.

The optimizer 130 uses the request 119 Codex Page 169 to evaluate the Inventory Content 185 and map the Input probabilistic spatial environment 701. The Virtual Maestro 700 uses the request 119 search pattern 329 to weight the Codex Page 169 [DX] Hot/Cold algorithm optimal environment 180, and performs a discrete computational analysis by obtaining the preprocessed Codex Page 169 "as if the user has selected a particular" Entity Objects 177 (or Lucky Numbers) and additional related associative Natural Variant combinations to further improve the search and then updates each newly derive Entity Object 175 and Natural Variants 177 into the Inventory Content 185 to map the Output probabilistic spatial environment 702.

The Virtual Maestro 700 using a search pattern 329 maps the Output probabilistic spatial environment 702, based on "as if the user has selected a particular" Entity Objects 177 and associative Natural Variants 177 combination, performs a discrete computational analysis by obtaining the preprocessed Codex Page 169 "as if the Virtual Maestro has selected a particular" Entity Objects 177 and with additional related associative Natural Variant combinations finds the human knowledge optimal combination to engage a communication with the user 110.

By passing all calculations, since the Codex 160 has preprocessed and pre-calculated each Codex Page 169 and updates the Inventory Content 185 in real time, using the benefit of U.S. Pat. No. 7,058,601, filed as U.S. patent application Ser. No. 09/514,940 on Feb. 28, 2000 to Paiz (a parent to this Application) as new information of significant relevance is discovered in the virtual environment.

Figure 13:
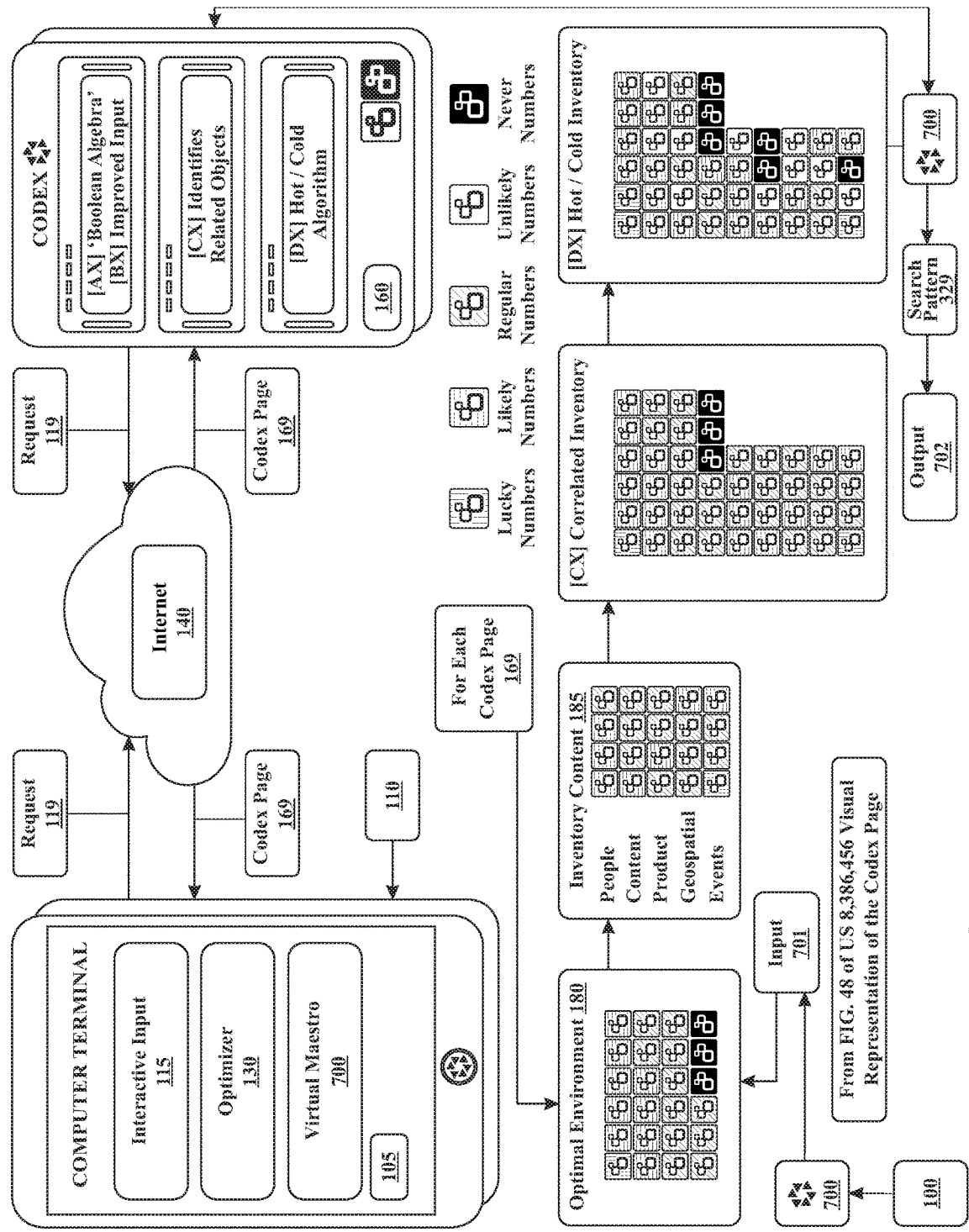
FIG. 13 presents an exemplary schematic flow diagram representing a process where the Virtual Maestro improves an Interactive Input in accordance with the third embodiment of the present invention.

In regards to FIG. 13, the Virtual Maestro improves Interactive Input from the system 100 of FIG. 1, as the user types or speaks or makes decisions through the Virtual Maestro 700 and the optimizer software application 130 residing in memory executes a set of instructions to transform interactive input 115 into a request 119, searches the Codex 160 inventory control system to find the best fit Codex Page 169, and responds with the pre-calculated and preprocessed optimal environment 180 and corresponding Inventory Content 185, and offers Entity objects 175 and Natural Variants 177 that aid the end user to reach the final destination.

For each single request the Virtual Maestro 700 maps a Codex Page 169 that preprocessed the following: First: determine if a new search occurs, if yes the previous search is over, and the search process starts from scratch as in FIG. 12. Otherwise the following dynamic calculations occur: [CX] correlate the Input probabilistic spatial environment 701 'related objects' of multiple requests based the Entity objects 175 and Natural Variants 177 offered as ADDITIONAL KEYWORDS that aid the end user to reach the final destination.

Second: [DX] Performs the Hot/Cold algorithm of the related objects and identifies dependent variable Regular Glyphs and Likely Glyphs and the Lucky Glyphs or independent variables that significantly improve a search pattern. Third: The optimizer 130 weights the Inventory Content 185 belonging to the Input probabilistic spatial environment 701.

Fourth: The Virtual Maestro 700 analyzes each combination "as if the user has selected a particular" Codex Page 169 to enable data mining discovering. Fifth: The Scripted Algorithm 630 analyzes each "as if the Virtual Maestro has selected a particular" combination Codex Page 169 and uses the Search Pattern 329 to personalize, trend, and weight the output probabilistic spatial environment 702 and corresponding Inventory Content 185 data set. Sixth: the Virtual Maestro 700 finds the optimal combination to engage a communication with the user 110 and continues the interaction process helping the end user reach a final destination.

Figure 14:
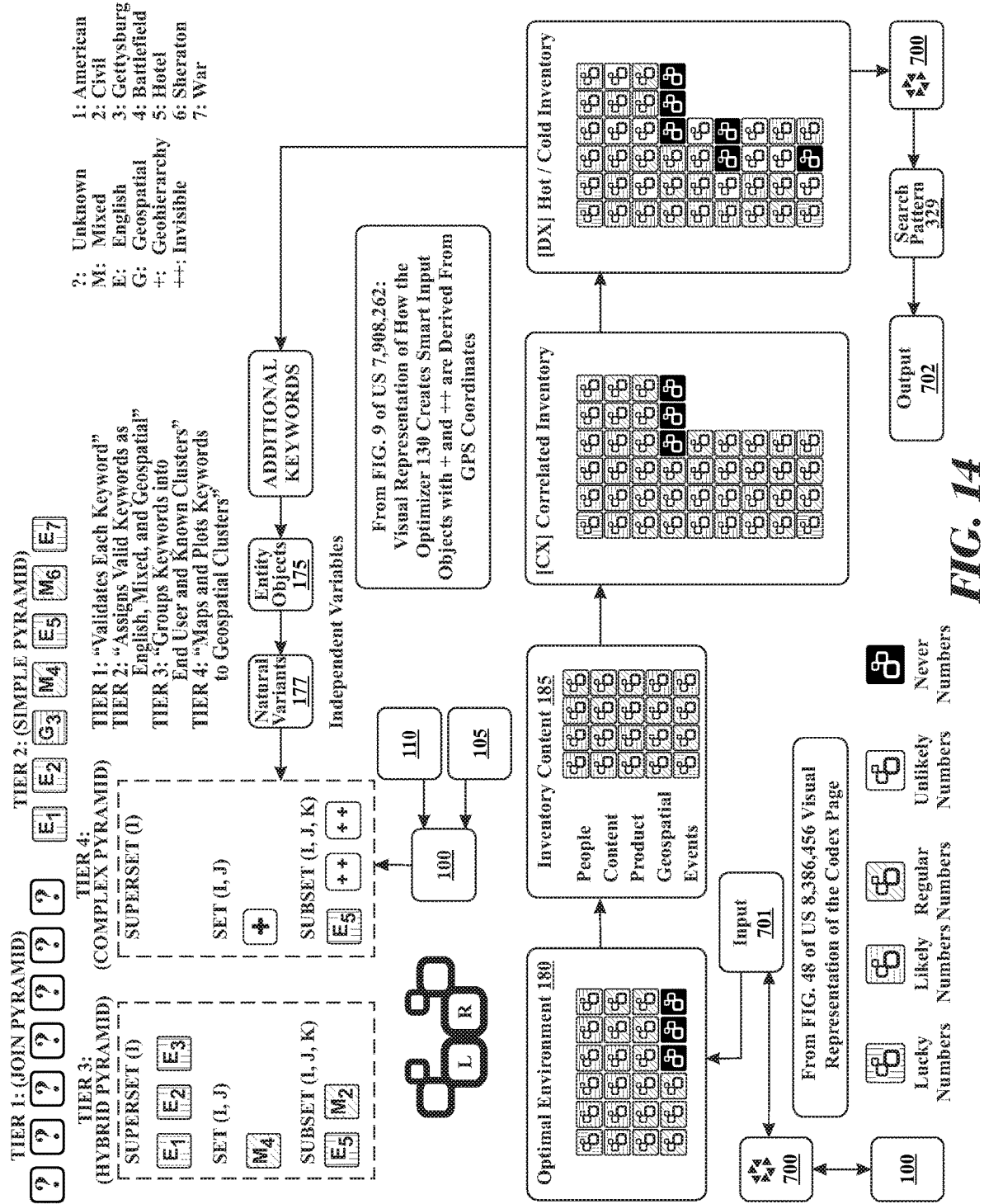
FIG. 14 presents an exemplary schematic flow diagram representing a process where the Virtual Maestro provides a proactive smart input response in accordance with the third embodiment of the present invention.

In regards to FIG. 14, the Virtual Maestro proactive smart input response: The system 100 of FIG. 1 and FIG. 13 for each single request the Virtual Maestro 700 maps a Codex Page 169 that preprocessed the following: First: determine if a new search occurs, if yes the previous search is over, and the search process starts from scratch as in FIG. 12. Otherwise the following dynamic calculations occur: [CX] correlates Related Objects of multiple requests based on the Input probabilistic spatial environment 701 and identifies Entity objects 175 and Natural Variants 177 offered as ADDITIONAL KEYWORDS that aid the end user to reach the final destination.

Fourth: [DX] The Virtual Maestro 700 analyzes each Entity object 175 and Natural Variant 177 combination "as if the user has selected a particular" Codex Page 169 to enable data mining discovering. Fifth: The Scripted Algorithm 630 analyzes each Entity object 175 and Natural Variant 177 combination "as if the Virtual Maestro has selected a particular" the Codex Page 169 and uses the Search Pattern 329 weight the output probabilistic spatial environment 702 and corresponding Inventory Content 185 data set. Sixth: the Virtual Maestro 700 finds the optimal combination to engage a communication with the user 110 and continues the interaction process of helping the end user reach a final destination with least number of attempts.

Figure 15:
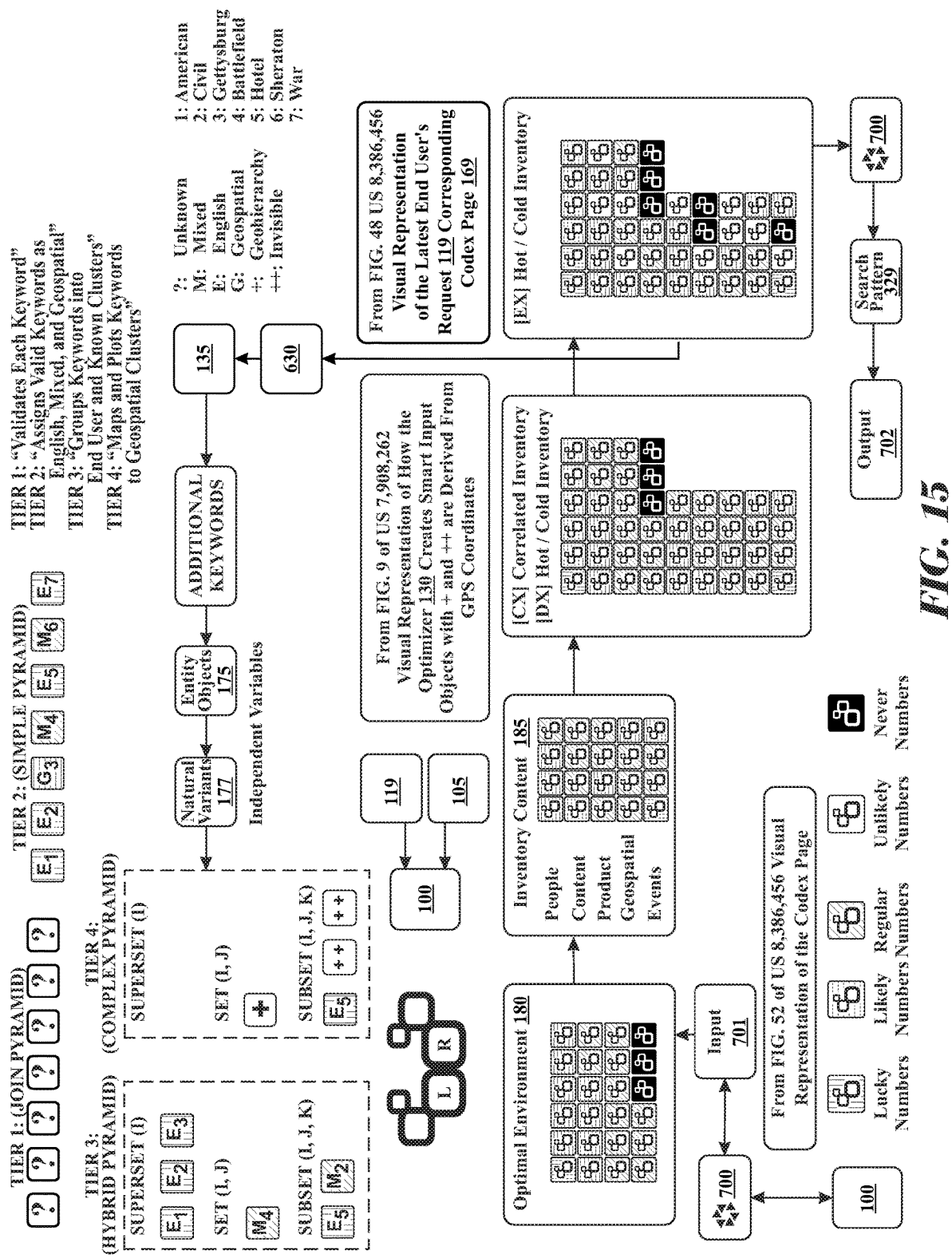
FIG. 15 presents an exemplary schematic flow diagram representing a process where the Virtual Maestro interactively responds to personal input in accordance with the third embodiment of the present invention.

In regards to FIG. 15, the Virtual Maestro interactively responds to personal input 135 of FIG. 14. The Virtual Maestro 700 [EX] Cherry picks the top probable Inventory Content 185 combinations from the Input probabilistic spatial environment 701. Fourth: analyzes each "as if the user has selected a particular" Codex Page 169 to enable data mining discovering. Fifth: the Scripted Algorithm 630 correlates each Codex Page 169 and weights the Inventory Content 185 dataset. Sixth: continues the process until reaching a combination that yields the final destination. The Virtual Maestro 700 uses the third variance sample from FIG. 15. to find the Nth nested branching Subset (I, J, K)!!, then uses the user's GPS coordinates to consolidate 'related objects' of the inventory content 180 to be able to engage in a point of sale conversation.

In regards to FIGS. 16 through 20, the illustrations teach how the Virtual Maestro continuously scans and gathers information from the virtual environment, and engages in a scripted dialogue with the end users, as it understands and is able to interact proactively thanks to the simulation input environmental bitmaps using the three samples approach is able to update an inverse ad hoc query as follows:

(A) Monitoring Learns, helps, assists and teaches how to find something specific.

(B) Reactive Smart input 4 independent variables by removes confounding elements.

(C) Proactive Personal input 5 independent variables and makes the user decision.

(D) Dialogue Direct input 6 independent variables engages in a dialogue as if alive.

Figure 16:
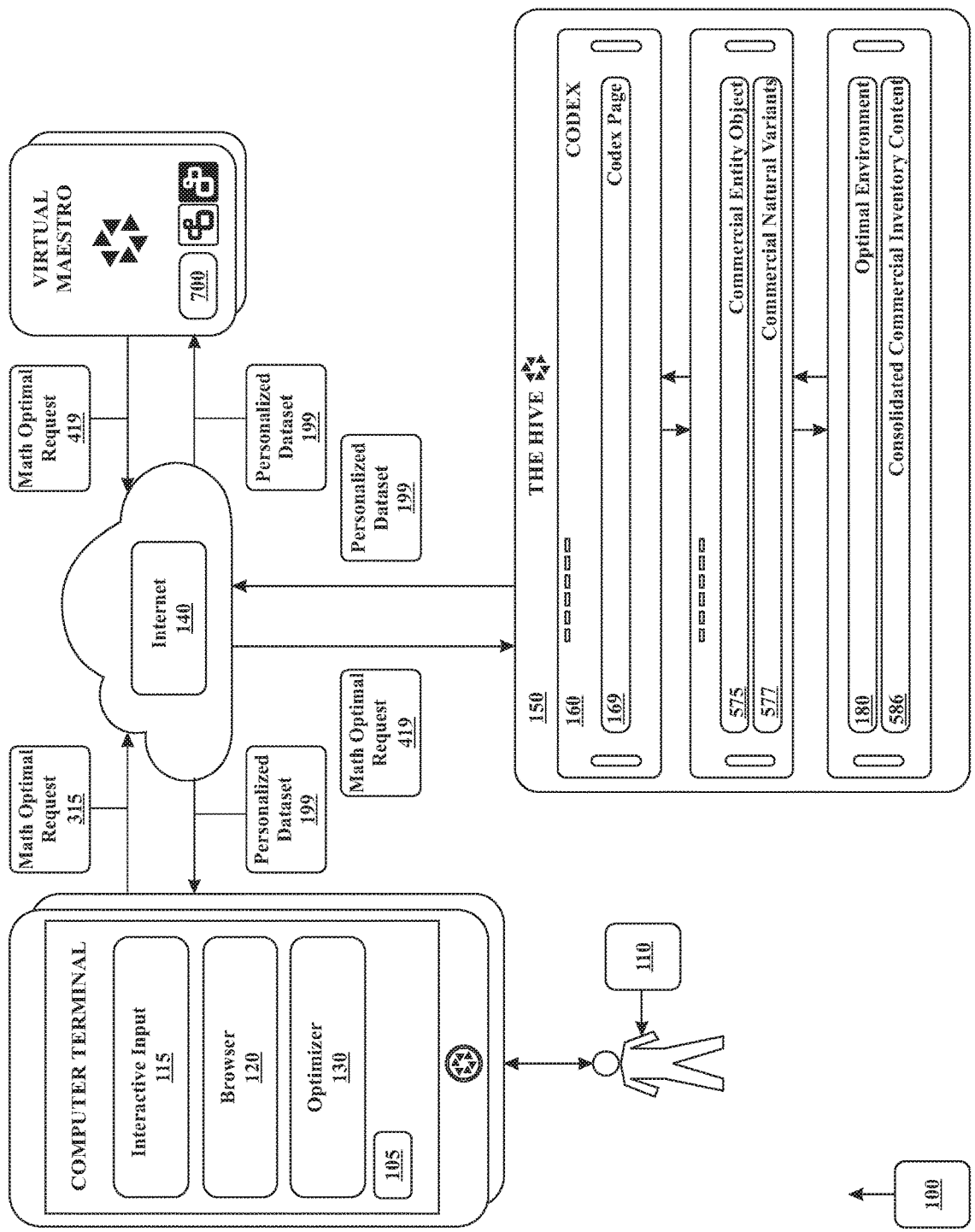
FIG. 16 presents an exemplary schematic flow diagram representing a Scripted Interactive Virtual Maestro Dialogue in accordance with a fourth embodiment of the present invention.

In regards to FIG. 16, Scripted Interactive Virtual Maestro Dialogue from FIG. 5; the Hive 150 based on the math optimal request 419 trending and monetary values of the input probabilistic spatial environment map the commercial Entity Objects 575, and Natural Variants 577, which is how the bills are paid, and 3rd parties compete to displays advertisements to the users, and creates using commercial values the consolidated Inventory Control 585. Intertwining ideas and concepts probabilistically to gain factoring relevancy and attenuating irrelevancy to map an optimal environment 180 weighting commercial levels of satisfaction (needs) and interest (wants), and geospatial data, to create the collection of relevant top pages that becomes the personalized dataset 199, and each web page and portions thereof having relevance to the Entity Object 575, 577 becomes commercial value consolidated Inventory Content 585 that are offered as ADDITIONAL KEYWORDS that aid the end user to reach the final destination.

From FIG. 7, the Hive 150 updates the corresponding optimal environment 180 and the super glyph math equation 285 used to derive the output that is sent to the end user. The Virtual Maestro 700 using the benefit of U.S. Pat. No. 7,058,601, filed as U.S. patent application Ser. No. 09/514,940 on Feb. 28, 2000 to Paiz (a parent to this Application) claim 1: "computer program installed and running thereon for proactively determining the information being tracked by said end user, customizing said news, data and other information based upon the particular information being tracked, and automatically communicating updates of said news, data and other information to said end-user computer terminal and can start dialogue communications with the end user."

Figure 17:
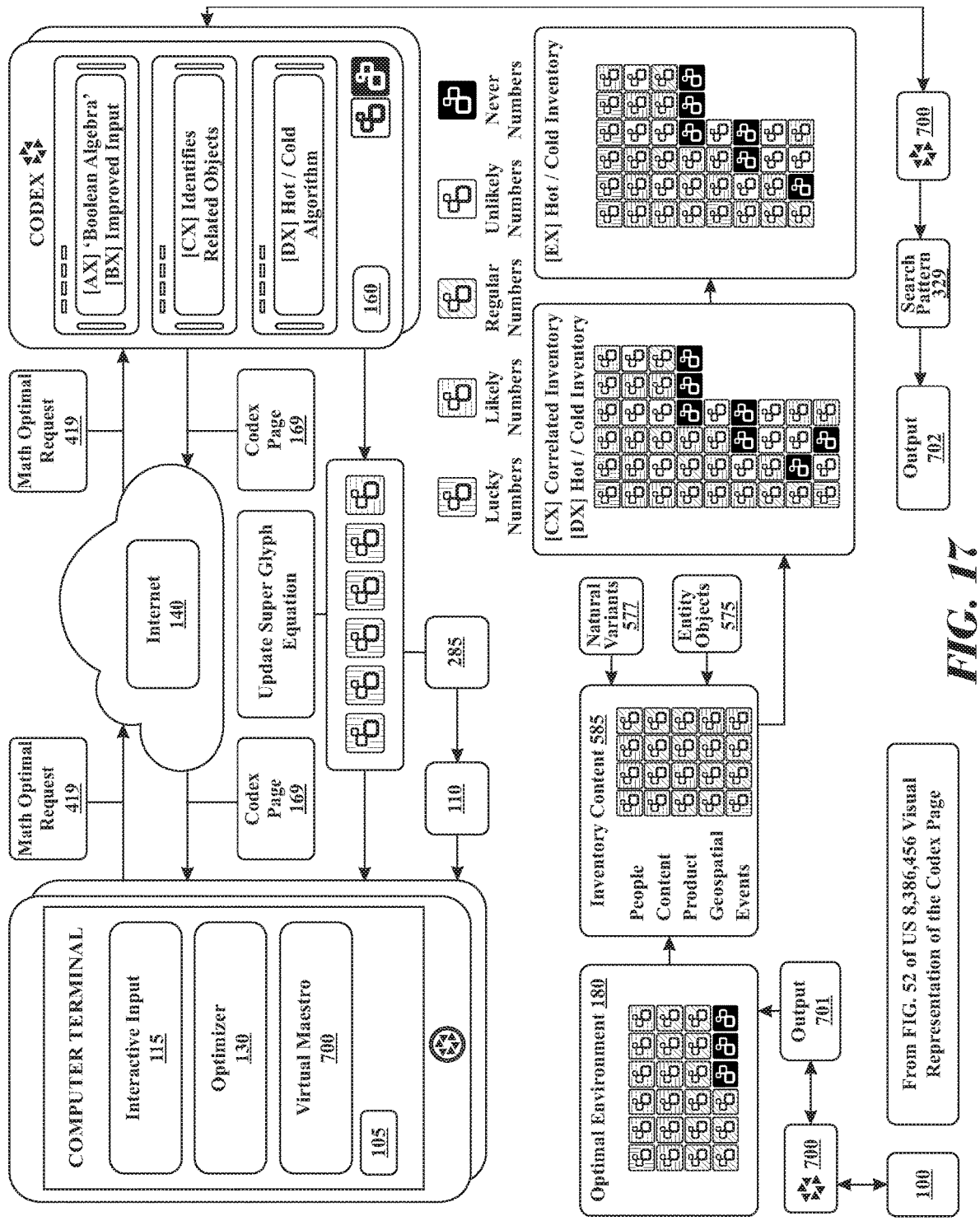
FIG. 17 presents an exemplary schematic flow diagram representing a process where the Virtual Maestro transforms input and maps Entity objects in accordance with the fourth embodiment of the present invention.

In regards to FIG. 17, the Virtual Maestro transforming input and mapping Entity object of FIG. 5: The Hive 150 based on the math optimal request 419 trending and monetary values of the probabilistic spatial environment map the commercial Entity Objects 575, and Natural Variants 577, which is how the bills are paid, and 3rd parties compete to displays advertisements and promotions to the users, that creates commercial value consolidated Inventory Control 585. Intertwining ideas and concepts with gain factoring relevancy and attenuating irrelevancy and weighting simulation input or commercial levels of satisfaction (needs) and interest (wants), demographic and geospatial data aiding the end user reach the final destination.

For each single request the Virtual Maestro 700 continues to update the Super Glyph (Mathematical) Equation 285 as the user continues to select Inventory Content 185 command instructions and dynamically measures a plurality of optimal environments as follow: First: determines if a new search occurs, if yes the previous search is over, and the search process starts from scratch as in FIG. 12. Otherwise the following dynamic calculations occur: [CX] correlates 'Related Objects' belonging to the Input probabilistic spatial environment 701 and creates a dataset of commercialized Entity objects 575 and Natural Variants 577 offered as ADDITIONAL KEYWORDS that aid the end user to reach the final destination.

The Virtual Maestro 700 performs: Second [DX] the Hot/Cold algorithm of the related objects and identifies Regular Glyphs, Likely Glyphs and Lucky Glyphs variables that significantly improve a search pattern. Third: [EX] Cherry picks the top probable combination from Inventory Content 185 from the Input probabilistic spatial environment 701. Fourth: analyzes each "as if the user has selected a particular" Codex Page 169 to enable data mining discovering. Fifth: The Scripted Algorithm 630 correlates each Codex Page 169 and weights the Commercial Inventory Content 185. Sixth: The Virtual Maestro 700 continues process the end users simulation input until a reaching combination that yields the final destination.

Figure 18:
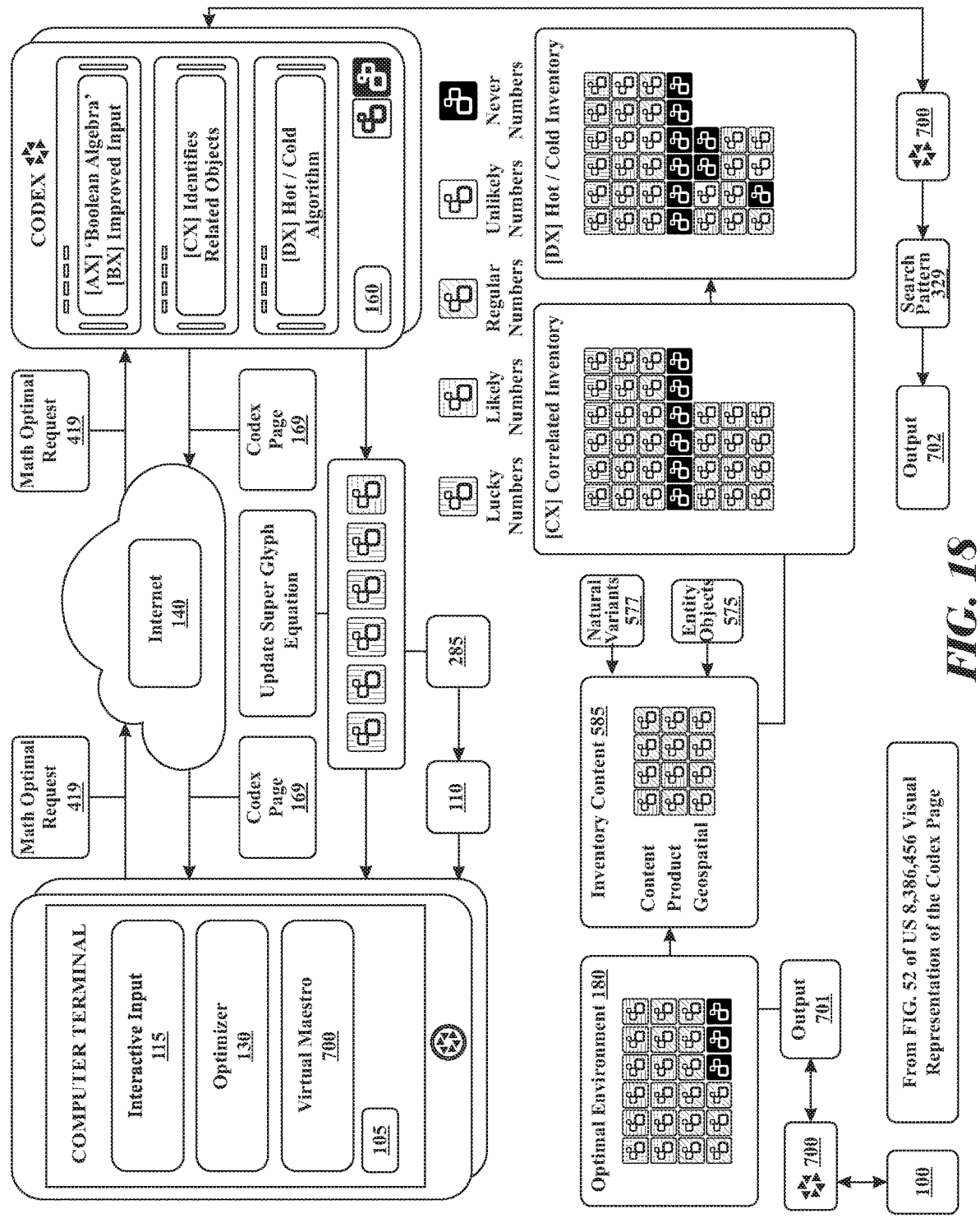
FIG. 18 presents an exemplary schematic flow diagram representing Virtual Maestro proactive personal input dialogues in accordance with the fourth embodiment of the present invention.

FIG. 18 Virtual Maestro proactive personal input 135 dialogues From FIG. 5: the Hive 150 uses the math optimal request 419 trending and monetary values of the probabilistic spatial environment maps the commercial Entity Objects 575, and Natural Variants 577, and allows 3rd parties compete to displays advertisements and promotions to users, and create commercial value consolidated Inventory Control 585. Intertwining ideas and concepts probabilistically gain factoring relevancy and attenuating irrelevancy and weighting simulation input such as commercial levels of satisfaction (needs) and interest (wants), usage patterns, demographic, geospatial and trending data to aiding the end user reach the final destination.

The Virtual Maestro 700 performs Triangulation Deductive Reasoning to find a check mate combination: First: determine if a new search occurs, if yes the previous search is over, and the search process starts from scratch as in FIG. 12. Otherwise as in FIG. 17 the following dynamic calculations occur when smart input is available: [CX] correlate 'Related Objects' of a plurality of requests. Second: [DX] Weights 'related objects' using the Hot/Cold algorithm. Third: The optimizer 130 identifies commercial value consolidated Inventory Content 585 to maps the input probabilistic spatial environment 701. Fourth: the Virtual Maestro 700 executes a set informatics instructions to select the best combination as personal input "as if the user has selected a particular" Codex Page 169. Fifth: the Scripted Algorithm 630 [EX] Cherry Picks the commercial value consolidated Inventory Content 585 dataset to derive the best plausible or Nth combination. Sixth: The Virtual Maestro 700 executes a set informatics instructions to select the best plausible or Nth combination as direct input "as if the Virtual Maestro has selected a particular" Codex Page 169 and starts a dialogue using the simulation input commercial levels of satisfaction (needs) and interest (wants) math optimal request 419.

Figure 19:
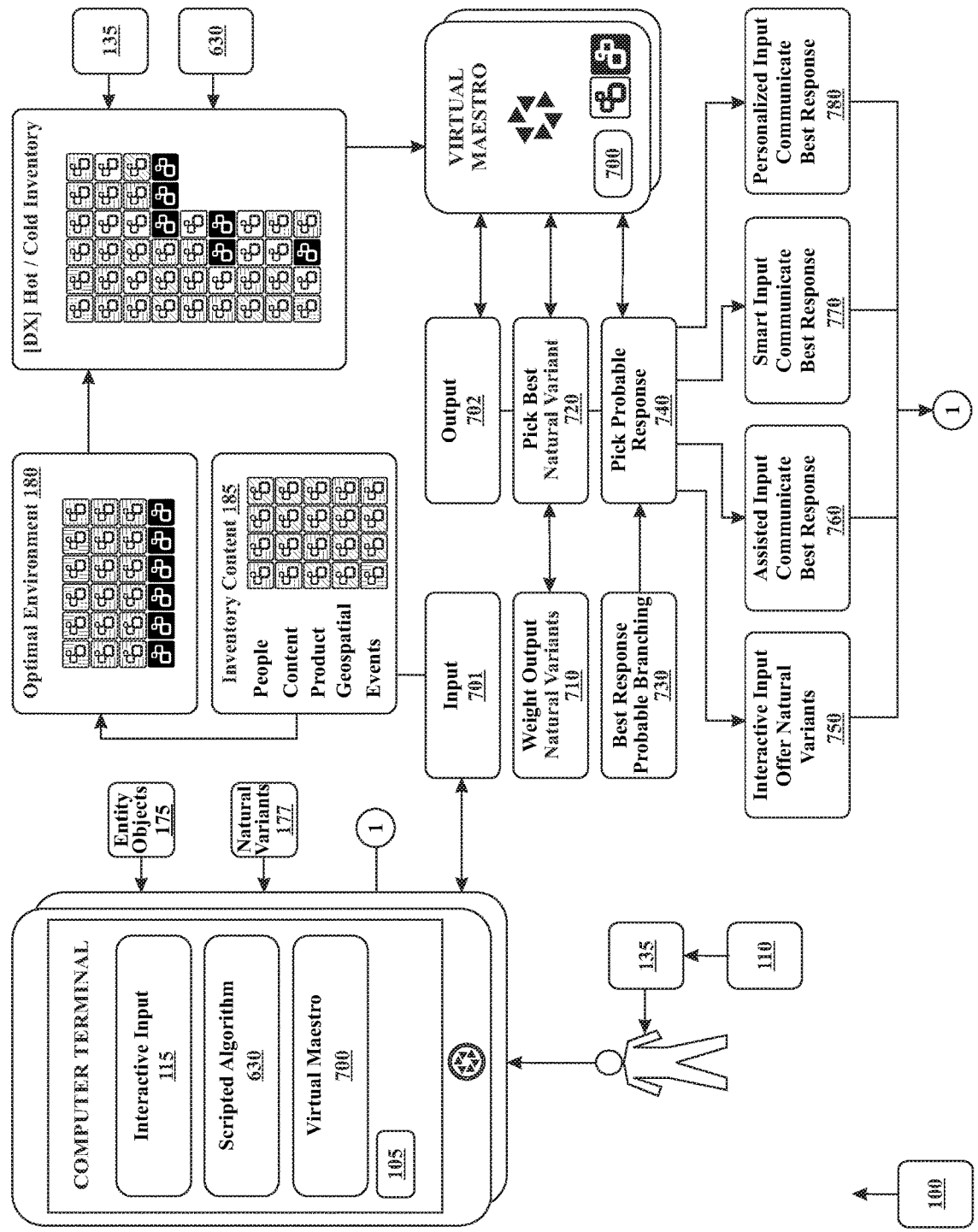
FIG. 19 presents an exemplary schematic flow diagram representing a Virtual Maestro scripted type input which automatically maps output in accordance with the fourth embodiment of the present invention.

In regards to FIG. 19, the Virtual Maestro scripted type input automatically maps output from FIG. 18 the End User 110 creates the Input Spatial Environment 701 from the personal input 135. The Virtual Maestro 700 creates the Output Spatial Environment 702 from the search pattern 329, executing a set of informatics using the Scripted Algorithm 630, and Weights Output Natural Variants 710 using the Triangulation Deductive Reasoning [DX] Hot/Cold Algorithm and [EX] Cherry Picks in lieu of the End User 110 picks the Best Natural Variant 720 from the Optimal Environment 180 and valid collection set of Inventory Content 185, (comprising of the simulation environment input (based on an individual, group of related people, demographics, or similarly same subject matter requests)

entity objects 175 and associative and transitive collection of natural variants 177), and updates the Input 701 based on the selection made in behalf of the end user 110. The Virtual Maestro executes a set of informatics using the Scripted Algorithm 630 point of sale functionalities to determine the Best Probable Branching responses 730 and picks the Best Probable (Associative) Response 740 to communicate with the user 110 based on the interactive input 115 as follows:
 (A) When Interactive Input Offers Natural Variants 750
 (B) When Assisted Input Communicates Best Response 760
 (C) When Smart Input Communicates Best Response 770
 (D) When Personalized Input Communicates Best Response 780

Figure 20:
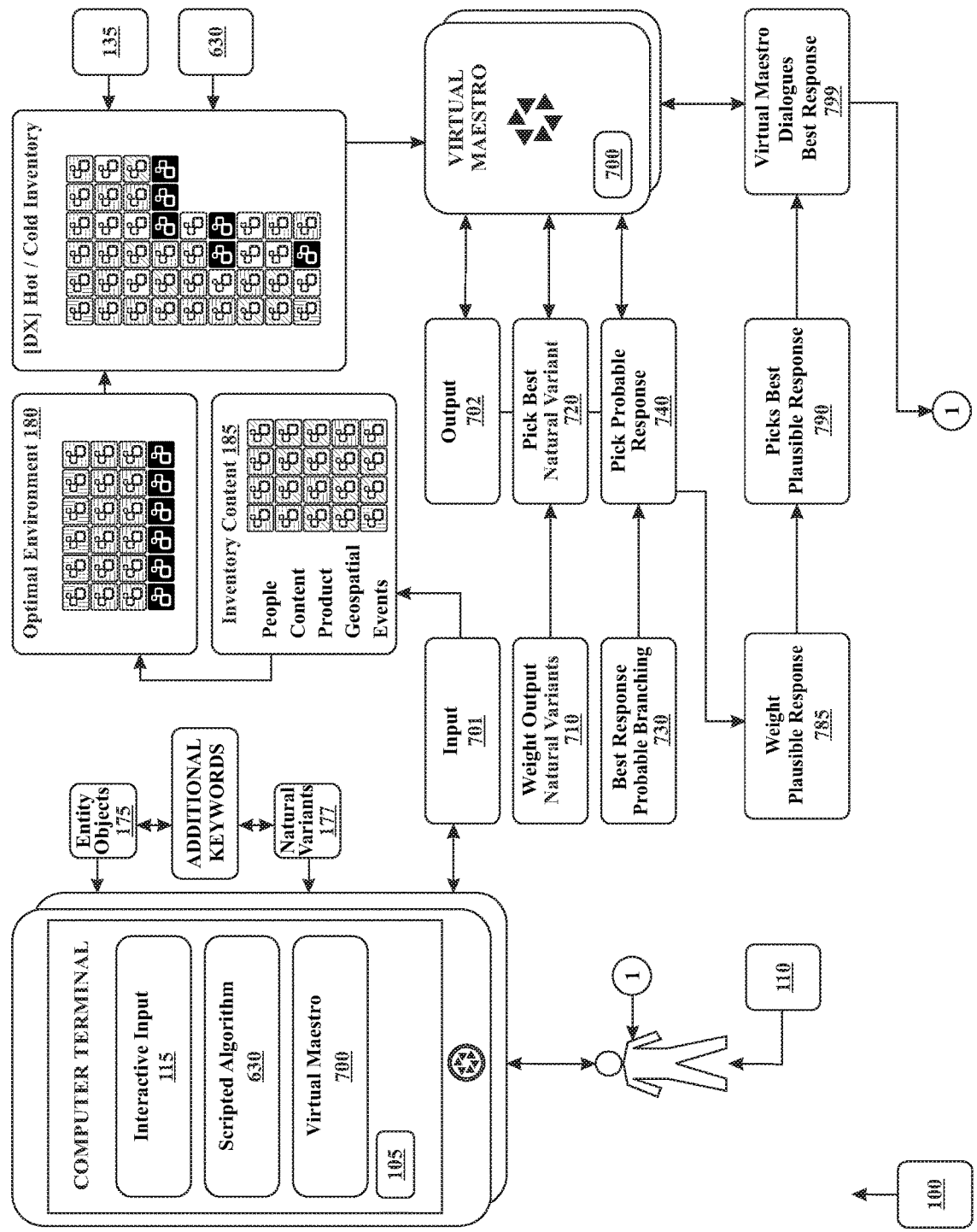
FIG. 20 presents an exemplary schematic flow diagram representing Virtual Maestro proactively dialogues in accordance with the fourth embodiment of the present invention.

In regards to FIG. 20, the Virtual Maestro proactively dialogues from FIG. 19 and executes a set of informatics using the Scripted Algorithm 630 and database to Weight Plausible Responses 785 and Picks Best Plausible (Transitive or Nth) Responses 790 and updates the Output 702 based on its own deductive reasoning check mate decision of how to dialogue with the user 110 and now, based on the Nth or Best Plausible Response 790, the Virtual Maestro 700 knows the final destination (input and output) and can dialogue 799 with the user 110 'as if alive' or sentient!

The scripted algorithm 630 measures the valid collection set of Inventory Content 185, (comprising of the simulation environment input (based on an individual, group of related people or trending data, demographics for advertisement means, or similarly same subject matter requests) entity objects 175 and associative and transitive collection of natural variants 177). For example, once an event occurs many people will ask the same question, or make comments using the Internet that the Virtual Maestro 700 will transform input to trending and demographic data. Based on the knowledge of a given event and their interaction about the same, the Virtual Maestro 700 can probabilistically reverse engineer a trending high frequency response (output) made by the request of plurality set of users into a personalized dialogue to a specific individual.

For example, many Real Madrid fans might say I love the goal Ronaldo scored against Juventus, but I don't think Buffon should have received a red card, during the Apr. 11, 2018 Championship League quarter final game. The Virtual Maestro 700 can start a dialogue derived from thousands of trending likes and comments, and start a dialogue knowing the end user belonging to a group (Real Madrid fan) as follows: (1) Joe (Real Madrid fan) did you see Cristiano Ronaldo penalty kick goal? Knowing from the simulation input the user is watching or listening to the transmission or would probabilistically be interested in this event news, and then regardless if Joe responds (YES) or (NO) or show me the goal, can ask in a scripted manner your friends Giovanni (Juventus fan) and Maria (Real Madrid fan) say "Gianluigi Buffon should have not be given a red card", and waits for Joe's answer. Later after receiving new significant trending data from the simulation environment input continues to dialogue "top trending news: Ronaldo scoring a penalty kick goal was unfair", Giovanni posted comment to Maria the referee granting the penalty kick at the last moment 'unfair'. The Virtual Maestro 700 says "Joe, do you think the penalty kick was 'unfair'.? Based on Joe's like or dislike response with regards to Maria comment asks "should I" post your comment to your friends Giovanni and Maria concerning the 'unfair' penalty kick? Based on Joe's decision make the appropriate posted comments.

Example 1. Multi Lingual Search: The end user interactive input 110 is "TIGER" in multilingual mode sub searching in French and Spanish. First, the HIVE 150, searches in English the human knowledge encyclopedia 170 to find the most significant math Entity Object 475 and corresponding set of Natural Variants 477. The English language optimal dataset for "TIGER" Inventory Content 185 becomes the English language side of the Output.

Second, the system 300 performs math pattern matching to find the Codex Page 169 for "TIGER", in French and Spanish. The French language optimal dataset for "TIGER" becomes the French language side of the Output, and so forth the Spanish language side of the Output. Then correlates the English, French and Spanish side of the output to map the spatial environment of "TIGER". Finally, cherry picks using English to Spanish and English to French weighted semantic conversions to find the best responses for each language. Note: the math human knowledge equation based on rules of grammar and semantics is used.

Example 2. Virtual Maestro 700 as a Customer Service Representative: U.S. Pat. No. 7,058,601, filed as U.S. patent application Ser. No. 09/514,940 on Feb. 28, 2000 to Paiz (a parent to this Application) teaches the virtual environment optionally includes an internet chat room which provides real time communication among multiple users and between users and a broker. Using the benefit of U.S. patent application Ser. No. 09/819,174, filed on Mar. 27, 2001 to Paiz (a parent to this Application) "the Virtual Maestro is a product of artificial intelligence, since it would be impractical to provide a real person to process personal selections for each and every subscriber. The Virtual Maestro is represented by a virtual image, either of Beethoven or Mozart, in the virtual concert hall and will play specific song or video requests of an individual subscriber, on a pay per view basis. The profile is assembled from information the subscriber provides to become a subscriber and from a history of selections made by the subscriber through the system, and the profile is in effect how the particular subscriber is clothed in the virtual world." When combined the Virtual Maestro 700 can act as a Customer Service Representative.

The interaction between two human not speaking the same language is buffered by the Virtual Maestro 700 using the Scripted Algorithm 630 formatted communications. Pierre speaks in French, the input is formatted into a script in the English (business lingua franca) and French, customer service receives the English script and the point of sale is populated by the artificial intelligence using the users profile information, the representative responds in English, the text is sent to the Pierre's Virtual Maestro 700 that responds with a texted response in French. The transaction, trouble ticket or request for help is made between two humans not speaking in the same language (nor are they required to understand or speak both) using the Virtual Maestro 700 to be the medium of their communication.

Example 3. Virtual Maestro 700 Acts as an Optimizer Communication Medium: The user 110 using a computing terminal 105 with a Virtual Maestro 700 in memory that executes informatics to transform the input 115 into a search pattern 329, and searches the Encyclopedia 170 to find the Codex Page 169, with the corresponding optimal dataset. In parallel the Virtual Maestro 700 receives the text information, and communicates the highest valued reference source to the user 110. As the user 110 types or speaks "TIGER" the Virtual Maestro 700 uses the Script_Say (TIGER, "en.wikipedia.org"), to speak over the audio devices or as text "The tiger (*Panthera tigris*) is the largest cat species, most recognizable for their pattern of dark vertical stripes on reddish-orange fur with a lighter underside. The species is classified in the genus *Panthera* with the lion, leopard, and jaguar", and offers images and videos of a TIGER, and also Panther, Lion, Leopard, and Jaguar, as additional keyword 175, 177.

Example 4. Virtual Maestro 700 multilingual communication: the end user searches for an incomplete search such as "THE" using the GIGO mantra the optimizer improve the quality from (???) to (?!) by matching the request to the English grammar meaning of a definition, which can then be used to respond in an language using similarly same semantics constructs such as Script_Say ("THE", ENGLISH, USA), or Script_Say ("THE", SPANISH, MEX). The Virtual Maestro 700 selects the best content to communicate with the user.

Example 5. Virtual Maestro 700 Multilingual dialogues the end user searches for a valid nested search 1. "AMERICAN CIVIL WAR" and Superset (I). Then the Virtual Maestro 700 offers four additional keywords (A) President Abraham Lincoln 1861-1865, (B) General Robert E. Lee, (C) Siege of Vicksburg, May 18-Jul. 4, 1863, and (D) Battle of Gettysburg, Jul. 1-Jul. 3, 1863), the end user selects to further index refine selecting (D) as Set (I, J).

Simple Layer of refinement or Superset (I)="AMERICAN CIVIL WAR", and the Hybrid Layer of refinement or Set (I, J)="Battle of Gettysburg". The Virtual Maestro 700 decides to analyze the optimal dataset Script_Learn ("Battle of Gettysburg"), and probabilistically selects the Entity Object 175="Pickett's Charge". Complex Layer of refinement or Subset (I, J, K)="Pickett's Charge". Virtual Maestro 700 decides to analyze the optimal dataset Script_Teach ("Pickett's Charge"), and probabilistically selects the Key featured transitive and Natural Variant 177 or Element (I, J, K, L)="General, I have no division".

Answer Layer of refinement="General, I have no division". Now, the Virtual Maestro 700 initiates a dialogue in Spanish as per user's decision saying in Spanish "Sabia:" El 3 de julio 1863 se produjo un gran duelo de artillería entre 230 cañones de un lado y otro. Los confederados, lanzaron un enorme ataque con 14,000 soldados contra sus enemigos, estando al mando del mayor general George Pickett. Los unionistas quedaron sorprendidos ante el avance y se defendieron con sucesivos ataques de artillería." es.wikipedia.org and then says "despues de la derrota el General Pickett le dijo a su comandante el General Robert E. Lee "cual division no tengo ninguna . . . asi marcando el principio del fin del la Guerra Civil America" The Virtual Maestro 700 recites the events of Pickett's charge, and General Pickett's quote "General Lee I have no division", and after the Virtual Maestro 700 analyzes the context inform the user in Spanish, this defeat marks the beginning of the end of the American Civil War!"

Example 6. Surveillance Search: As each user creates interactive input 110 and makes a request to the Codex 160, in parallel the Virtual Maestro 700, uses the user's GPS coordinates to update their historical and usage pattern profile. Then determines if the output contains a Protected Entity Object 176 and corresponding Protected Natural Variants 178 (associative and transitive related entity objects) that are related to significant trending data.

Using the benefit of U.S. Pat. No. 7,058,601, filed as U.S. patent application Ser. No. 09/514,940 on Feb. 28, 2000 to Paiz (a parent to this Application) upon detecting significant trending protected data, the Virtual Maestro 700 may use the user 110 profile, demographics, usage patterns of behavior to alert the Hive 150 the output has related protected data. Using the benefit of U.S. Pat. No. 6,614,893, filed as U.S. patent application Ser. No. 09/544,238 on Apr. 7, 2000 to Paiz (a parent to this Application) upon detecting significant protected data, the Virtual Maestro 700 plots each Site containing protected data and set the known IP Address and GPS coordinates as Leg B and the builds a Vector CDR for each occurrence.

Using the benefit of US Pre-Grant Publication Number 2001/0037304, filed as U.S. patent application Ser. No. 09/819,174 on Mar. 27, 2001 to Paiz (a parent to this Application) the system 100 is the server and using the benefit of U.S. Pat. No. 7,050,813, filed as U.S. patent application Ser. No. 10/926,446 on Aug. 25, 2004 to Paiz (a parent to this Application) the client Crusader Technology software is able "to interact with a supplier and perform live financial transaction, interact with individuals and/or virtual animated characters and the ability to listen and view merchandise and works of copyright holders. Each club member receives access and operational programming on a set of a specific category or categories of music and pre-defined advertisements, which could be customized to the particular subscriber. These programs have their own artificial intelligence and possess the subscriber credit card information in an encrypted format so that the subscriber can make immediate request: on the fly. When a credit card number is registered, the user places a specific password to determine authenticity."

Example 7. Login Surveillance: each time the Virtual Maestro 700 login to the HIVE 150 the software updates the user's 110 profile, advertisement and transactional history, system credits, licensing, and default country, language and GPS location. The end user is validated at login via password authentication and IP Address. Further surveillance occurs when performing a command instruction using either voice recognition and speech pattern of conversation to update the profile, otherwise the information is stored as visitor. Finally, when validating a transaction using a credit card security value or facial or fingerprint digital recognition to withdraw monies from the system provided the proper authentication is supplied.

A man purchases, a Gift Card for a woman he meets in a dating site, and then he registers her profile and pictures via the Virtual Maestro 700, 10 minutes later in another part of the world the monies are being withdrawn in a geospatial location not to be consistent with the profile, at this point the Virtual Maestro 700 will ask the owner of the Gift Card, supplying the captured facial recognition and/or voice recognition digital signatures creating the potential threat. The user 110 can validate the new location and authorize the transaction or report fraud.

Example 8. Advertisement Surveillance each time the Virtual Maestro 700 determines an user 110 wants to view or listen to licensed protected data such as audio or video, the software runs a script to determine if available credits exists to purchase licensing of the digital files or products, or alternatively using purchasing patterns, demographics and profile and social network characteristics can offer personalized, the system 100 offers the user 110 credits for mass media or automatically embedded advertisements for the purchase of licensed product.

Example 9. Transactional Surveillance each time the Virtual Maestro 700 determines an user 110 has decided to perform a licensed transaction to view or listen protected data such as audio or video, the software runs a script to uses available credits or monies to purchase licensing of the digital files or products, or alternatively using purchasing patterns, demographics and profile and social network characteristics can offer personalized, mass media or automatically embedded advertisement to pay the licensee royalties or purchase product.

Example 10. Risk Threat Surveillance: The Virtual Maestro 700 determines a user 110 has decided to perform a licensed transaction to view or listen a risk protected data such as audio or video, the software runs a trending script to maximize available credits or monies to purchase licensing of the digital files or products. Alternatively using the user profile purchasing patterns, demographics and social network characteristics can offer personalized, mass media or automatically embedded advertisement to pay the licensee royalties or purchase product. In this case, risk protected data is newly released not previously seen by the user high quality product.

In both Example 9 and Example 10: The system 100 upon detecting the risk threat of licensed intellectual property or web pages being under surveillance. Each time a significant difference pattern is identify the system proactively notifies the authorities or customer support data warehouse mechanism to notify the risk threat. Translating the essence of the matter of within the message, as to elucidating covert coded intent meaning rather than a vanilla translation. In this case, risk protected data implies usage of concept or ideas under surveillance, coded covert meaning style of messages, or the usage of a site or web pages by a particular, group of people or social networks being under surveillance possessing real time unusual trending of words or audio or video that are deemed and identified as a significant risk threat.

Example 11. Virtual Maestro creates the Input Spatial Environment: the user 110 performs a valid search 1. "AMERCAN CIVIL WAR" and Superset (I) and the Virtual Maestro 700 identifies the type of search as assisted input, and maps an input spatial environment using US History, in particular events that occurred between 1861 and 1865, where geospatial data is USA and a list of valid States such as Virginia or Maryland. At this point, the events that belong to the historical events such as the Siege of Vicksburg, Battle of Gettysburg, or President Abraham Lincoln are probabilistically mapped as Input that can be offered to the user 110 using the benefit of FIG. 80 of U.S. Pat. No. 7,809,659, filed as U.S. patent application Ser. No. 11/584,941 on Oct. 23, 2006 to Paiz (a parent to this Application) as additional keywords or Entity Object 175 and Natural Variants 177 that can aid in reaching the final destination.

For each entity object 175, 177 associated to the concept and idea "American Civil War" the Virtual Maestro 700 searches the system using probable branching any nested transitive command decision, assuming the entity object will be selected by the end user. Each associative and transitive entity object is probabilistically mapped as the Input Spatial Environment 701.

Example 12. Virtual Maestro creates the Output Spatial Environment: The end user searches 1. "AMERCAN CIVIL WAR" as Superset (I), and the Virtual Maestro 700 identifies search as assisted input or scripted as Is_Assisted. Upon building the Input Spatial Environment 701 the Virtual Maestro 700 executes software instructions using the scripted algorithm 630 and database to determine the best way to communicate with the end user.

Using the basic Script_Say: the system 100 determines the end user 110 search is an assisted input, and exists and possesses a preprocessed and pre-calculated Codex Page 169 and corresponding optimal dataset 189. The Virtual Maestro 700 identifies the content paragraph that maps probabilistically the first independent variable Superset ("AMERICAN CIVIL WAR") as the response and probable nested subordinates as J second independent variables Set ("Siege of Vicksburg, 1863"), ("Battle of Gettysburg", 1863) and (US President (Abraham Lincoln, "1861-1865) to name a few. Then maps probable branching entity objects 175 best responses for each Set ("American Civil War", J), as K subordinate probable branching Natural Variants 177 Subset ("American Civil War", J, K) as the Output Spatial Environment, such as J being Set ("Battle of Gettysburg", 1863) and K as Subset ("Pickett's Charge", Jul. 3, 1863).

The output using the benefit of U.S. Pat. No. 8,676,667, filed as U.S. patent application Ser. No. 12/764,934 on Apr. 21, 2010 to Paiz (a parent to this Application) that index refines to the Nth has preprocessed and pre-calculated the probability of each response belonging to the output, and using the benefit of U.S. Pat. No. 8,386,456, filed as U.S. patent application Ser. No. 12/785,122, filed on May 21, 2010 to Paiz (a parent to this Application) incorporates as the output the best response for each entity object 175, 177 belonging to the Output Spatial Environment 702. The first best response or personalized dataset 199 is determined by Scripted Algorithm 630 using the end user's profile, and the latest values of the Hot/Cold Super Glyph equation, where Hot denotes relevant and trending ideas that are gained factored, and Cold denotes irrelevant and no longer valid based on the personalized vectors such as relevant GPS coordinates that are attenuated. The Virtual Maestro 700 uses the Output Spatial Environment 702 to communicate with the end user 110.

Example 13. Virtual Maestro offers command instructions to the end user: Now, the Virtual Maestro 700 using the personalized Super Glyph equation, data mines, analyzes and cherry picks the Output Spatial Environment 102 and runs the Script_Teach to offer a set of probable command instructions that aid the end user reach the final destination, alternatively, the system 100 can recite and teach the user 110 with regards to the concept and idea of the "American Civil War" applying the personalized, historical, trending and social network usage patterns of behavior with regards to the Superset (I="American Civil War", 1861-1865).

The Virtual Maestro 700 random weighted process performs Script_Teach to find the optimal solution, and can continue teaching the subject matter, using the Set ("American Civil War", J), where J is a related associate to a high probability additional keyword 175, 177 result. The Virtual Maestro 700 decides and selects in lieu of the END USER, by executing a set of software instruction using Scripted Algorithm 630 and database, and selecting the most satisficing element of the set of command instructions finds the top result from the Output Spatial Environment 702, such as selecting the probable branching Battle of Gettysburg as J, and teaches the user 110 with regards to the entity object 175.

Example 14. Scripted Virtual Maestro communication based on the end user decision: Continuing Example 13. Offering probable nested subordinates as J second independent variables Set ("Siege of Vicksburg, 1863"), ("Battle of Gettysburg", 1863) and (US President (Abraham Lincoln, "1861-1865). The end user 110 decides and selects the command instruction "Siege of Vicksburg", May-June 1863, now, the Virtual Maestro 700, executes a set of instructions to find the best response 175, 177 of the optimal dataset 189 based on the decision, and finds the best content and responds to the end user automatically. Later, using a responsive delay performs the Script_Teach: analyzes set of command instructions based on "Siege of Vicksburg" with USA, MS, May-June 1863.

The Virtual Maestro 700 runs using the Scripted Algorithm 630 Codex Page 169 based on I=American Civil War, and J=Siege of Vicksburg, and then taking into account the automatically response already sent to the user 110, further analyzing using probable branching the Output Spatial Environment 702 and probabilistically selects the best response that can be sent to the user 110, but instead of offering the set of command instruction 175, 177, the Scripted Algorithm 630 software using a random weighted process selects as if the end user and picks as K, such as the additional keyword 175 General Ulysses Grant, and searches the corresponding optimal dataset 189, and communicates to the user 110, based on the Siege of Vicksburg with regards to the third independent variable General Ulysses Grant. Note: the user typed the first independent variable as I "American Civil War", and then selected from the set of command instructions 175, 177 the second independent variable as J "Siege of Vicksburg" and then the Virtual Maestro 700 executing a set of instructions, based on rules of semantics picks General Ulysses Grant as K, and using a scripted delay and response communicates with the user 110.

Example 15. Scripted Virtual Maestro communication with the end user: The end user searches for a valid search 1. "BILLY JOEL" that becomes the Superset (I) then the Virtual Maestro 700 identifies the type of search as assisted or scripted as Is_Assisted. Upon building the Input Spatial Environment the Virtual Maestro 700 executes software instructions using the script database to determine the best way to communicate with the end user.

The Virtual Maestro 700 determines "Billy Joel" is a protected Super Glyph, and immediately identifies a managerial hierarchical set of protected intellectual property, and related music that can be furnished to the end user. At this point, executing software instructions the Virtual Maestro 700 determines if the end user has credits or owns licensed music of Billy Joel.

If the end user, has licensed music the Virtual Maestro 700 can communicates using the end user profile, and history of favorite music, plays licensed music in the background. Continuing in parallel with the search the system upon determining search pattern is an assisted input, and exists as a valid preprocessed and pre-calculated optimal dataset. determines as the response the content paragraph that maps probabilistically the first independent variable Superset ("BILLY JOEL") and makes two searches as follows:

First, (Advertisement Sale) analyzes using probable branching the Output Spatial Environment and selects the best licensed response that can be sent to the end user, based on the personal profile to promote further use of licensed audio and video via advertisement means. Second (Scripted Point of Sales): in parallel selects the best protected (not licensed yet) response with a shopping cart set of command instructions furnished to the end user.

Assuming, the system determines the highest valued protected song in the Output Spatial Environment is "Honesty" the Virtual Maestro 700 may offer information of the song, and the song with an advertisement preamble. While, the end user listens to the song, the music profile and licensing is updated. Now, the end user decides as J the Set (Billy Joel, "My Life", licensed) and the system immediately plays the song without an advertisement, otherwise if protected with a preamble advertisement. The Virtual Maestro can execute a set of software instructions to search the script database, based on Script_TQM, to obtain feedback from the end user, and in parallel comment the music and offer protected and licensed suggestions to the end user, while not changing the search criteria. When the user decides to select the Shopping Cart the search process ends, and using the Output Spatial Environment offers concert tickets, merchandising and audio and video licensed merchandise. Then performs the sale, and awards based on the monetary amounts of the purchases additional credits for future usage.

Example 16. The Virtual Maestro dialogues using the Input Spatial Environment: The end user searches 1. "AMERCAN CIVIL WAR", then adds by selecting 2. BATTLE OF GETTYSBURG, then adds by selecting "PICKETT'S CHARGE, then add by selecting 4. "HISTORICAL QUOTE", and the Virtual Maestro 700 identifies the type of session as personal input. Where, the independent variables are as follows: I="AMERICAN CIVIL WAR", J="BATTLE OF GETTYSBURG", K="PICKETT'S CHARGE", and L="HISTORICAL QUOTE", and with the valid geospatial data US, PA, Gettysburg, Jul. 3, 1863.

In this, case the end user built using the "AMERICAN CIVIL WAR" and then by selecting additional keywords, to map the different layers of refinement (Simple, Hybrid, Complex and Answer) . . . now using Example 5. Virtual Maestro 700 Multilingual dialogues.

General Pickett informing his commanding officer "General Lee, I have no division", or alternatively, in Spanish "El General Pickett le dijo a su comandante "General Lee, cual division no tengo ninguna" . . . and after the Virtual Maestro 700 reads and analyzes the context in order to inform the end user in English, this defeat marks the beginning of the end of the American Civil War!" or alternatively, dialogues the same in Spanish.

Example 17. The Virtual Maestro dialogues using Output Spatial Environment: the end user searches:
1. "WALMART", then the Virtual Maestro using the GPS coordinates from the subscriber device adding
2. US, Florida, North Miami Beach, 33160, and the Virtual Maestro 700 identifies a smart search and renders a map based on the closest stores (A, B and C).

Example 18. Virtual Maestro helps to eliminate confounding elements of the search: continuing with Example 17. the Virtual Maestro 700 dialogues using the Script Verify Location. First, determines Leg A based on the user's present location, home or office, in this example from the user's home. Second, creates a dialogue based on the user's profile and present location the most probable stores selecting A and C. Third, the Virtual Maestro 700 dialogues with the user, Asking: Are going to Store A or Store C from you present location? The user says Yes, from here to Store C. Alternatively, No, from my office to Store B. The dialogue with the user's help eliminate the confounding elements of the search!

Example 19. Scripted Virtual Maestro dialogue based on the end user decision: continuing with Example 18. the user begins to drive towards the Walmart located at US, FL Hallandale Beach Fla. 33009, identified as Store C, and based on historical feedback risk threats the game between Atletico Madrid and Real Madrid is about to start. Thus, the Virtual Maestro 700 starts a dialogue:
1. Asks: "Do you want updates for the Champions League game between Atletico Madrid and Real Madrid"?
2. End users responds, "YES". Then executing software instructions performs a dialogue as if a human, waits and notifies the user, the game will start soon.
3. Says: "Atletico Madrid and Real Madrid lineup". The Virtual Maestro 700 identifies Ronaldo scored a hat trick in the first game.
4. Says: "Do you like Cristian Ronaldo"? The user, says "YES". The Virtual Maestro 700 searches the Walmart Store C supplier inventory using Ronaldo and Real Madrid as a protected Super Glyphs, and identifies a t-shirt for $15 of El Clasico Real Madrid vrs Barcelona exhibition game.

5. The Virtual Maestro 700 offers to purchase directly from Walmart Store C the t-shirt from Store C? The user, says "YES".

6. Point of Sales Script: Shopping cart sale of the El Clasico t-shirt.

Alternatively, upon making the transaction, the system determines less than 1,000 tickets for "El Clasico" played at Hard Rock Stadium, Jul. 29, 2017 are still available starting for a pair at $501.00, the end user, approves the dialogue and point of sales transaction, that was based on the high security transaction Super Glyph since the game was about to be sold out. The Virtual Maestro 700 made these assumption, 1. Real Madrid, 2. Local GPS (North Miami Beach), 3. El Clasico event within 20 miles of the Local GPS. The end user profile identifies the following Super Glyphs (a) Ronaldo, and (b) Real Madrid. The Virtual Maestro 700 consensually followed the point of sale script step by step as if a human in dialogue style and closed the sale. And yes, for performing the transaction credited the end user with $X dollars of system credits to listen/view licensed audio and videos.

Example 20. Scripted Virtual Maestro dialogue with the end user: continuing with Example 18. The end user begins to enters the Walmart located at US, FL Hallandale Beach Fla. 33009, identified as Store C. Thus, the Virtual Maestro 700 starts a dialogue, 1. "Name, do you have a grocery list?" 2. Yes, Products A, B, and C. 3. Says: I found these coupons and finds the best P/U or Price per unit and updates the end user profile purchase pattern. End user reaches checkout, and the Virtual Maestro 700 verifies with the store system each item and stores the transactional data for future Super Glyph valorization. Let assume, Product A was a detergent, now based on previous purchases can forecast when to renew. Let assume Product B was Milk, before purchasing the Virtual Maestro 700, 4. Says: "The optimal expiration date is "dd/mm/yyyy"." Let assume, Product C was a licensed DVD of music, 5. Licensing: user profile. 6. Rewarding: user with $X dollars of system credits to listen/view licensed audio and videos.

Note: Even though the end user performed all the purchases in the Walmart store C located in Hallandale Beach, the Virtual Maestro 700 using UCommerce functionalities updated the purchasing profile of the end user, and using the Virtual Maestro anti piracy features licensed in real time the music contained in the DVD to the correct person.

LIST OF ELEMENTS

Ref No. Description
100 Search Engine System
105 Computer Terminal, Subscriber Device or Smart Input Device
110 End User or Subscriber
115 Interactive Input
116 Interactive Trending Input
117 Map Optimal Input (Significant Relevant Primed Data)
118 Protected Math Input
119 Request
120 Browser
130 Optimizer
135 Personal input
140 Internet
150 The Hive
155 HIVE SMP (Symmetric Multi Processing) Artificial Intelligence Software
160 Codex Inventory Control System
165 Rules of Semantics
166 Trending Rules of Semantics
167 Pattern Matching
169 Codex Page
170 Human Knowledge Encyclopedia
175 Entity Object
176 Protected Entity Object
177 Natural Variants
178 Protected Natural Variants
180 Optimal Environment
185 Inventory Control Content
186 Protected Inventory Control
189 Optimal Dataset
199 Personalized dataset
200 Web Crawler Sub System
205 Web Crawler
210 New Document
215 Raw Data
219 Primed Data (for human monitoring and evaluation)
220 Parse Data (using rules of grammar and semantics)
265 Trend Data (measures pattern of behavior) (Interest Graph)
266 Protected Trend Data
269 Derive Significant Portions of Information
275 Map Entity Object
276 Protected Mapped Entity Object
277 Map Natural Variant
278 Protected Mapped Natural Variant
285 Update Super Glyph (Mathematical) Equation
300 Multi lingual Search Engine System
315 Multi lingual Interactive Input
316 Multi lingual Trending Input
319 Multi Lingual Request
329 Search Pattern with trending data
365 Multi Lingual Rules of Semantics
366 Protected Multi Lingual Rules of Semantics
367 Multi Lingual Pattern Matching
368 Protected Multi Lingual Pattern Matching
375 Multi Lingual Entity Object
376 Protected Multi Lingual Entity Objects
377 Multi Lingual Natural Variants
378 Protected Multi Lingual Natural Variants
385 Map Multi Lingual Inventory Control
400 Super Glyph Math Probabilistic Spatial Environment
417 Math Optimal Input
418 Protected Math Request
419 Math Optimal Request
465 Math Rules of Semantic
467 Math Pattern Matching
475 Math Mapping Entity Objects
477 Math Mapping Natural Variants
485 Map Math Consolidated Inventory Control
500 Commercialize the Spatial Environment
575 Commercialize Entity Object
576 Threat Risk Entity Object
577 Commercialize Natural Variants
579 Threat Risk Natural Variants
585 Commercial Value Consolidated Inventory Control
586 Threat Risk Consolidated Inventory Control
630 Scripted Algorithm and Database
700 Virtual Maestro (artificial intelligence computer program product)
701 Input Probabilistic Spatial Environment
702 Output Probabilistic Spatial Environment
710 Weighted Output Natural Variants (feature attributes, or alternatives)

720 Pick Best Natural Variant
730 Best Response Probable Branching
740 Pick Best Probable Branching Response
750 Interactive Input Offers Natural Variants (alternative query suggestions)
760 Assisted Input Communicate Response
770 Smart Input Communicate Response
780 Personalized Input Communicate Response
785 Weighted Plausible Responses
790 Pick Best Plausible Response
799 Dialogue Best Plausible Responses with the End User.

What is claimed is:

1. A system for simulation in a parallel distributed computing virtual environment of the Internet comprising:
   (i) a set of computers linked forming a neural network, each computer in the set of computers comprising at least one processor, the system employing a human knowledge encyclopedia database that is stored in a digital memory device within the system, the human knowledge encyclopedia database referred to as a Codex; wherein Codex stores each recognized search pattern in the digital memory device;
   (ii) a plurality of device consoles in digital communication with the neural network to search the human knowledge encyclopedia, using an optimizer software residing in a digital memory device of each respective device console, executing interactive rules of grammar and semantics software instructions by at least one processor, to transform input into a search pattern, and storing the output in the digital memory device of the respective device console,
   (iii) a media value database residing in the Codex, the media value database is searched to monetize the output belonging to each search pattern; and
   (iv) a webpage database residing in the Codex, the webpage database including a master index and a set of layers of refinement partial master indices for each element of the Codex, the Codex executing a software instruction set using by at least one processor comprising steps of:
   (A) receiving interactively, input from at least one end user computer terminal; wherein, the Codex, interactively transforms input into a search pattern using a set of rules of grammar and semantics software instructions by the at least one processor, and stores the end user's input data in the digital memory device of the computer terminal;
   (B) employing and coordinating at least one web crawler to continuously interact with, scan, gather, analyze and distill raw documents from an Internet environment; wherein, the Codex, organizes and processes the raw documents into primed data, wherein the primed data is a primed implementable representation of data for human monitoring and evaluation, and identifies each recognized word and word cluster based on language from the primed data;
   (C) data mining the webpage database to analyze, parse and index refine the human knowledge encyclopedia database to determine portions of the human knowledge encyclopedia database that are relevant to the primed data, wherein, the Codex, stores significant difference primed data in a digital memory device of the web page database;
   (D) pattern recognizing the search pattern using the human knowledge encyclopedia database, the Codex, retrieves the search pattern preprocessed and pre-calculated of optimal dataset stored in the web page database as an output; and
   (E) automatically communicating the output in an order from highest to lowest to the end user computing terminal.

2. The system as recited in claim 1, the software instruction set further comprising a step of:
   (F) simulating real time news, data and information sources, to organize and process the primed data, and update the webpage database, upon finding new significant difference in the primed data.

3. The system as recited in claim 1, the software instruction set further comprising a step of:
   (G) searching the virtual environment to organize and process the primed data, and search the media value database to monetize the primed data, wherein, the Codex updates the webpage database upon finding new significant difference in monetized primed data.

4. The system as recited in claim 1, further the Codex executing software instructions by at least one processors, the software instruction set further comprising a step of:
   (H) analyzing the virtual environment to find a new significant difference in the primed data; and
   (I) updating the web page database upon finding the new significant difference in the primed data.

5. The system as recited in claim 1, further the Codex executing software instructions by at least one processor, the system comprising a step of:
   (J) weighting a trending value of each document of the optimal dataset to personalize the output; wherein step (J) is accomplished following step (D) and prior to step (E).

6. A neural network system that continuously scans and gathers information from, understands, and interacts with, a simulated virtual environment mapping the Internet the neural network comprising:
   (i) a set of computers linked forming a neural network, the system employing a human knowledge encyclopedia database being stored in a digital memory device within the system, the human knowledge encyclopedia database referred to as a Codex; wherein the Codex stores each recognized search pattern;
   (ii) a plurality of computer terminals in digital communication with the system to search the Codex, using an optimizer software residing in a digital memory device executing instructions by at least one processor, transforming interactively input into a search pattern using a set of rules of grammar and semantics and storing the data in the digital memory device of the respective end user computing terminal,
   (iii) a media value database that is in digital communication with the Codex that is searched to monetize the simulated virtual environment output belonging to each search pattern; and
   (iv) a webpage database residing in the Codex, the webpage database including a master index and a set of layers of refinement partial master indices for each element of the Codex
   mapping the simulated virtual environment, the Codex executing a software instruction set by at least one processor comprising steps of:
   (A) receiving interactively input from at least one computer terminal; wherein, the Codex, interactively transforms input into a search pattern using the set of rules of grammar and semantics software instructions by at least one processor, and stores the data a digital memory device;

(B) employing and coordinating at least one web crawler to continuously interact with, scan, gather, analyze and distill raw documents from an Internet environment; wherein, the Codex, organizes and processes the raw documents into a primed implementable representation of data for human monitoring and evaluation, referred as primed data, and identifies each recognized word and word cluster based on language from the primed data;

(C) data mining the webpage database to analyze, parse and index refine the database to determine portions of the database that are relevant to the primed data, wherein, the Codex, stores significant difference primed data in a digital memory device of the web page;

(D) pattern recognizing the search pattern using the encyclopedia database, the Codex, wherein, retrieves the search pattern preprocessed and pre-calculated of optimal dataset stored in the web page database as output;

(E) analyzing the output to discover associative and transitive entities related to the search and gain factoring the value of each page when possessing associative and transitive entities; wherein, the Codex, modifying output with a set of natural variant associative and transitive entities as command instruction to aid the user improve the input, and storing the data in the digital memory device of the respective end user computing terminal; and (F) automatically communicating the output in an order from highest to lowest to the end user computing terminal.

7. The neural network system as recited in claim 6, further the Codex executing software instructions by at least one processors comprising steps of:

(G) transforming each computer terminal input into a search pattern and storing the data in the digital memory device of the respective end user's computing terminal, wherein searching, the Codex, to find relevant missing gaps of information to reorganize the search pattern, and providing an optimized version of the search pattern.

8. The neural network system as recited in claim 7, further the Codex executing software instructions by at least one processors comprising steps of:

(H) adding the GPS coordinates of the user computing device to interactively transform input into a search pattern; wherein, searching the Codex, to reorganize the search pattern, and providing an optimized version of the search pattern.

9. The neural network system as recited in claim 6, further the Codex executing software instructions by at least one processors, the software instructions further comprising steps of:

((I)) analyzing the virtual environment for each recognized search pattern, the Codex, searches the media value database to monetize the output; and ((J)) weighting the trending value of each document of the optimal dataset, the Codex, using the usage pattern of behavior and the trending of each site to personalize the output.

10. A Codex system continuously scans and gathers information from, understands, and interacts with, a simulated virtual environment mapping the Internet, the Codex system comprising (i) a set of computers linked forming a neural network, wherein the system employing a human knowledge encyclopedia database being stored in a digital memory device within the system, referred to as a Codex; wherein Codex stores each recognized search pattern;

(ii) a plurality of computer terminals in digital communication with the system to search the Codex, using an optimizer software residing in a digital memory device, executing a set of grammar and semantics software instructions by at least one processors, transforming interactively input into a search pattern and storing the data in the digital memory device of the respective end user computing terminal;

(iii) a media value database that is in digital communication with the Codex, that is searched executing software instructions by at least one processors, to monetize the output belonging to each search pattern; and (iv) a artificial intelligence product, hereinafter referred to as Virtual Maestro, executing interactive optimizer software instructions by at least one processors, using pattern recognition to search the Codex, wherein the Virtual Maestro is in digital communication with a script database, executing software of instruction to compare, organize, process, and proactively updating the output in order to engage scripted communication with the end user comprising:

the Codex executing software instructions by at least one processors, the software instructions further comprising steps of:

(A) receiving interactively input from at least one computer terminal; wherein, the Codex, interactively transforms input into a search pattern using a set of rules of grammar and semantics software instructions by at least one processors, and stores the data a digital memory device;

(B) employing and coordinating at least one web crawlers to continuously interact with, scan, gather, analyze and distill raw documents from an Internet environment; wherein, the Codex, organizes and processes the raw documents into a primed implementable representation of data for human monitoring and evaluation, referred as primed data, and identifies each recognized word and word cluster based on language from the primed data;

(C) data mining the webpage database to analyze, parse and index refine the database to determine portions of the database that are relevant to the primed data, wherein, the Codex, stores significant difference primed data in a digital memory device of the web page;

(D) pattern recognizing the search pattern using the encyclopedia database, the Codex, wherein, retrieves the search pattern preprocessed and pre-calculated of optimal dataset stored in the web page database as output;

(E) analyzing the output to discover associative and transitive entities related to the search and gain factoring the value of each page when possessing associative and transitive entities; wherein, the Codex, modifying output with a set of natural variant associative and transitive entities as command instruction to aid the user improve the input, and storing the data in the digital memory device of the respective end user computing terminal;

(F) animating and displaying the Virtual Maestro in the end user's device console; wherein, the Virtual Maestro, searching a script database, executing scripted software instructions by at least one processors, to promote advertisements, products and services based on automatic updates of the optimal output, wherein, the Virtual Maestro; and (G) searching the script database for how to instantiate a substantive communication with the end user based on automatic updates of optimal output received from the Codex.

11. The Codex system as recited in claim 10, further the Virtual Maestro executing software instructions by at least one processors, the software instructions further comprising a step of:

(H) transforming each computer terminal input into a search pattern and storing the data in the digital memory device of the respective end user's computing terminal, wherein searching, the Codex, to find relevant missing gaps of information to reorganize the search pattern, and providing an optimized version of the search pattern.

12. The Codex system as recited in claim 10, further the Virtual Maestro executing software instructions by at least one processors, the software instructions further comprising a step of (H) (I) adding the GPS coordinates of the user computing device to interactively transform input into a search pattern; wherein, searching the Codex, to reorganize the search pattern, and providing an optimized version of the search pattern.

13. The Codex system as recited in claim 10, further the Virtual Maestro executing software instructions by at least one processors, the software instructions further comprising steps of:

(J) analyzing the virtual environment for each recognized search pattern, the Codex, searches the media value database to monetize the output;

(K) weighting the trending value of each document of the optimal dataset, the Codex, using the usage pattern of behavior and the trending of each site to personalize the output; and (L) automatically communicating the output in an order from highest monetized value to lowest monetized value to the end user computing terminal.

14. A Codex system continuously scans and gathers information from, understands, and interacts with, an environment comprising:

(i) a encyclopedia database residing in the Codex and storing in non-volatile digital memory each recognized search pattern to a specific language;

(ii) a computing device is in digital communication to search the Codex;

(iii) a webpage database residing in the Codex, containing each search pattern output;

(iv) an artificial intelligence interaction, hereinafter referred to as Virtual Maestro, pattern recognition to search the Codex in order to receive the optimal output from the Codex, the Codex executing software instructions by at least one processors comprising steps of:

(A) receiving interactively input from at least one computer terminal; wherein, the Codex, interactively transforms input into a search pattern using a set of rules of grammar and semantics software instructions by at least one processors, and stores the data a digital memory device;

(B) pattern recognizing the search pattern using the encyclopedia database, the Codex, wherein, retrieves the search pattern preprocessed and pre-calculated of optimal dataset stored in the web page database as output;

(C) animating and displaying the Virtual Maestro in the end users device console; wherein, the Virtual Maestro, searching a script database, executing software instructions by at least one processors, to promote advertisements, products and services based on automatic updates of the optimal output; and the Virtual Maestro, executing software instructions by at least one processor, the software instructions comprising steps of:

(D) searching the script database for how to instantiate a substantive communication with the end user based on automatic updates of optimal output received from the Codex.

15. The Codex system as recited in claim 14, the Virtual Maestro executing software instructions by at least one processors, the software instructions further comprising steps of:

(E) transforming each computer terminal input into a search pattern and storing the data in the digital memory device of the respective end user's computing terminal, wherein searching, the Codex, to find relevant missing gaps of information to reorganize the search pattern, and providing an optimized version of the search pattern;

(F) adding the GPS coordinates of the user computing device to interactively transform input into a search pattern; wherein, searching the Codex, to reorganize the search pattern, and providing an optimized version of the search pattern;

(G) analyzing the virtual environment for each recognized search pattern, the Codex, searches the media value database to monetize the output; and (H) searching the script database for how to instantiate a substantive communication with the end user based on automatic updates of optimal output received from the Codex.

16. A Codex system continuously scans and gathers information from, understands, and interacts with, an environment comprising:

(i) a encyclopedia database residing m the Codex and storing m non-volatile digital memory each recognized search pattern to a specific language;

(ii) a computing device is in digital communication to search the Codex;

(iii) a webpage database residing in the Codex, containing each search pattern output;

(iv) an artificial intelligence interaction, hereinafter referred to as Virtual Maestro, pattern recognition to search the Codex in order to receive the optimal output from the Codex;

(v) a script database that is in digital communication with the Virtual Maestro that is searched by the Virtual Maestro, to engage scripted communication with the end user, the Codex executing software instructions by at least one processor, the software instructions comprising steps of:

(A) mapping the end user's interactive input and historical profile from previous interactions as the end user's input probabilistic spatial environment;

(B) find relevant missing gaps of information to reorganize the search pattern and (L) adding the GPS coordinates of the user computing device to interactively transform input into a search pattern;

wherein, searching the Codex, to reorganize the search pattern, and providing an optimized version of the search pattern;

the Virtual Maestro, executing software instructions by at least one processor, the software instructions comprising steps of:

(C) weighting the input spatial environment, the Virtual Maestro, updates the personalized input and probabilistic recalibrates objects weight in the input spatial environment;

(D) probability-measuring the output spatial environment as changes are detected in the input probabilistic spatial environment, the Virtual Maestro, searches the Codex to proactively map the output spatial environment containing a set of probabilities of how to best start a personalized script to communicate with the end user;

(E) simulating the output spatial environment, the Virtual Maestro, scans, gathers, distills and analyzes information from, understands, and interacts with the monitored geospatial areas occupied by the end user's at least one device console, and the analysis of relevant significant input, output and audio or video streaming events; and (F) recurring searching the script database to probably measure and evaluate each significant response of the output spatial environment, and upon finding a proactive decision making solution instantiating a fuzzy system time synchronized simulation output of the most accurate projected communication with the end user.

17. The Codex system as recited in claim 16, the Virtual Maestro, executing the software instructions by the at least one processor, the software instructions further comprising a step of:

(G) the Virtual Maestro interacting with the monitored geospatial areas occupied by the end user's at least one device console, and (H) the Virtual Maestro performing real time analysis of at least one of: relevant significant input, relevant significant output, and audio or video streaming events.

18. The Codex system as recited in claim 16, wherein, in step D, each significant response is a best probable response.

19. A Codex system that continuously scans and gathers information from, understands, and interacts with, an environment, the Codex comprising:

(i) a encyclopedia database residing in the Codex and storing in non-volatile digital memory each recognized search pattern to a specific language;

(ii) a computing device is in digital communication to search the Codex;

(iii) an artificial intelligence interaction, hereinafter referred to as Virtual Maestro, pattern recognition to search the Codex in order to receive the optimal output from the Codex; and (iv) a script database that is in digital communication with the Virtual Maestro that is searched by the Virtual Maestro, to engage scripted communication with the end user, the Virtual Maestro, executing software instructions by at least one processors, the software instructions comprising steps of (A) mapping the end users computer device interactive input and historical profile from previous interactions as the end users input probabilistic spatial environment; (K find relevant missing gaps of information to reorganize the search pattern and (L) adding the GPS coordinates of the user computing device to interactively transform input into a search pattern; wherein, searching the Codex, to find an optimized version of the search pattern;

(B) weighting the input spatial environment, the Virtual Maestro, updates the personalized input and probabilistic recalibrates objects weight in the input spatial environment;

(C) probability-measuring the output spatial environment as changes are detected in the input probabilistic spatial environment, the Virtual Maestro, searches the Codex to proactively map the output spatial environment containing a set of probabilities of how to best start a personalized script to communicate with the end user;

(D) simulating the output spatial environment, the Virtual Maestro, scans, gathers, distills and analyzes information from, understands, and interacts with the monitored geospatial areas occupied by the end user's at least one device console, and the analysis of relevant significant input, output and audio or video streaming events; and (E) recurring searching to probably measure and evaluate each significant response of the output spatial environment; and upon finding proactive decision making solution instantiating a fuzzy system time synchronized simulation output of the most accurate projected substantive dialogue with the end user as if sentient.

20. The Codex system as recited in claim 19, wherein, in step E, each significant response is a best plausible response.

* * * * *